(12) United States Patent
Morris et al.

(10) Patent No.: US 12,002,119 B2
(45) Date of Patent: Jun. 4, 2024

(54) INTELLIGENT FUEL DISPENSERS

(71) Applicant: Wayne Fueling Systems LLC, Austin, TX (US)

(72) Inventors: John Joseph Morris, Austin, TX (US); Scott R. Negley, III, Austin, TX (US); Annika Birkler, Malmo (SE); Richard Carlsson, Malmo (SE); Patrick Jeitler, Austin, TX (US); Randal S. Kretzler, Austin, TX (US)

(73) Assignee: Wayne Fueling Systems LLC, Austin, TX (US)

(*) Notice: Subject to any disclaimer, the term of this patent is extended or adjusted under 35 U.S.C. 154(b) by 0 days.

(21) Appl. No.: 17/162,519

(22) Filed: Jan. 29, 2021

(65) Prior Publication Data
US 2021/0150642 A1 May 20, 2021

Related U.S. Application Data

(63) Continuation of application No. 16/296,972, filed on Mar. 8, 2019, now Pat. No. 10,929,937, which is a
(Continued)

(51) Int. Cl.
*G06V 40/16* (2022.01)
*B67D 7/04* (2010.01)
(Continued)

(52) U.S. Cl.
CPC .............. *G06Q 50/06* (2013.01); *B67D 7/04* (2013.01); *B67D 7/14* (2013.01); *B67D 7/145* (2013.01);
(Continued)

(58) Field of Classification Search
CPC ...... G06Q 50/06; G06Q 20/145; G06Q 20/18; G06Q 30/0233; G06Q 30/06; G06Q 20/16;
(Continued)

(56) References Cited

U.S. PATENT DOCUMENTS

| 5,605,182 A | 2/1997 | Oberrecht et al. |
| 6,052,629 A | 4/2000 | Leatherman et al. |

(Continued)

FOREIGN PATENT DOCUMENTS

| CN | 1369428 A | 9/2002 |
| CN | 2730698 Y | 10/2005 |

(Continued)

OTHER PUBLICATIONS

Extended European Search Report received for European Application No. 17786316.4, dated Nov. 7, 2019, 8 pages.
(Continued)

*Primary Examiner* — Jose L Couso
(74) *Attorney, Agent, or Firm* — Mintz, Levin, Cohn, Ferris, Glovsky and Popeo, P.C.

(57) ABSTRACT

In general, intelligent fuel dispensers are provided. In at least some implementations, an intelligent fuel dispenser can determine customer identities and/or other characteristics and provide customized fueling sessions based on the determined customer identities and/or other characteristics. In at least some implementations, the fuel dispenser includes a touchless interface allowing customers to complete fueling sessions with minimal physical contact with the fuel dispenser.

14 Claims, 39 Drawing Sheets

Related U.S. Application Data continuation of application No. 15/476,150, filed on Mar. 31, 2017, now Pat. No. 10,269,082.

(60) Provisional application No. 62/349,513, filed on Jun. 13, 2016, provisional application No. 62/342,410, filed on May 27, 2016, provisional application No. 62/325,796, filed on Apr. 21, 2016.

(51) Int. Cl.
| | |
|---|---|
| *B67D 7/14* | (2010.01) |
| *B67D 7/22* | (2010.01) |
| *G06Q 20/14* | (2012.01) |
| *G06Q 50/06* | (2012.01) |
| *G06V 20/20* | (2022.01) |
| *G06V 20/52* | (2022.01) |
| *G06V 40/10* | (2022.01) |
| *G06V 40/20* | (2022.01) |
| *G07F 13/02* | (2006.01) |
| *G06F 3/0481* | (2022.01) |
| *G06Q 20/18* | (2012.01) |
| *G06Q 30/0226* | (2023.01) |

(52) U.S. Cl.
CPC ........... *B67D 7/228* (2013.01); *G06Q 20/145* (2013.01); *G06V 20/20* (2022.01); *G06V 20/52* (2022.01); *G06V 40/10* (2022.01); *G06V 40/168* (2022.01); *G06V 40/172* (2022.01); *G06V 40/28* (2022.01); *G07F 13/025* (2013.01); *G06F 3/0481* (2013.01); *G06F 2203/04108* (2013.01); *G06Q 20/18* (2013.01); *G06Q 30/0233* (2013.01)

(58) Field of Classification Search
CPC . B67D 7/04; B67D 7/14; B67D 7/145; B67D 7/228; G06V 20/20; G06V 20/52; G06V 40/10; G06V 40/168; G06V 40/172; G06V 40/28; G06V 20/54; G06V 20/625; G06V 30/10; G06V 2201/08; G06V 30/1478; G07F 13/025; G06F 3/0481; G06F 2203/04108; G06T 2207/30232; G06T 2207/30252; G06T 7/00; G06T 2207/10032; G06K 9/00; G06K 9/62; G08G 1/0175; G08G 1/017

See application file for complete search history.

(56) References Cited

U.S. PATENT DOCUMENTS

| | | | |
|---|---|---|---|
| 6,070,156 A | 5/2000 | Hartsell, Jr. | |
| 6,073,840 A * | 6/2000 | Marion | G07F 7/02 |
| | | | 235/383 |
| 6,089,284 A * | 7/2000 | Kaehler | G06Q 50/06 |
| | | | 141/2 |
| 6,098,879 A | 8/2000 | Terranova | |
| 6,116,505 A * | 9/2000 | Withrow | G07F 7/025 |
| | | | 235/378 |
| 6,152,591 A | 11/2000 | McCall et al. | |
| 6,275,746 B1 | 8/2001 | Leatherman et al. | |
| 6,380,853 B1 | 4/2002 | Long et al. | |
| 6,381,514 B1 | 4/2002 | Hartsell, Jr. | |
| 6,422,464 B1 | 7/2002 | Terranova | |
| 6,470,233 B1 * | 10/2002 | Johnson, Jr. | G07F 7/1008 |
| | | | 141/351 |
| 6,493,440 B2 | 12/2002 | Gromatzky et al. | |
| 6,571,151 B1 | 5/2003 | Leatherman | |
| 6,574,603 B1 | 6/2003 | Dickson et al. | |
| 6,690,275 B2 | 2/2004 | Long et al. | |
| 6,690,357 B1 | 2/2004 | Dunton et al. | |
| 6,734,798 B2 | 5/2004 | Smith | |
| 6,741,909 B2 | 5/2004 | Leatherman et al. | |
| 6,882,900 B1 | 4/2005 | Terranova | |
| 7,604,169 B2 | 10/2009 | Demere | |
| 7,810,722 B2 | 10/2010 | Dodson | |
| 7,948,376 B2 | 5/2011 | DeLine | |
| 8,284,053 B2 | 10/2012 | DeLine | |
| 8,429,095 B1 | 4/2013 | Ryan | |
| 8,554,688 B2 | 10/2013 | Harrell et al. | |
| 8,761,924 B2 | 6/2014 | Leatherman et al. | |
| 8,924,267 B1 | 12/2014 | Terranova | |
| 8,965,569 B2 | 2/2015 | Siler | |
| 9,120,664 B2 | 9/2015 | Birkler et al. | |
| 9,135,615 B1 | 9/2015 | Mutha | |
| 9,139,414 B2 | 9/2015 | Bergqvist | |
| 9,477,317 B1 | 10/2016 | Clements | |
| 10,131,531 B1 | 11/2018 | Prasad et al. | |
| 10,134,042 B1 | 11/2018 | Prasad et al. | |
| 10,176,467 B2 | 1/2019 | Prosperie, III | |
| 10,181,154 B1 | 1/2019 | Budde et al. | |
| 10,269,082 B2 | 4/2019 | Morris et al. | |
| 10,318,963 B1 | 6/2019 | Prasad et al. | |
| 10,577,238 B1 | 3/2020 | Chamoun | |
| 10,726,508 B2 | 7/2020 | Morris et al. | |
| 11,494,855 B2 | 11/2022 | Morris et al. | |
| 11,580,515 B1 | 2/2023 | Gaudin et al. | |
| 2001/0020198 A1* | 9/2001 | Wilson | B67D 7/067 |
| | | | 705/14.27 |
| 2002/0104582 A1 | 8/2002 | Kanamori et al. | |
| 2002/0113082 A1* | 8/2002 | Leatherman | G06Q 20/346 |
| | | | 141/94 |
| 2002/0116261 A1 | 8/2002 | Moskowitz et al. | |
| 2002/0147648 A1 | 10/2002 | Fadden et al. | |
| 2003/0028285 A1 | 2/2003 | Zura et al. | |
| 2003/0041330 A1 | 2/2003 | Smith | |
| 2004/0095230 A1 | 5/2004 | Li et al. | |
| 2004/0154687 A1 | 8/2004 | Mann | |
| 2005/0000588 A1 | 1/2005 | Webb et al. | |
| 2007/0106559 A1 | 5/2007 | Harrell | |
| 2007/0265723 A1 | 11/2007 | Sharma et al. | |
| 2008/0040287 A1 | 2/2008 | Harrell et al. | |
| 2008/0229409 A1 | 9/2008 | Miller et al. | |
| 2008/0235105 A1 | 9/2008 | Payne et al. | |
| 2008/0313078 A1 | 12/2008 | Payne et al. | |
| 2009/0048709 A1 | 2/2009 | DeLine | |
| 2009/0048711 A1 | 2/2009 | DeLine | |
| 2009/0048945 A1 | 2/2009 | DeLine | |
| 2009/0192938 A1 | 7/2009 | Amos | |
| 2009/0254439 A1 | 10/2009 | Dunn | |
| 2010/0049669 A1 | 2/2010 | Mazzarolo | |
| 2011/0137470 A1 | 6/2011 | Sumilla et al. | |
| 2011/0213683 A1* | 9/2011 | Betancourt | G06Q 40/12 |
| | | | 705/30 |
| 2011/0273371 A1 | 11/2011 | Payne et al. | |
| 2011/0288721 A1 | 11/2011 | Christensen et al. | |
| 2011/0295415 A1 | 12/2011 | Bartlett et al. | |
| 2012/0101882 A1 | 4/2012 | Todd | |
| 2012/0318406 A1 | 12/2012 | Cajiga et al. | |
| 2013/0061258 A1 | 3/2013 | Takaya et al. | |
| 2013/0091464 A1 | 4/2013 | Chang et al. | |
| 2013/0103585 A1 | 4/2013 | Carapelli | |
| 2013/0216102 A1 | 8/2013 | Ryan et al. | |
| 2013/0246171 A1 | 9/2013 | Carapelli | |
| 2013/0271360 A1 | 10/2013 | Macdougall et al. | |
| 2013/0300985 A1 | 11/2013 | Bulda | |
| 2014/0019359 A1 | 1/2014 | Abrams et al. | |
| 2014/0063060 A1 | 3/2014 | Maciocci et al. | |
| 2014/0072171 A1 | 3/2014 | Tu et al. | |
| 2014/0093125 A1 | 4/2014 | Hradetzky | |
| 2014/0100692 A1 | 4/2014 | Chittenden, Jr. et al. | |
| 2014/0195046 A1 | 7/2014 | Fadler et al. | |
| 2014/0246453 A1 | 9/2014 | Lin | |
| 2014/0267741 A1 | 9/2014 | King et al. | |
| 2014/0327778 A1 | 11/2014 | Mcquade et al. | |
| 2015/0106196 A1 | 4/2015 | Williams et al. | |
| 2015/0143123 A1 | 5/2015 | Bergqvist | |
| 2015/0242855 A1 | 8/2015 | Vilnai | |
| 2015/0242969 A1 | 8/2015 | Pallas et al. | |
| 2015/0329349 A1 | 11/2015 | Larsson et al. | |
| 2015/0363070 A1 | 12/2015 | Katz | |

(56) References Cited

U.S. PATENT DOCUMENTS

| | | |
|---|---|---|
| 2016/0039656 A1 | 2/2016 | Walsh et al. |
| 2016/0078289 A1 | 3/2016 | Michel et al. |
| 2016/0171472 A1 | 6/2016 | Pugh et al. |
| 2016/0247153 A1 | 8/2016 | Lesesky |
| 2016/0357399 A1 | 12/2016 | Shin et al. |
| 2016/0364718 A1 | 12/2016 | Betancourt et al. |
| 2017/0083988 A1 | 3/2017 | Butsch et al. |
| 2017/0193716 A1 | 7/2017 | Wittliff, III |
| 2017/0243410 A1 | 8/2017 | Caballero |
| 2017/0247241 A1 | 8/2017 | Blyth |
| 2017/0308964 A1 | 10/2017 | Morris et al. |
| 2017/0308965 A1 | 10/2017 | Morris et al. |
| 2018/0035083 A1 | 2/2018 | King et al. |
| 2018/0075567 A1 | 3/2018 | Mycroft |
| 2018/0107891 A1 | 4/2018 | Schmidt et al. |
| 2018/0222741 A1 | 8/2018 | Cox et al. |
| 2018/0272886 A1 | 9/2018 | Stocker et al. |
| 2018/0276671 A1 | 9/2018 | Pastor |
| 2018/0368207 A1 | 12/2018 | Carapelli |
| 2019/0139340 A1 | 5/2019 | Mcquade et al. |
| 2019/0213692 A1 | 7/2019 | Morris et al. |
| 2020/0202460 A1 | 6/2020 | Morris et al. |
| 2021/0150643 A1 | 5/2021 | Morris et al. |
| 2021/0150644 A1 | 5/2021 | Morris et al. |
| 2021/0150645 A1 | 5/2021 | Morris et al. |

FOREIGN PATENT DOCUMENTS

| | | |
|---|---|---|
| CN | 101925916 A | 12/2010 |
| CN | 103236167 A | 8/2013 |
| CN | 103996295 A | 8/2014 |
| CN | 204138340 U | 2/2015 |
| EP | 3445706 A1 | 2/2019 |
| JP | H05338700 A | 12/1993 |
| JP | H11327753 A | 11/1999 |
| JP | 2002216219 A | 8/2002 |
| JP | 2005063090 A | 3/2005 |
| JP | 2010092505 A | 4/2010 |
| JP | 2012027104 A | 2/2012 |
| WO | 00/21023 A1 | 4/2000 |
| WO | 2009023782 A1 | 2/2009 |
| WO | 2012/088034 A2 | 6/2012 |
| WO | 2015002026 A1 | 1/2015 |
| WO | 2017/184319 A1 | 10/2017 |

OTHER PUBLICATIONS

International Preliminary Report on Patentability received for PCT Application No. PCT/US2017/025430, dated Nov. 1, 2018, 10 pages.
International Search Report and Written Opinion received for PCT Application No. PCT/US2017/025430, dated Aug. 16, 2017, 14 pages.
Fujitsu (Jun. 11, 2016) "PalmSecure", 3 pages.
MIMS (Dec. 2011) "The Wallet in Your Skin", Scientific American, 1 page.
Rautaray et al. (Jan. 1, 2012) "Vision Based Hand Gesture Recognition for Human Computer Interaction: A Survey", Artificial Intelligence Review, 43(1):54 pages.
Trader John (Jun. 10, 2011) "The Top 5 Reasons to Consider Fujitsu PalmSecure Biometric Technology Over Fingerprint", M2SYS Blog on Biometric Technology, 4 pages.
(Jul. 15, 2008) "The Research on Factors Affecting the Evolution of Automobiles's Shape", Ma Chao Beijing Institute of Technology, 7 pages.
European Search Report issued in European Application No. 23202450.5, mailed on Nov. 15, 2023, 8 pages.

* cited by examiner

INTELLIGENT FUEL DISPENSERS

CROSS REFERENCE TO RELATED APPLICATIONS

The present application is a continuation of U.S. patent application Ser. No. 16/296,972 entitled "Intelligent Fuel Dispensers" filed on Mar. 8, 2019, which is a continuation of U.S. patent application Ser. No. 15/476,150 entitled "Intelligent Fuel Dispensers" filed on Mar. 31, 2017, now granted as U.S. Pat. No. 10,269,082, which claims priority to U.S. Provisional Patent Application No. 62/325,796 entitled "Intelligent Fuel Dispensers" filed on Apr. 21, 2016, U.S. Provisional Patent Application No. 62/342,410 entitled "Transparent Fuel Dispenser" filed on May 27, 2016, and U.S. Provisional Patent Application No. 62/349,513 entitled "Intelligent Fuel Dispensers" filed on Jun. 13, 2016, each of which is hereby incorporated by reference in its entirety.

FIELD

The present disclosure relates generally to intelligent fuel dispensers.

BACKGROUND

The retail petroleum industry utilizes various types of fuel dispensers for dispensing fuel to customers. A fuel dispenser generally determines that a customer desires to initiate a fueling session by detecting the removal of a pump handle, the activation of a keypad, or the insertion of a payment card. Each option for initiating the fueling session generally requires the customer to touch an interface of the fuel dispenser, which may be dirty, have toxins (e.g., fuel residue, etc.), and/or germs. In addition, if a customer is a repeat or regular customer, the customer generally must reenter any fueling preferences (e.g., fuel grade, payment information, and the like) each time they wish to initiate a fueling session, which can be repetitive and/or time consuming.

Accordingly, there remains a need for improved fuel dispensers.

SUMMARY

In general, intelligent fuel dispensers and methods for using the same are provided.

In one embodiment, a fuel dispenser is provided that includes a housing having fuel dispensing components disposed therein and an electronics module disposed at least partially therein, an image sensor, and a processor in the electronics module, operatively coupled to the image sensor. The processor is configured to receive data characterizing an image from the image sensor, determine, using the image, whether a safety condition associated with a customer in proximity of the housing is satisfied, and, in response to determining that the safety condition is not satisfied, cause an alarm.

The fuel dispenser can vary in any number of ways. For example, the processor can be configured to receive data characterizing another image from the image sensor and to determine, using the other image, whether the customer is in proximity of the housing. In at least some embodiments, the other image can include a visual representation of the customer, the processor can identify a facial region in the other image, and the processor can extract at least one facial feature using the other image. The fuel dispenser can include a communication mechanism in the electronics module that transmits the extracted at least one facial feature to a remote database for determining whether the at least one facial feature matches a customer identity, or the processor can determine whether the at least one facial feature matches a customer identity. In at least some embodiments, the other image can include a visual representation of the customer, the processor can determine one or more non-facial body features, and the processor can determine, using the non-facial body feature, a characteristic of the customer including at least one of age, height, gender, and disability status. The fuel dispenser can include a display, the processor can dynamically reconfigure at least one graphical user interface (GUI) element in the display, and the GUI element can have at least one of a reconfigured location and a reconfigured size determined using the determined characteristic of the customer. In at least some embodiments, the other image can include at least one of a facial feature of the customer, a vehicle feature, a license plate number, and a non-facial body feature of the customer. In at least some embodiments, the processor can determine identity information of the customer based on the other image and can provide the identity information to a remote processor for determining the customer's identity that includes a name or unique identifier.

For another example, the electronics module can include a memory including executable instructions, which, when executed by the processor, perform operations. For yet another example, the safety condition can include whether the customer is smoking in proximity to the fuel dispenser, and the safety condition not being satisfied can include the customer smoking in proximity to the fuel dispenser. For still another example, the safety condition can include whether the customer is electrically grounded, the safety condition not being satisfied can include the customer not being electrically grounded, and the processor can determine whether the customer is electrically grounded before the customer dispenses fuel from the housing. For another example, the safety condition can include whether an engine of a vehicle of the customer is operating, and the safety condition not being satisfied can include the engine operating. For still another example, the fuel dispensing components can include a fuel pump configured to pump the fuel from a fuel reservoir through the dispenser, and can include a fuel meter configured to measure an amount of fuel pumped by the pump.

In another embodiment, a fuel dispenser includes a housing having fuel dispensing components disposed therein and an electronics module disposed at least partially therein. The electronics module includes an image sensor, and an image processor operatively coupled to the image sensor that receives data characterizing an image from the image sensor that includes a visual representation of a vehicle. The image processor is configured to determine identity information of a customer using the image, and the image processor is configured to cause the fuel dispenser to perform an action using the identity information.

The fuel dispenser can have any number of variations. For example, the fuel dispenser can determine a make and model of the vehicle using the at least one vehicle feature. In at least some embodiments, the at least one vehicle feature can include a license plate number.

For another example, the action can include, in response to determining the identity information, automatically retrieving from a memory a customer profile that includes fueling preferences of the customer, and automatically causing a pre-fueling selection screen to be shown on the display populated with the fueling preferences of the customer. In at least some embodiments, the fueling preferences can include at least one of fuel grade, fuel type, payment method, loyalty rewards identifier, whether to apply loyalty rewards to a present purchase, and whether to purchase a car wash. In at least some embodiments, the fueling preferences can include at least fuel type, the fuel dispenser can include a plurality of nozzles each configured to dispense a different fuel type, each of the nozzles can have a light associated therewith, the image processor can be configured to receive confirmation of the customer's selected fuel type, and the image processor can be configured to cause only the light associated with a one of the nozzles configured to dispense the fuel type selected by the customer. In at least some embodiments, the fuel preferences can characterize a personalized greeting.

In another embodiment, a fuel dispenser includes a housing having fuel dispensing components attached thereto, having a display attached thereto including a graphical user interface (GUI) display space, and an electronics module disposed at least partially therein. The electronics module includes an image sensor, and at least one data processor operatively connected to the display and the image sensor. The at least one data processor receives an image from the image sensor, the image including a visual depiction of at least a portion of a customer. The at least one data processor determines, from the image, a gesture of the customer and modifies, based on the determined gesture, a rendering on the GUI display space. The gesture is a touchless gesture in which the customer does not touch the fuel dispenser.

The fuel dispenser can vary in any number of ways. For example, the at least one data processor can cause enablement of fuel dispensing based on the determined gesture. For another example, the at least one data processor can classify the gesture. For yet another example, the at least one data processor can determine the gesture of the customer from the image. For still another example, the fuel dispensing components can include a fuel pump configured to pump the fuel from a fuel reservoir through the dispenser, and can include a fuel meter configured to measure an amount of fuel pumped by the pump. For yet another example, the touchless gesture can be a hand gesture.

For another example, the at least one data processor can render at least one GUI element on the GUI display space and modifies the GUI element based on the determined gesture. In at least some embodiments, modifying the GUI element can include at least one of increasing a size of the GUI element and changing a location of the GUI element.

For yet another example, the gesture can be a motion of a hand of the customer. In at least some embodiments, the at least one data processor determining the gesture can include the at least one data processor determining a direction of the motion.

For another example, the gesture can be pose of a hand of the customer. In at least some embodiments, the pose can include one of a thumbs up, a thumbs down, and pointing with a finger.

In another embodiment, a fuel dispenser includes a housing having fuel dispensing components disposed therein and an electronics module disposed at least partially therein. The electronics module includes an image sensor, and an image processor operatively coupled to the image sensor that receives data characterizing an image from the image sensor and determines identity information of a customer using the image, and that causes the fuel dispenser to perform an action using the identity information.

The fuel dispenser can have any number of variations. For example, the image can include a visual representation of the customer, the image processor can identify a facial region in the image, and the image processor can extract at least one facial feature using the image. In at least some embodiments, the electronics module can include a communication mechanism that transmits the extracted at least one facial feature to a remote database for determining whether the at least one facial feature matches a customer identity, and/or the electronics module can determine whether the at least one facial feature matches a customer identity.

For another example, the image can include a visual representation of a vehicle, and the image processor can identify at least one vehicle feature from the image. In at least some embodiments, the fuel dispenser can determine a make and model of the vehicle using the at least one vehicle feature, e.g., a license plate.

For yet another example, the image can include a visual representation of the customer, the image processor can determine one or more non-facial body features, and the image processor can determine, using the non-facial body feature, a characteristic of the customer including at least one of age, height, gender, and disability status. In at least some embodiments, the housing can have a display attached thereto, the image processor can dynamically reconfigure at least one graphical user interface (GUI) element in the display, and the GUI element can have at least one of a reconfigured location and a reconfigured size determined using the determined characteristic of the customer.

For still another example, the identity information can include a facial feature of the customer, a vehicle feature, a license plate number, and a non-facial body feature of the customer. For another example, the image processor can provide the identity information to a remote processor for determining the customer's identity that includes a name or unique identifier. For yet another example, the image processor can include circuitry. For another example, wherein the electronics module can include a memory including executable instructions, which, when executed by the image processor, perform operations. For yet another example, the fuel dispensing components can include a fuel pump configured to pump the fuel from a fuel reservoir through the dispenser, and a fuel meter configured to measure an amount of fuel pumped by the pump. For still another example, the image processor can determine, using the image, whether the customer is smoking in proximity to the fuel dispenser. For yet another example, before dispensing of fuel, the image processor can determine, using the image, whether the customer is electrically grounded. For another example, the image processor can determine, using the image, whether an engine of a vehicle of the customer is operating. In at least some embodiments, the image processor can cause initiation of an alarm, e.g., when the image processor determines whether the customer is smoking in proximity to the fuel dispenser, whether the customer is electrically grounded, and/or whether the engine of the vehicle of the customer is operating.

In another embodiment, a fuel dispenser includes a housing having fuel dispensing components disposed therein and an electronics module disposed at least partially therein. The electronics module includes a wireless module, and a communications processor in operative communication with the wireless module that receives, from the wireless module, data characterizing that a customer device is proximate thereto and receives from the customer device data characterizing identity information of a customer.

The fuel dispenser can vary in any number of ways. For example, the customer device can be a vehicle or a handheld mobile device. For another example, the identity information of the customer can be a unique identifier or a unique name.

For yet another example, the communications processor can transmit the identity information to a remote processor for determining, using a database of known customer identities, whether the received identity information matches at least one of the known customer identities. In at least some embodiments, the communications processor can receive, from the remote processor, a customer profile including fueling preferences associated with the customer.

For still another example, the electronics module can determine, using a database of known customer identities, whether the at least one facial feature matches a customer identity. For another example, the communications processor can receive, from the customer device, a customer profile including fueling preferences associated with the customer. For yet another example, the communications processor can include circuitry. For still another example, the fuel dispenser can include a memory storing executable instructions, which, when executed by the communications processor, perform operations. For another example, the wireless module can include a transceiver, and the transceiver can communicate via at least one of a Bluetooth protocol, a cellular protocol, a WIFI protocol, and a radio frequency identification (RFID) protocol. For still another example, the fuel dispensing components can include a fuel pump configured to pump the fuel from a fuel reservoir through the dispenser, and a fuel meter configured to measure an amount of fuel pumped by the pump.

In another embodiment, a fuel dispenser includes a housing having fuel dispensing components attached thereto, having a display attached thereto, and an electronics module disposed at least partially therein. The electronics module includes memory, and at least one data processor that accesses, from the memory, data characterizing a customer profile that includes fueling preferences of the customer and renders, on the display, a pre-fueling selection screen populated with the fueling preferences of the customer.

The fuel dispenser can vary in any number of ways. For example, the fueling preferences can include at least one of fuel grade, fuel type, payment method, loyalty rewards identifier, whether to apply loyalty rewards to a present purchase, and whether to purchase a car wash. In at least some embodiments, the fueling preferences can include at least fuel type, the fuel dispenser can include a plurality of nozzles each configured to dispense a different fuel type, each of the nozzles can have a light associated therewith, the at least one data processor can be configured to receive confirmation of the customer's selected fuel type, and the at least one data processor can be configured to cause only the light associated with a one of the nozzles configured to dispense the fuel type selected by the customer.

For another example, the fuel preferences can characterize a personalized greeting. For yet another example, the at least one data processor can be configured to render on a display of a vehicle of the customer information related to fueling of the vehicle during a fueling session. For still another example, the fuel dispensing components can include a fuel pump configured to pump the fuel from a fuel reservoir through the dispenser, and a fuel meter configured to measure an amount of fuel pumped by the pump.

In another embodiment, a fuel dispenser includes a housing having fuel dispensing components attached thereto, having a display attached thereto, and an electronics module disposed at least partially therein. The electronics module includes a wireless module, and at least one data processor that initiates a communication session with a customer device, receives at least one vehicle characteristic from the customer device, and renders on the display a characterization of the at least one vehicle characteristic.

The fuel dispenser can have any number of variations. For example, the data processor can determine, using the received at least one vehicle characteristic, whether the vehicle requires maintenance. In at least some embodiments, the at least one data processor can render, on the display, data characterizing a suggestion that the vehicle receive maintenance, and/or the at least one data processor can determine a type of maintenance.

For another example, the at least one data processor can determine, using the received at least one vehicle characteristic, a fuel cost. For yet another example, the at least one vehicle characteristic can include miles per gallon. For still another example, the at least one data processor can be configured to render on a display of a vehicle of the customer information related to fueling of the vehicle during a fueling session. For another example, the at least one data processor can include circuitry. For yet another example, the fuel dispenser can include a memory storing executable instructions, which, when executed by the at least one data processor, perform operations. For another example, the fuel dispensing components can include a fuel pump configured to pump the fuel from a fuel reservoir through the dispenser, and a fuel meter configured to measure an amount of fuel pumped by the pump.

In another embodiment, a fuel dispenser includes a housing having fuel dispensing components attached thereto, having a display attached thereto including a graphical user interface (GUI) display space, and an electronics module disposed at least partially therein. The electronics module includes an image sensor, and at least one data processor operatively connected to the display and the image sensor. The at least one data processor receives an image from the image sensor, the image including a visual depiction of at least a portion of a customer. The at least one data processor determines, from the image, a gesture of the customer and modifies, based on the determined gesture, a rendering on the GUI display space.

The fuel dispenser can vary in any number of ways. For example, the at least one data processor can cause enablement of fuel dispensing based on the determined gesture.

For another example, the at least one data processor can render at least one GUI element on the GUI display space and can modify the GUI element based on the determined gesture. In at least some embodiments, modifying the GUI element can include increasing a size of the GUI element, and/or changing a location of the GUI element.

For yet another example, the at least one data processor can classify the gesture. For another example, the at least one data processor can determine the gesture of the customer from the image. For yet another example, the at least one data processor can include circuitry. For still another example, the fuel dispenser can include a memory storing executable instructions, which, when executed by the at least one data processor, perform operations. For another example, the fuel dispensing components can include a fuel pump configured to pump the fuel from a fuel reservoir through the dispenser, and a fuel meter configured to measure an amount of fuel pumped by the pump.

For yet another example, the gesture can be a touchless gesture in which the customer does not touch the fuel dispenser. In at least some embodiments, the touchless gesture can be a hand gesture.

For still another example, the gesture can be a motion of a hand of the customer. In at least some embodiments, the at least one data processor determining the gesture can include the at least one data processor determining a direction of the motion.

For another example, the gesture can be pose of a hand of the customer. In at least some embodiments, the pose includes one of a thumbs up, a thumbs down, and pointing with a finger.

In another embodiment, a fuel dispenser includes a housing having fuel dispensing components attached thereto, having a display attached thereto, and an electronics module disposed at least partially therein. The electronics module includes at least one data processor that is configured to render information on the display for visualization by a customer, receive an input from the customer in response to the information rendered on the display, detect that the input includes a predetermined video trigger, access a video library that includes a plurality of videos playable on the display and select a one of the videos associated with the predetermined video trigger, and cause the selected one of the videos to play on the display.

The fuel dispenser can have any number of variations. For example, the predetermined video trigger can include a request by the customer for assistance on demand. For another example, the predetermined video trigger can include the customer encountering a problem during use of the fuel dispenser. For yet another example, the predetermined video trigger can include the customer providing an invalid input. For another example, the video library can be stored locally at the fuel dispenser. For still another example, the video library can be stored remotely from the fuel dispenser.

In another embodiment, a fuel dispenser includes a housing having fuel dispensing components attached thereto, having a display attached thereto, and an electronics module disposed at least partially therein. The electronics module includes a wireless module, and at least one data processor that initiates a communication session with a vehicle of a customer and renders information on a display attached to the vehicle in real time with the fuel dispenser dispensing fuel to the vehicle.

The fuel dispenser can vary in any number of ways. For example, the information can include progress information of the fuel dispensing. For another example, the information can include an advertisement for a product for sale at a store located at a fueling station where the fuel dispenser is located. For yet another example, the at least one processor can receive at least one vehicle characteristic from the vehicle that identifies the vehicle to the fuel dispenser.

For another example, the electronics module can include an image sensor, and can include an image processor operatively coupled to the image sensor that receives data characterizing an image from the image sensor and determines identity information of the vehicle using the image. In at least some embodiments, the wireless module can communicate with the vehicle in accordance with the determined identity information, the image can include a visual representation of a vehicle and the image processor can identify at least one vehicle feature from the image, and/or the fuel dispenser can determine a make and model of the vehicle using the at least one vehicle feature, e.g., a license plate.

In another embodiment, a fuel dispenser includes a housing having fuel dispensing components disposed therein and an electronics module disposed at least partially therein. The electronics module includes a biometrics reader, and a processor operatively coupled to the biometrics reader that receives biometrics data from the biometrics reader and determines identity information of a customer using the biometrics data, and that causes the fuel dispenser to perform an action using the identity information.

The fuel dispenser can vary in any number of ways. For example, the biometrics reader can be configured to read at least one of a fingerprint, an eye pattern verification, a palm print, DNA, hand geometry, and vein pattern. For another example, the electronics module can include a communication mechanism that transmits the biometrics data to a remote database for determining whether the biometrics data matches a customer identity. For yet another example, the electronics module can determine whether the biometrics data matches a customer identity.

For another example, based on the determined identity information of the customer, a characteristic of the customer including at least one of age, height, gender, and disability status can be identified. In at least some embodiments, the housing can have a display attached thereto, the processor can dynamically reconfigure at least one graphical user interface (GUI) element in the display, and the GUI element can have at least one of a reconfigured location and a reconfigured size determined using the determined characteristic of the customer.

For yet another example, the processor can provide the determined identity information of the customer to a remote processor for determining the customer's identity that includes a name or unique identifier. For another example, the processor can include circuitry. For yet another example, the electronics module can include a memory including executable instructions, which, when executed by the processor, perform operations. For still another example, the fuel dispensing components can include a fuel pump configured to pump the fuel from a fuel reservoir through the dispenser, and a fuel meter configured to measure an amount of fuel pumped by the pump.

In another embodiment, a fuel dispenser includes a housing having a fuel dispensing components module having fuel dispensing components disposed therein, and the housing having an electronics module that is separate from the fuel dispensing components module and that has electronics disposed therein that facilitate payment for fuel dispensing using the fuel dispensing components. The fuel dispenser also includes a display configured to show information thereon for a customer. The display extends from a top of the electronics module to a bottom of the electronics module.

The fuel dispenser can vary in any number of ways. For example, the fuel dispenser can include a reader (e.g., an NFC tap reader or a biometric reader) configured to wirelessly receive an input from a customer, and a processor operatively coupled to the reader that receives data from the reader, that determines identity information of a customer using the data, and that causes the display to show information thereon based on the identity information. In at least some embodiments, the fuel dispenser does not have any electronic components configured to interact with the customer except for the display and the reader.

For another example, the fuel dispensing components can include a fuel pump configured to pump the fuel from a fuel reservoir through the dispenser, and a fuel meter configured to measure an amount of fuel pumped by the pump. For yet another example, the electronics module can include all electronic components on board the fuel dispenser needed to process customer payment for the fuel.

In another embodiment, a fuel dispenser is provided that includes a housing having fuel dispensing components configured to dispense fuel, a display mounted on the housing and configured to display information to a user, a communication module disposed within the housing and configured to wirelessly obtain information from an on-board diagnostic system including information relating to an amount of fuel remaining in a fuel tank of a vehicle, and a processor disposed within the housing and configured to process the information received from an on-board diagnostic system of the vehicle, and configured to cause the display to provide to a user, in real-time, information corresponding to an amount of fuel remaining in a fuel tank of the vehicle.

The fuel dispenser can vary in any number of ways. For example, the communication module can be configured to at least one of wirelessly obtain the information directly from the on-board diagnostic system and wirelessly obtain the information from a cloud that the information from the on-board diagnostic system. For another example, the processor can be configured to cause the display to provide to a user an advertisement for a product for sale at a store located at a fueling station where the fuel dispenser is located. For yet another example, the processor can be configured to cause a display on board the vehicle to provide to a user, in real-time, information corresponding to the amount of fuel remaining in the fuel tank of the vehicle. For still another example, the processor can be configured to cause a display on board the vehicle to provide to a user an advertisement for a product for sale at a store located at a fueling station where the fuel dispenser is located.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

This invention will be more fully understood from the following detailed description taken in conjunction with the accompanying drawings, in which.

DETAILED DESCRIPTION

Figure 1:
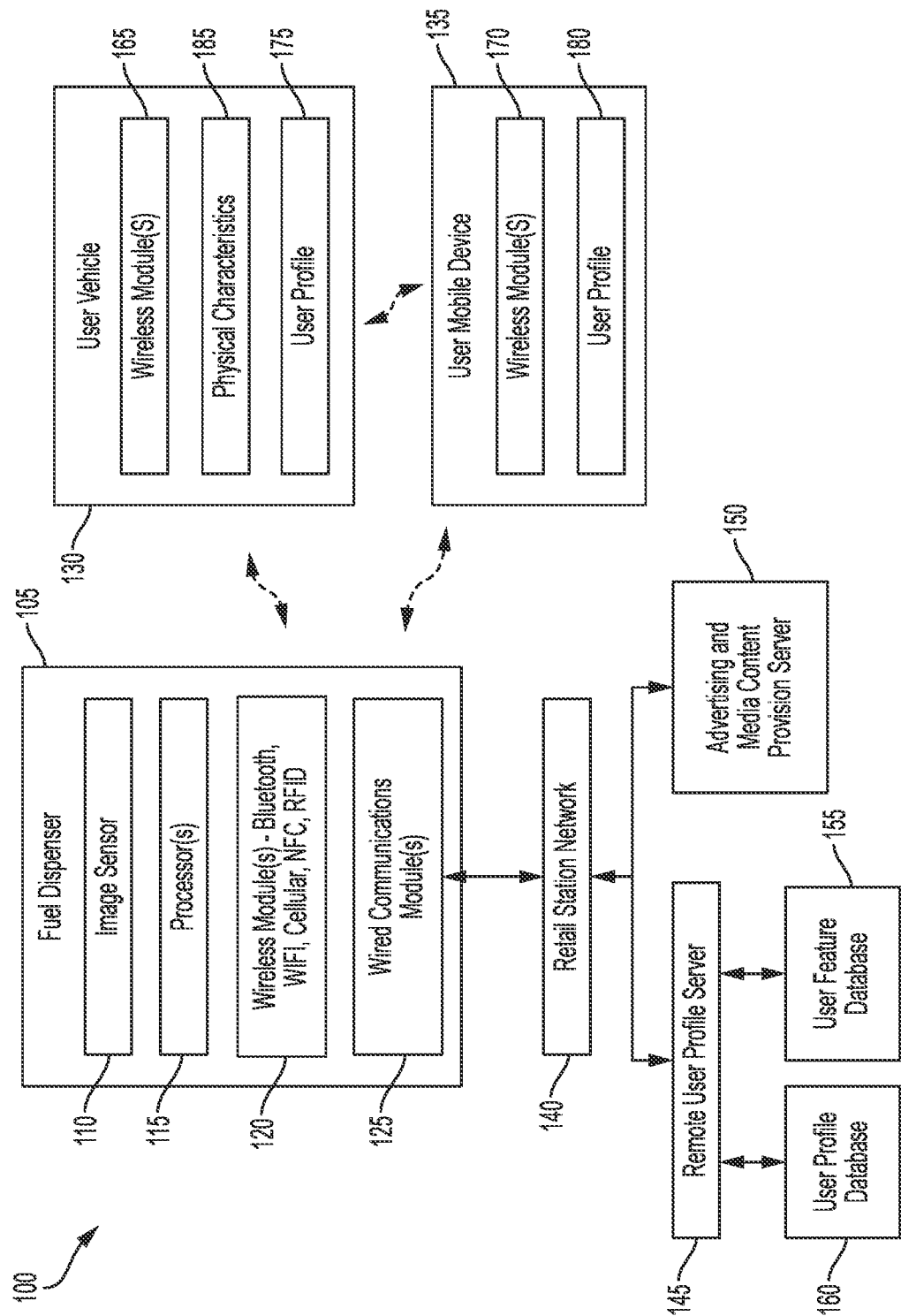
FIG. 1 is a system block diagram illustrating one embodiment of a retail fuel dispensing system.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used. Like reference symbols in the various drawings indicate like elements.

The present disclosure generally relates to an intelligent fuel dispenser that can determine customer identities and/or other characteristics and provide customized fueling sessions based on the determined customer identities and/or other characteristics. In at least some implementations, the fuel dispenser includes a touchless or no-touch interface allowing customers to complete fueling sessions with minimal physical contact with the fuel dispenser.

In at least some implementations, an intelligent fuel dispenser includes an electronics module including an image sensor and a data processor that can perform operations that can, for example, enable any one or more of:

(a) acquiring of images of a customer and determining the customer's identity from the images using facial recognition;

(b) acquiring images of the customer's vehicle and determining identity characteristics of the vehicle (e.g., license plate number, vehicle make/model/year, and the like);

(c) acquiring images of a customer, determining non-facial features of the customer from the images, and determining characteristics of the customer (e.g., age, weight, height, disability status, and the like);

(d) acquiring images of the customer and determining a customer behavior from the images, which can relate to safety, such as determining whether the customer is smoking, grounded, running vehicle engine, nearing a drive-off, and the like;

(e) using the customer identity characteristics, retrieving a corresponding predefined customer profile and enhance fueling experience based on the customer profile;

(f) using the customer profile, prepopulate pre-fueling selections (e.g., preferences);

(g) interacting with a customer's vehicle to display, with the fuel dispenser, vehicle information (e.g., miles per gallon, need of oil change, fuel costs, amount of fuel currently in the vehicle's fuel tank, amount of fuel needed to fill the vehicle's fuel tank based on the amount of fuel currently in the vehicle's fuel tank, and the like);

(h) using the customer profile, present targeted advertisements via the fuel dispenser (e.g., on a display screen thereof);

(i) acquiring images of the customer and provide a gesture-based interface (touchless); and (j) dynamically reconfiguring a fuel dispenser display based on user profile, user identity, non-facial features, vehicle features, disability status, and the like.

The images acquired by the fuel dispenser of the customer and/or the customer's vehicle can be still images or video images.

FIG. 1 is a system block diagram illustrating one embodiment of a retail fuel dispensing system 100. The retail fuel dispensing system 100 includes a fuel dispenser 105 capable of determining customer identities and providing a customized fueling experience. The fuel dispenser 105 is also capable of providing a touchless gesture based interface for interacting with the customer.

The fuel dispenser 105 includes an image sensor 110, data processor(s) 115, wireless module(s) 120, and wired communications module(s) 125. The image sensor 110 can include a digital still or video camera, although other optical sensors are possible. The processor(s) 115 can include one or more processors forming part of at least one computing system. In one embodiment, the processor(s) 115 include at least an image processor and a communications processor. An image processor can receive one or more images from the image sensor 110 and determine identity information of a customer using the images. Identity information can include, for example, a facial feature of a customer, a vehicle feature, a license plate number, a non-facial body feature, and the like.

The wireless module(s) 120 can operatively connect the fuel dispenser 105 with a customer vehicle 130 and/or a customer terminal, which in this embodiment is a customer mobile device 135. The wireless module 120 can include, e.g., a transceiver communicating via Bluetooth protocol, cellular protocol, WIFI protocol, near field communication (NFC), and/or a radio frequency identification (RFID) protocol. The wired communications module 125 operatively connects the fuel dispenser 105 with a remote user profile server 145 and/or an advertising and media content provision server 150 via a retail station network 140. The retail station network 140 can connect multiple fuel dispensers 105 together over a local area network (LAN).

Figure 2:
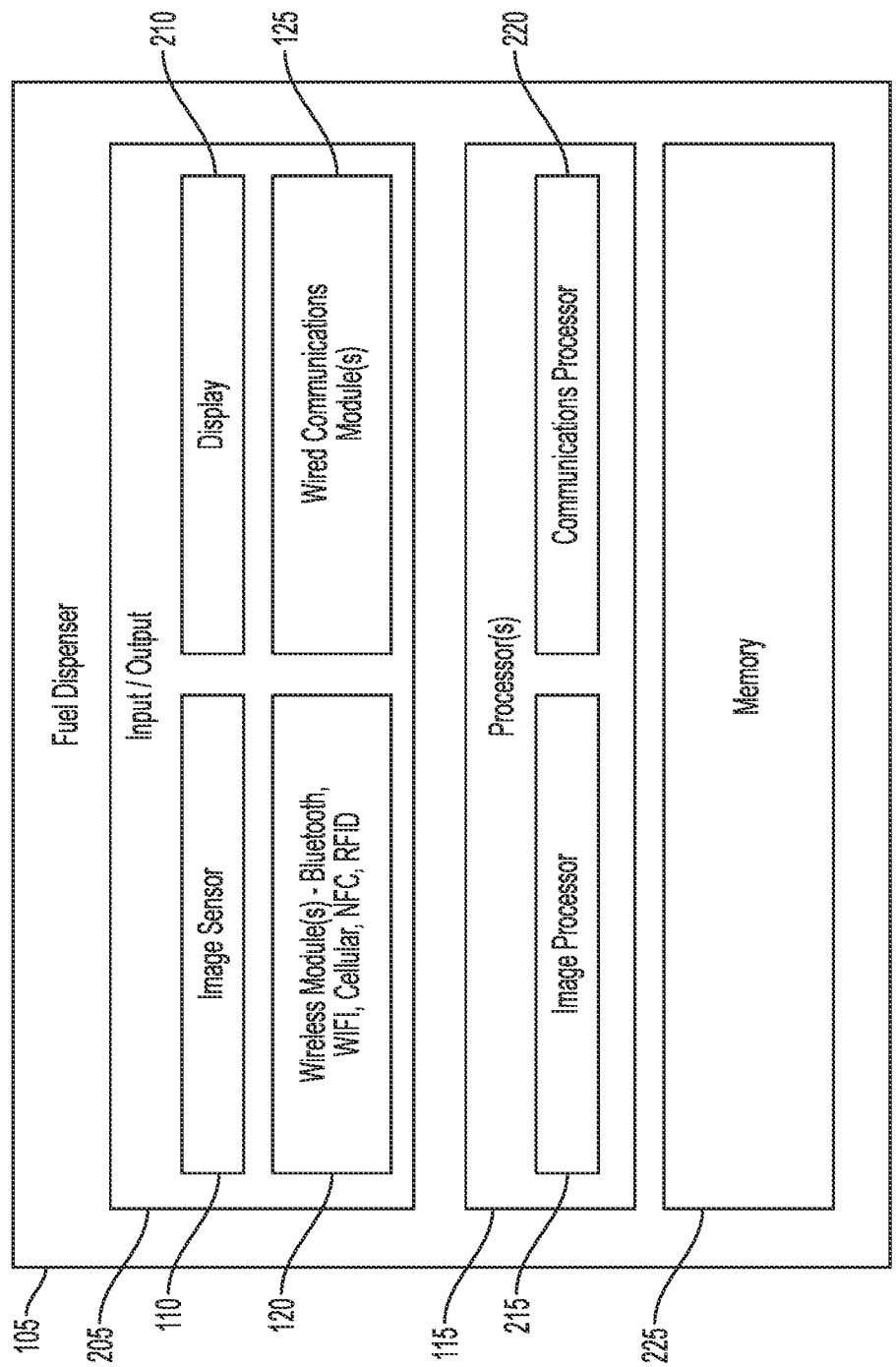
FIG. 2 is a system block diagram of a fuel dispenser in the system of FIG. 1.
Figure 3:
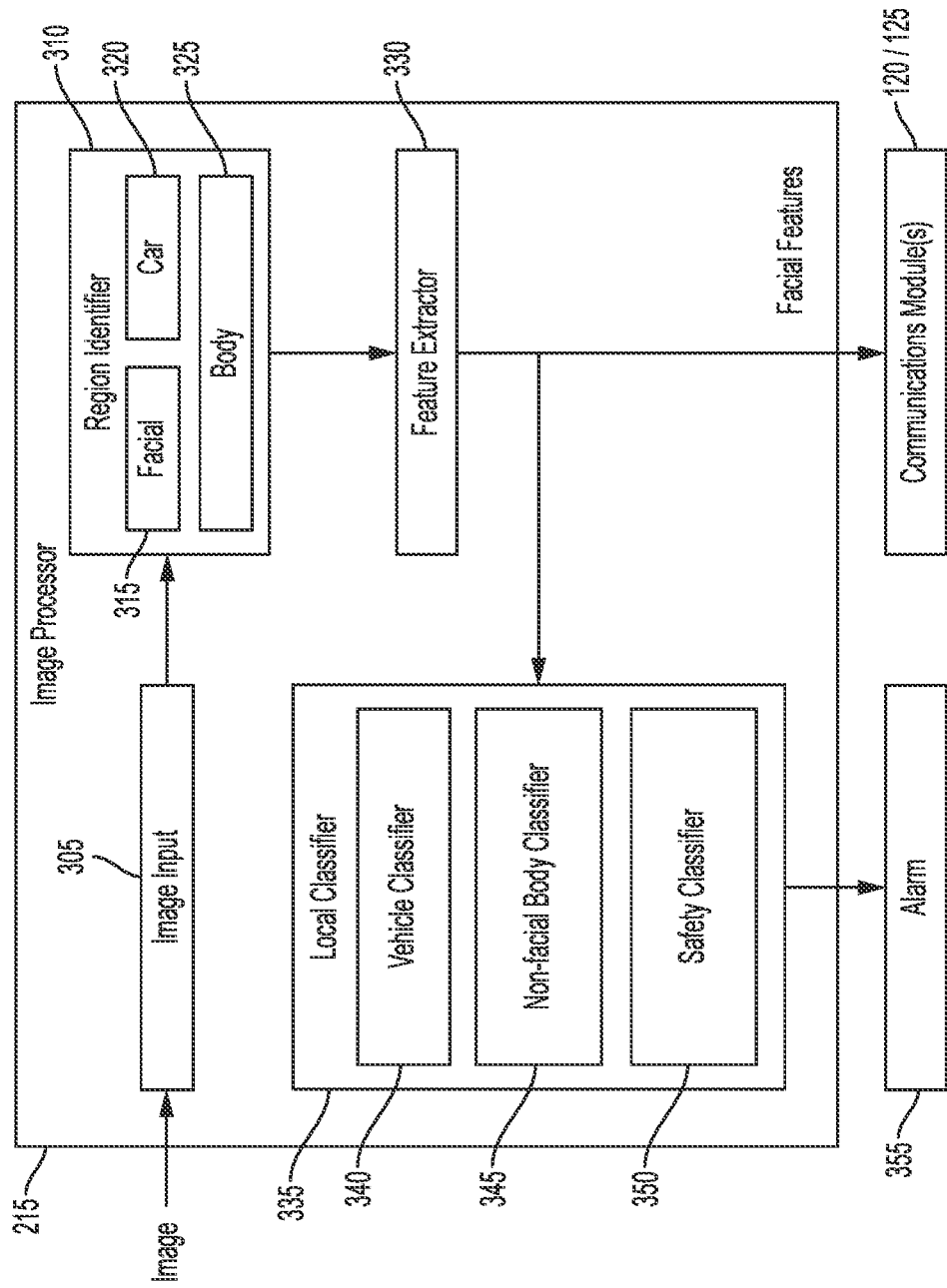
FIG. 3 is a system block diagram of one embodiment of an image processor.

As shown in FIGS. 1 and 2, the fuel dispenser 105 includes input/output modules 205, which can include the image sensor 110, the wireless module(s) 120, the wired communications module(s) 125, and a display 210. The processors 115 can include an image processor 215, which is also shown in FIG. 3, and a communications processor 220. The fuel dispenser 105 includes a memory 225.

The image processor(s) 215 can receive an image from the image sensor 110, for example, when the fuel dispenser 105 detects that a customer is proximate to the fuel dispenser 105 and/or is in the field of view of the image sensor 110. The image can be of the customer (e.g., can contain a visual representation of the customer) and/or the customer's vehicle, for example. The image processor 215 can receive the image by an image input module 305. A region identifier module 310 can include a facial region identifier 315, a vehicle region identifier 320, and/or a body region identifier 325, which analyze the image to determine regions of the image in which the customer's face, body, and/or vehicle reside.

Using one or more of these regions, a feature extractor 330 can determine one or more image features related to the customer's face, body, and/or vehicle. For example, a facial feature can include skin texture; relative position, size, and/or shape of the eyes, nose, cheekbones, and jaw; and the like. Body features can include height, weight, hair color, body shape, and the like. Vehicle features can include shape, color, license plate number, manufacturer/make/model decal, and the like.

In at least some implementations, the image processor 215 includes a local classifier 335 having a vehicle classifier 340, a non-facial body classifier 345, and/or a safety classifier 350. The vehicle classifier 340 can classify (or determine) characteristics of the customer's vehicle based on the vehicle features. These characteristics can include, for example, license plate number, vehicle make, required grade and/or type of fuel for the vehicle, and vehicle model.

The non-facial body classifier 345 can classify (or determine) characteristics of the customer that do not directly derive the customer's identity based on the non-facial body features. For example, the non-facial body classifier 345 can determine a customer's height, weight age, gender, disability status (e.g., in a wheelchair or not in a wheelchair, etc.), and the like.

The safety classifier 350 can classify (or determine) behavior of the customer that relates to safety and is based on an extracted feature. For example, the safety classifier 350 can determine whether the customer is smoking, whether the customer is grounded prior to dispensing fuel, whether the vehicle engine is running during fueling, and whether the customer is about to "drive-off" (which can include leaving the fuel retailer without paying for fuel). Other determinations can include environmental, mechanical, electrical, and/or logical instruction conditions, such as, for example, temperature, pressure, humidity, fuel leaks, open panels, dispenser intrusion, power irregularities, watchdog timer expiration, and software exceptions. Based on the determination of the safety classifier 350, an alarm 355 can be generated. The alarm 355 can include a warning (e.g., signal, audio, light, and the like) to an attendant at a site of the dispenser 105, an audible sound emanating from the dispenser 105, a warning on the display 210 of the dispenser 105 indicating that fuel cannot be dispensed until the detected problem is corrected, and the like. Generating the alarm 355 can include causing a corrective action to be performed, for example, restarting the fuel dispenser 105 (e.g., in the event that a mechanical, electrical, and/or logical problem with the dispenser 105 is detected by the safety classifier 350), shutting down the fuel dispenser 105 (e.g., in the event that an unsafe condition is detected by the safety classifier 350, such as the customer smoking before or during fueling, the customer not being grounded prior to dispensing fuel, the vehicle engine running during fueling, or a mechanical, electrical, and/or logical problem with the dispenser 105 being detected that cannot be fixed without manual intervention), downloading instructions for the fuel dispenser 105 (e.g., to correct a mechanical, electrical, and/or logical problem with the dispenser 105), and/or generating notifications for other components at the fueling facility that includes the fuel dispenser 105 (e.g., in the event an unsafe condition is detected by the safety classifier 350 that may affect safe functioning one or more other fuel dispensers at the facility).

In at least some implementations, the facial features are conveyed via the dispenser's communications module(s) (wireless module(s) 120 and/or wired communications module(s) 125) to the remote user profile server 145, as described more fully below.

Referring again to FIG. 1, the fuel dispenser 105 can transmit the facial features, e.g., the sensed image, to a remote user profile server 145 in order to match the customer with a known customer identity. The remote user profile server 145 can receive the facial features and access a database 155 (which may include one or more databases) containing known customer features. The database 155 can contain features of customers that have previously visited the retail fuel dispenser 105 or that have previously enrolled in a customer rewards program associated with the facility providing the fuel dispenser 105 and provided an image of their face in association with the program. The database 155 can also associate unique identities (e.g., names or unique identifiers) with known facial features, e.g., in a table. The remote user profile server 145 can compare the received facial features with the features in the database 155 to find a match. If and once a match is found, the remote user profile server 145 can use the associated customer identifier to query a user profile database 160. The user profile database 160 can contain user profiles for each known customer in the feature database 155 (which may include one or more databases). User profiles can include fueling preferences (e.g., preferred fuel grade, fuel type, payment method, loyalty rewards identifier, whether to apply loyalty rewards to a present purchase, whether to purchase a car wash, and the like). The user profile and/or identity can be transmitted from the remote user profile server 145 to the fuel dispenser 105.

The user profile and/or identity may be received by the communications processor 220 and can be stored in the memory 225. The user profile can be used by the communications processor 220 to provide a customized fueling experience. For example, the user profile can be accessed and the fuel dispenser 105 can be configured with the customer's preferences. This can include rendering, on the display 210, a preference selection screen populated with the customer's fueling preferences as specified in the user profile. In at least some implementations, the fuel dispenser 105 can render on the display 210 a personalized greeting.

In at least some implementations, identity information can be received by the communications processor 220. The identity information can include a name or unique identifier of the customer. This identity information can be used by the communications processor 220 to acquire the user profile from the remote user profile server 145. In at least some implementations the identity information can include, for example, facial features of the customer, vehicle features, license plate number, non-facial body features, and the like.

In at least some implementations, the user identity can be provided to an advertising and media content provision server 150, which can provide customized or targeted advertisements and content to the fuel dispenser 105 for provision to the customer during fueling, e.g., by displaying the advertisements and content on the display 210. For example, once the user identity is determined, advertisements can be dynamically determined and provided.

The advertisements can be pre-specified by remote merchants. Remote merchants can be any appropriate sellers of goods and/or services. For example, a merchant may sell durable goods (e.g., vehicle parts, toys, etc.), perishable goods (e.g., food, drink, etc.), intangible goods (e.g., software, digital media, etc.), or services (e.g., oil changes, car washes, etc.). Remote merchants can include any appropriate computer systems (e.g., servers and databases) for allowing them to send data regarding their goods and/or services over a communication network to fuel dispensers. Remote merchants can operate proactively, interactively, and/or passively with fuel dispensers to market and/or sell their goods and/or services. For example, the remote merchants can download merchandising content (advertisements and pricing data) to the fuel dispensers at designated times or events, or the remote merchants can download merchandising content to the fuel dispensers upon request. In at least implementations, the remote merchants can maintain a Web portal through which the fuel dispensers can download the content. As discussed herein, remote merchants are remote in the sense that they are not located at the retail fueling facility that includes the fuel dispensers to which the remote merchants provide advertisements and/or other content. Thus, the remote merchants can be located in the neighborhood of the retail fueling facility. One or more of the merchants, of course, could be located at greater distances (e.g., across the state or country) from the retail fueling facility.

Dynamic advertisements can include a listing of goods and/or services, along with descriptions and pricing information. The advertisements can include text, graphics, audio, and/or video for presentation at the fuel dispenser.

Using the user profile and/or user identity information, fuel dispensers can determine when to present the merchant data. For example, a fuel dispenser may present the data (e.g., on a display thereof) at certain points of a fueling session (e.g., while fuel is being dispensed or after fuel dispensing is complete). The fuel dispenser can then determine whether the customer indicates interest in the merchant data (e.g., by detecting user input regarding the presented data). If the fuel dispenser detects user interest in merchant data, the fuel dispenser can present additional information regarding the goods and/or services and determine whether the customer desires to order a good and/or service. Additional information regarding goods or services can include textual descriptions, images, audio, and/or video.

If a customer desires to order a good and/or service, the fuel dispenser can acquire order data (e.g., quantity, price, and delivery information) or the order data can be included or inferred from the customer's user profile. The fuel dispenser can also acquire payment data or payment data may be included or inferred from the user profile. The fuel dispenser can also evaluate whether the payment data is sufficiently complete. If the payment data is acceptable, the fuel dispenser can then generate a message for the appropriate remote merchant regarding the order and payment information and generate a receipt for the customer. The appropriate merchant can then make arrangement for delivery of the good and/or service.

One example of a good that can be ordered from a fuel dispenser is a pizza. A fuel dispenser customer could, for instance, order a pizza while fueling their vehicle by providing input to the fuel dispenser, e.g., by interacting with a display of the fuel dispenser and/or providing payment data thereto via credit card or other payment mechanism. The customer could then pick the pizza up on the way to their destination (e.g., their house) or have the pizza delivered to their destination (e.g., their work). Other examples include ordering goods from the fuel station merchant, catalog merchants, Internet retailers, or traditional retailers.

To facilitate customer interaction in at least some embodiments, the user profile can include customer-related data. The customer-related data can, for example, be associated with a customer identifier (e.g., a credit card number, a personal identification number (PIN), a telephone number, a radio frequency identifier (RFID) number, or a loyalty program number). The customer-related data can be information regarding a fueling session (e.g., a type of fuel, a display language for the fuel dispenser display, audio settings for the fuel dispenser, or payment preferences (e.g., certain credit card, certain debit card, cash to be paid at a staffed payment terminal, etc.)), data regarding services at the fueling facility (e.g., car wash, air pump, or water hose), or data regarding the customer (e.g., address and preferred payment types). In at least some implementations, the customer-related data can be used to identify other information that may be of interest to the customer. For example, particular types of merchandise (e.g., drinks, newspapers, or food) or offers (e.g., coupons or advertising) can be presented to the customer based on customer-related data. This presentation can, for example, be based on the customer's past purchasing habits in a fueling facility store. The customer-related data can be acquired from the user profile and/or from a remote server using the customer identity.

Referring again to FIGS. 1 and 2, in at least some implementations, one or more of the user profile (e.g., customer preferences), vehicle characteristics (license plate number, vehicle make, vehicle model, and the like), and non-facial body characteristics (e.g., a customer's height, weight age, gender, disability status, and the like) can be used to dynamically re-arrange a graphical user interface (GUI) rendered on the display 210. For example, if the fuel dispenser 105 determines that the customer is disabled and in a wheel chair, the GUI can rearrange so that higher importance GUI elements are rendered lower on the display (and thus easier for the disabled individual to read and/or touch via touchscreen). The dynamic re-arrangement of GUI elements can include reconfiguring one of a location and a size.

In at least some implementations, the user profile can be used to alter a color theme on the display 210. For example, the user profile can indicate the user's pre-selected color theme, and the display 210 can switch to that pre-selected color theme if not already displaying information using that color style. For another example, the user profile can indicate that the user is colorblind, and the display 210 can switch to a high contrast color theme, such as a black and white theme or a grayscale theme, to facilitate visibility of all portions of the display 210 to the colorblind user.

In at least some implementations, the fuel dispenser 105 can receive the user profile directly from the customer's vehicle 130 and/or the mobile device 135. Each of the customer's vehicle 130 and the mobile device 135 can include wireless module(s) 165, 170 (respectively) in communication with one another and/or with the wireless module(s) 120 of the fuel dispenser 105. Communications between the vehicle 130 and the fuel dispenser 105 can use an on-board diagnostics (OBD) mechanism of the vehicle 130, e.g., OBDII technology in which the vehicle 130 includes an OBDII port (cars manufactured after 1996 have an OBDII port). A copy of the user profile 175 can be contained on the customer's vehicle (for example, a smart vehicle having at least one data processor forming part of at least one computing system with the user profile stored in a memory of the at least one computing system) and/or a copy of the user profile 180 can be contained on the customer's mobile device 135 (e.g., in a memory thereof). When the fuel dispenser 105 detects that the customer is proximate thereto (for example, via the image sensor 110 and/or the wireless module(s) 120), the wireless module(s) 120 can initiate a communication session with the customer's vehicle 130 and/or the mobile device 135 and retrieve the customer's user profile. Once the user profile is received directly from the customer's vehicle 130 or the mobile device 135, the customized fueling experience can be provided as described above.

In at least some implementations, the fuel dispenser 105 can receive vehicle characteristics or metrics directly from the customer's vehicle 130. For example, the vehicle 130 can monitor driving performance and diagnostics, which can be provided to the fuel dispenser 105 for display on the display 210 during a fueling session. The fuel dispenser 105 can receive physical characteristics 185 of the vehicle from the customer's vehicle 130. The physical characteristics 185 can include miles per gallon achieved by the vehicle 130, fuel cost, whether the vehicle 130 is in need of maintenance, a type of maintenance, amount of fuel currently in the vehicle's fuel tank, amount of fuel needed to fill the vehicle's fuel tank based on the amount of fuel currently in the vehicle's fuel tank, and the like. In at least some implementations, fuel cost, amount of fuel needed to fill the vehicle's fuel tank based on the amount of fuel currently in the vehicle's fuel tank, and/or whether the vehicle 130 is in need of maintenance and the type of maintenance can be determined by the fuel dispenser 105 from the received physical characteristics 185. The fuel dispenser 105 can render on the display 210 characteristics of the received and/or determined characteristics. For example, the amount of fuel needed to fill the vehicle's fuel tank may be indicated on the display 210 by a predicted cost of filling the tank using a particular grade of fuel. For another example, the vehicle's gas gauge can be shown on the display 210 showing a real time change in the gauge as the vehicle is fueled by the dispenser 105, which may in turn indicate a time remaining for the fueling session.

In at least some implementations, the fuel dispenser 105 can provide a touchless interface. Providing a touchless interface may allow the customer to minimize or avoid touching the fuel dispenser 105, which may have dirt, toxins (e.g., fuel residue, etc.), and/or germs thereon that could be transferred to the customer by touch. The image sensor 110 can acquire images of the customer. From the images, a gesture of the customer can be classified (or determined) and a graphical user interface (GUI) display space of the display 210 can be modified based on the gesture. Alternatively or additionally the fuel dispenser 105 can include a motion sensor (e.g., a Kinect motion sensor, a Leap Motion motion sensor, etc.), which can include one or more motion sensors, that can acquire customer motion data. From the customer motion data, a gesture of the customer can be classified (or determined) and the GUI display space of the display 210 can be modified based on the gesture.

For example, a "thumbs up" gesture may indicate a positive response and can cause initiation of fueling. The gesture can interact with the GUI, for example, by selecting GUI elements (e.g., selecting "yes", "no", or "cancel") on a payment screen on the display 210. In at least some implementations, a gesture can provide for zooming within the GUI (resulting in increasing the size of one or more GUI elements) or re-arrangement of GUI elements (resulting in changing a location of one or more GUI elements).

Figure 4:
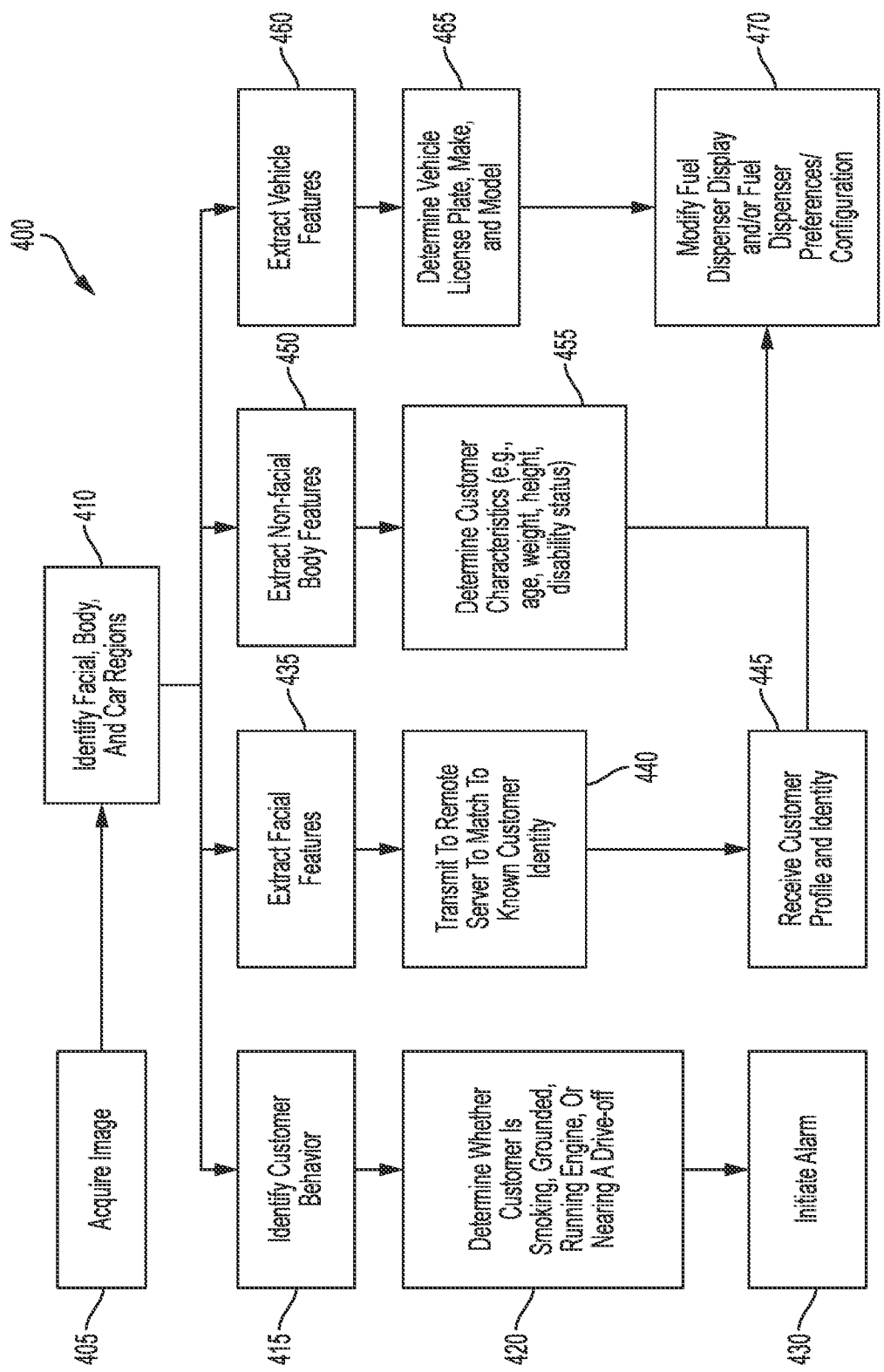
FIG. 4 is a process flow diagram illustrating one embodiment of a method for fuel dispensing.

FIG. 4 is a process flow diagram illustrating one embodiment of a method 400 for fuel dispensing. At step 405, a fuel dispenser (e.g., the fuel dispenser 105 of FIG. 1 or any of the other fuel dispensers described herein) having an image sensor can acquire an image (which can, as mentioned above, include one or more images and can include still images and/or video images). The fuel dispenser (e.g., a processor thereof) can, at step 410, identify facial, body, and vehicle regions within the image. At step 415, the fuel dispenser (e.g., a processor thereof) can identify customer behavior from the image by analyzing features within the image. At step 420 and based on the customer behavior, the fuel dispenser (e.g., a processor thereof) can determine whether the customer is smoking, grounded, running the vehicle engine, or nearing a drive-off. At step 430, if it is determined that the customer's is smoking, is not grounded, is running the vehicle engine, and/or is nearing a drive-off the fuel dispenser (e.g., a processor thereof) can initiate an alarm.

At step 435, the fuel dispenser (e.g., a processor thereof) can extract facial features from the image (e.g., facial region of the image) and, at step 440, transmit the features to a remote server to match to a known customer identity. If the facial features match a known customer identity, an associated customer profile and identity can, at step 445, be received by the fuel dispenser from the remote server.

At step 450, the fuel dispenser (e.g., a processor thereof) can extract non-facial body features from the image (e.g., body region of the image). Using the extracted non-facial body features, at step 455, the fuel dispenser (e.g., a processor thereof) can determine customer characteristics such as age, weight height disability status, and the like.

At step 460, the fuel dispenser (e.g., a processor thereof) can extract vehicle features from the image (e.g., vehicle region of the image). Using the extracted vehicle features, at step 465, the fuel dispenser (e.g., a processor thereof) can determine the license plate, vehicle make and vehicle model.

At step 470, the fuel dispenser (e.g., a processor thereof) can modify display and/or fuel dispenser preferences or configuration according to the customer profile, identity, characteristics, and/or vehicle characteristics.

As shown in FIG. 4, each of step 415 (identifying customer behavior), step 435 (extracting facial features), step 450 (extracting non-facial body features), and step 460 (extracting vehicle features) are independent determinations by the fuel dispenser (e.g., by a processor thereof). Accordingly, the fuel dispenser can be configured to perform all of the steps 415, 435, 450, 460 or to perform only a subset thereof (e.g., only one, two, or three of the steps 415, 435, 450, 460).

Figure 5:
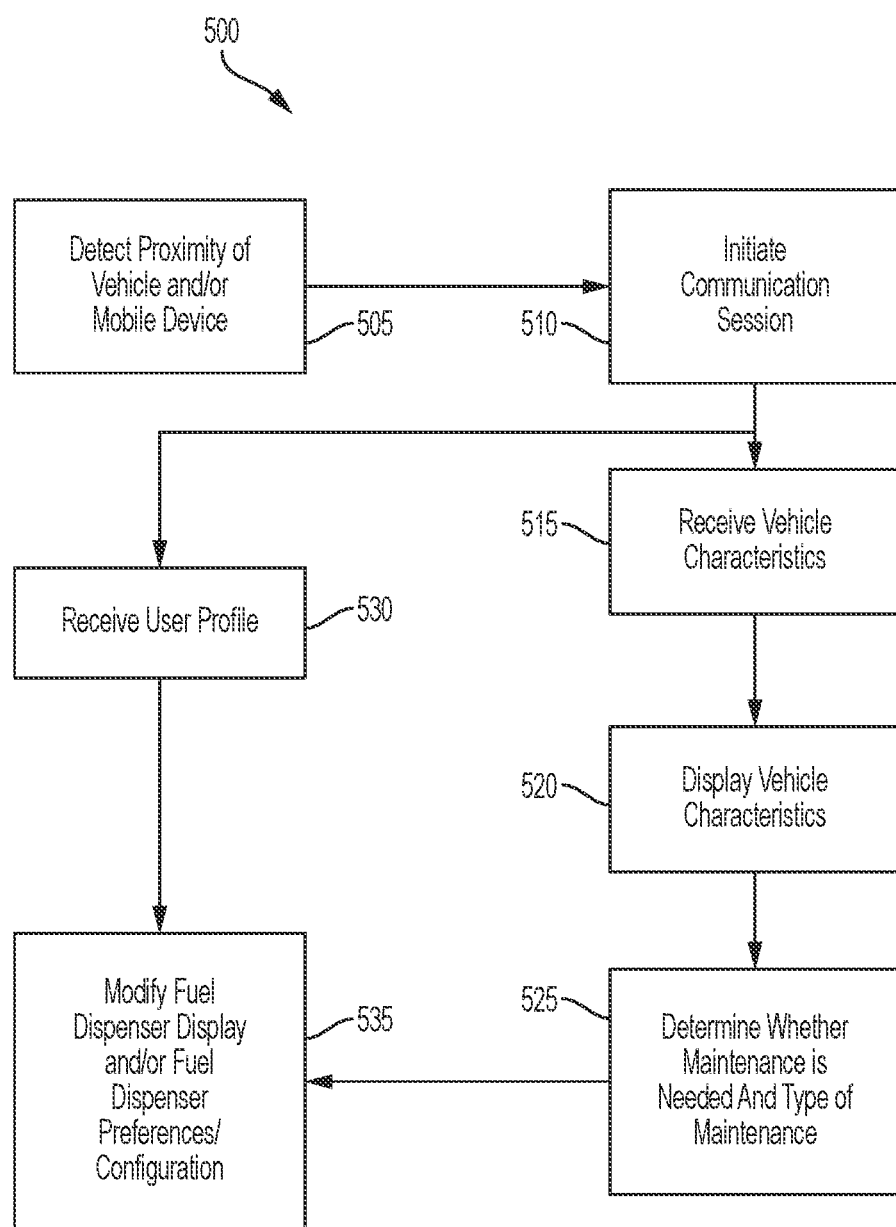
FIG. 5 is a process flow diagram illustrating one embodiment of another method for fuel dispensing.

FIG. 5 is a process flow diagram illustrating another embodiment of a method 500 for fuel dispensing. At step 505, a fuel dispenser (e.g., the fuel dispenser 105 of FIG. 1 or any of the other fuel dispensers described herein) can detect the proximity of a vehicle and/or a customer terminal such as a mobile device. At step 510, the fuel dispenser can initiate a communication session with the vehicle and/or the customer terminal and via wireless communications module(s) of the dispenser. At step 515, the fuel dispenser can receive from the vehicle and/or the customer terminal vehicle characteristics, including miles per gallon, need of oil change, fuel costs, and the like. At step 520, the fuel dispenser can display these vehicle characteristics to the customer (e.g., a processor of the dispenser can cause the characteristics to be shown on a display of the dispenser), and at step 525 the fuel dispenser (e.g., a processor thereof) can determine whether maintenance is needed and a type of maintenance.

At step 530, the fuel dispenser (e.g., a processor thereof) can receive a user profile from the vehicle and/or the customer terminal. At step 535, the fuel dispenser can modify the display and/or preferences and/or configuration (e.g., a processor thereof can cause the modification).

Figure 6:
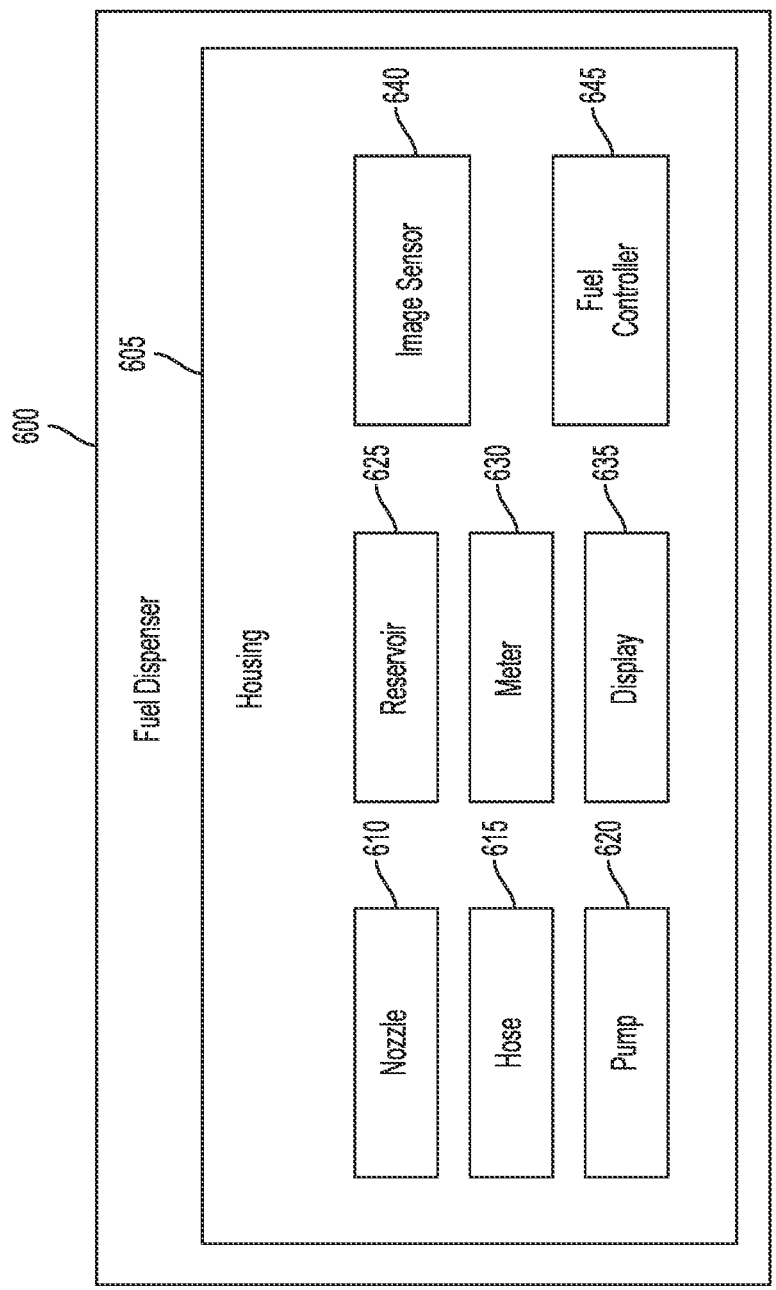
FIG. 6 is a system block diagram of another embodiment of a fuel dispenser.

FIG. 6 is a system block diagram of another embodiment of a fuel dispenser 600 that can be configured and used as described for any of the various embodiments described herein. The fuel dispenser 600 includes a housing 605 having a display 635, an image sensor 640, and fuel dispensing components including a fuel pump 620 (which can be external to the housing 605) to pump the fuel from a fuel reservoir 625 (which can be external to the housing 605) to a nozzle 610, and a fuel meter 630 to measure an amount of fuel pumped by the fuel pump 620. The dispenser can also include one or more of a nozzle 610 to dispense fuel, and a hose 615 to deliver the fuel to the nozzle 610. The display 635 can include a graphical user interface (GUI) display space. The fuel dispenser 600 can also include a fuel controller 645.

The fuel dispenser 600 can have single or multiple hose configurations. Depending on its configuration, the fuel dispenser 600 can dispense one or more products (e.g., gasoline and diesel, gasoline only, etc.). The fuel dispenser 600 can operate in cooperation with a facility controller and store interface unit to dispense fuel. In doing so, the fuel dispenser 600 can recognize when a customer is present (e.g., as described above using image sensor, by detecting activation of an input device, or removal of the nozzle 610) and notify a facility controller, which can then obtain payment information from the customer, authenticate the customer, and allow fuel dispensing to begin. The fuel dispenser 600 can communicate the dispensed amount of fuel to the facility controller, which can complete the sales transaction when the customer is finished dispensing fuel. The fuel dispenser 600 can, however, operate independently of the facility controller and/or the store interface unit for certain tasks and/or periods of time.

The fuel controller 645 controls the dispensing of fuel from the fuel dispenser 600. The fuel controller 645 can control hydraulic elements of the dispenser 600 necessary to carry out fuel dispensing operations. For example, the fuel controller 645 can control a hydraulics blender capable of providing custom octanes, e.g., not just classic 87, 89, 93 for Unleaded gasoline, on request by the customer. For another example, the fuel controller 645 can control submersible fuel pumps 620 in fuel storage tanks or fuel reservoirs 625 and fuel control valves and monitor fuel flow information via metering and reporting sub systems. The fuel controller 645 can track the volume of fuel dispensed totals by grade, drive sale progress displays on the sales/volume displays, and monitor for errors. The fuel controller 645 can be implemented in software, hardware, or a combination thereof.

Figure 7:
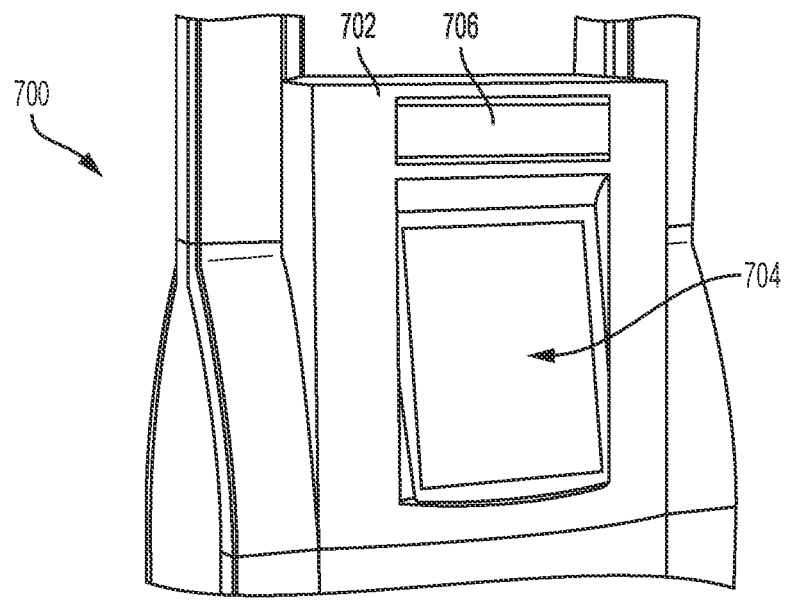
FIG. 7 is a perspective partial view of one embodiment of a fuel dispenser.
Figure 8:
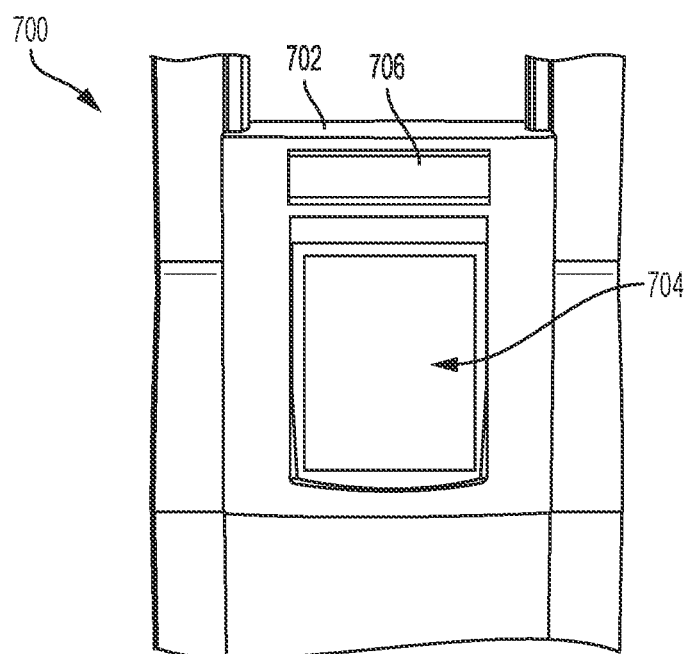
FIG. 8 is a front view of the fuel dispenser of FIG. 7.

FIGS. 7 and 8 illustrate another embodiment of a fuel dispenser 700 that can be configured and used as described for any of the various embodiments described herein. Only an intermediate portion of the fuel dispenser 700 is illustrated, e.g., top and bottom portions of the fuel dispenser are omitted. The fuel dispenser 700 includes a housing 702, a display 704 attached to the housing 702, electronics (not shown) (e.g., a processor, a memory, wireless module(s), etc.) disposed within the housing 702, an information panel 706 to facilitate payment and/or fueling (e.g., by including a card reader, by showing amounts of fuel pumped in a fueling session, by showing prices of different grades of fuel, by including image sensor(s), by including motion sensor(s), etc.), and fuel dispensing components (not shown) (e.g., a pump, a fuel meter, a nozzle, a hose, etc.) attached to and/or disposed in the housing 702. The display 704 includes a GUI display space and is a flexible touchscreen.

Figure 9:
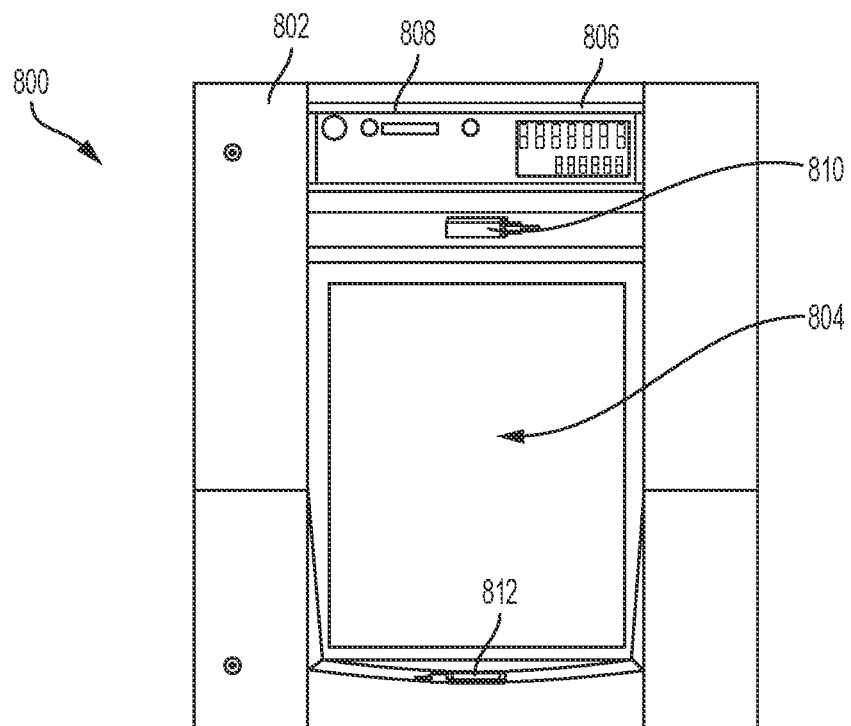
FIG. 9 is a front partial view of another embodiment of a fuel dispenser.
Figure 10:
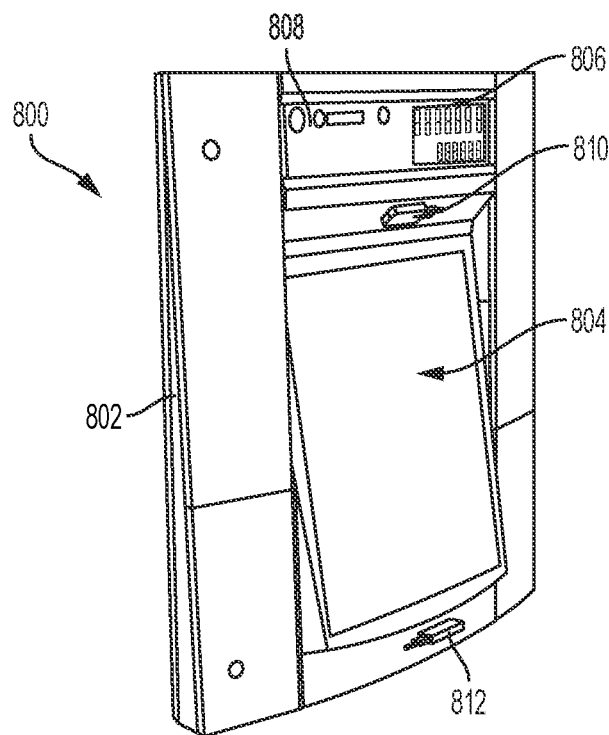
FIG. 10 is a perspective view of the fuel dispenser of FIG. 9.
Figure 11:
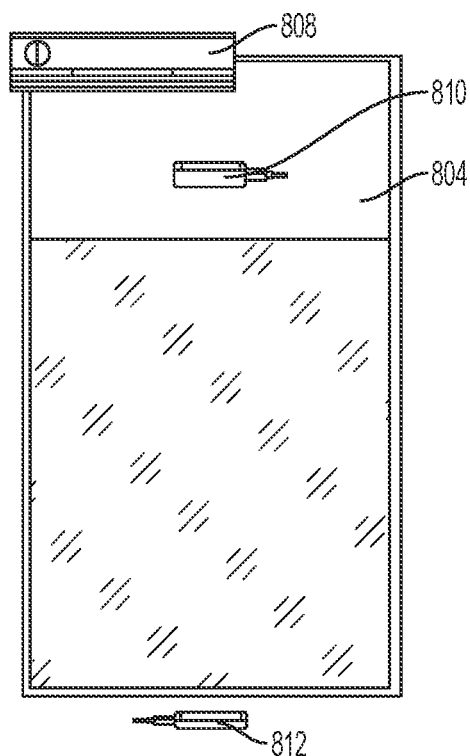
FIG. 11 is a front view of a display and sensors of the fuel dispenser of FIG. 9.
Figure 12:
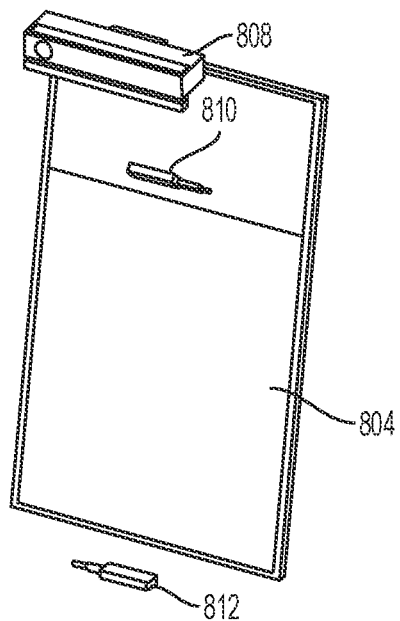
FIG. 12 is a perspective view of the display and sensors of the fuel dispenser of FIG. 11.

FIGS. 9 and 10 illustrate yet another embodiment of a fuel dispenser 800 that can be configured and used as described for any of the various embodiments described herein. Only a partial portion of an intermediate portion of the fuel dispenser 800 is illustrated, e.g., top, back, and bottom portions of the fuel dispenser are omitted. The fuel dispenser 800 includes a housing 802, a display 804 attached to the housing 802, electronics (not shown) (e.g., an image sensor, a processor, a memory, wireless module(s), etc.) disposed within the housing 802, an information panel 806 to facilitate payment and/or fueling, and fuel dispensing components (not shown) (e.g., a pump, a fuel meter, a nozzle, a hose, etc.) attached to and/or disposed in the housing 802.

Figures 13, 14:
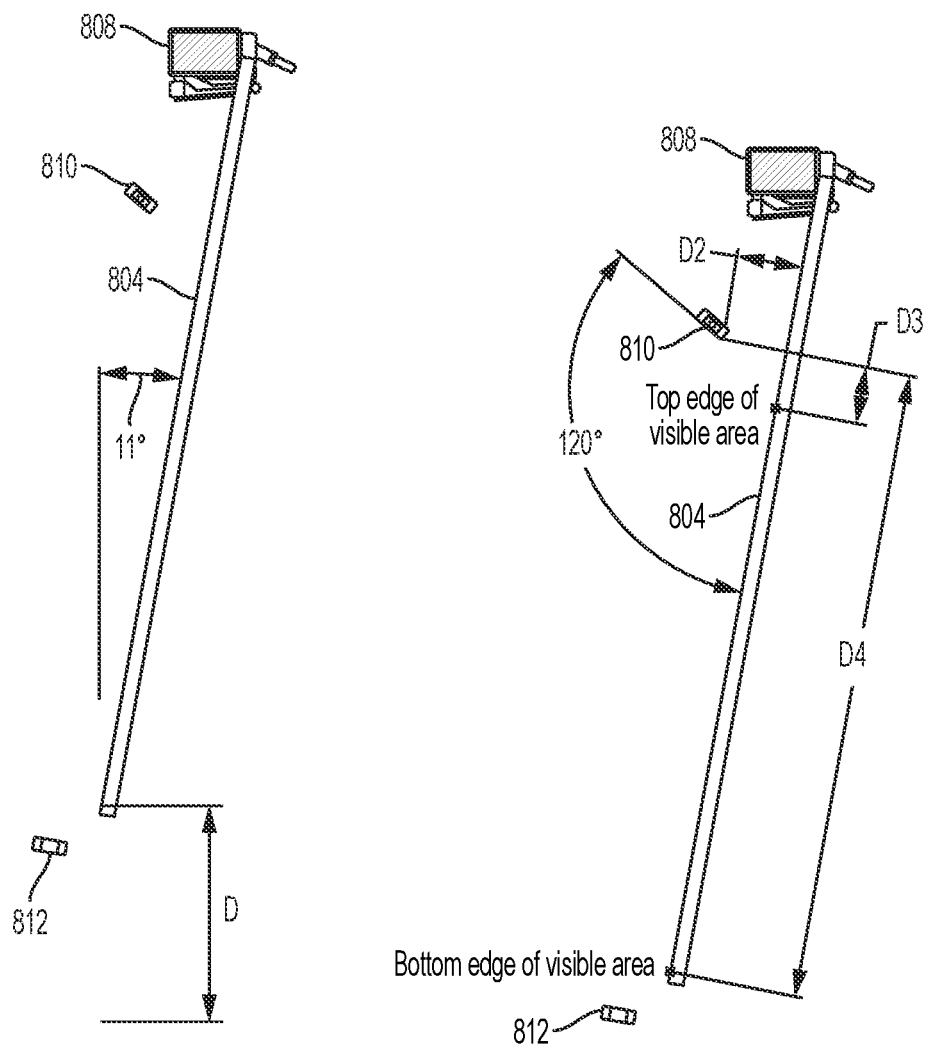
FIG. 13 is a side view of the display and sensors of the fuel dispenser of FIG. 11.
FIG. 14 is another side view of the display and sensors of the fuel dispenser of FIG. 11.

The display 804 includes a GUI display space. The display 804 in this illustrated embodiment is a 32" 4K high definition (HD) monitor, but other sizes and types of displays are possible. The display 804 is partially obscured by the information panel 806, as best shown in FIGS. 11-17, with FIG. 14 indicating top and bottom edges of a visible area of the display 804. The visible area of the display 804 is about 400×510 mm in this illustrated embodiment, but other visible areas are possible. In an exemplary embodiment, a distance D (see FIG. 13) between the bottom edge of the visible area of the display 804 and the ground is about 850 mm, but other distances are possible. This distance being about 850 mm may facilitate optimal positioning of images, text, video, etc. on the display 804 for customers of varying heights and regardless of whether a customer is standing on their feet or sitting in a wheelchair. The display 804 attached to the housing 802 is titled at an angle (11° in this illustrated embodiment, as shown in FIG. 13). This tilting may facilitate mounting of the dispenser's motion sensors 808, 810, 812 at optimal positions to collect customer motion data.

As shown in FIGS. 9-17, the dispenser 800 includes a first motion sensor 808 in the form of a Kinect motion sensor and second and third motion sensors 810, 812 each in the form of Leap Motion motion sensors. In other embodiments, only a Kinect motion sensor maybe used, only the Leap Motion motion sensors (or only one thereof) may be used, or other type(s) of motion sensors may be used. Providing more than one motion sensor may provide redundancy in the case of failure and/or allow verification of sensed motion. Providing only one motion sensor may be cost efficient.

Figure 16:
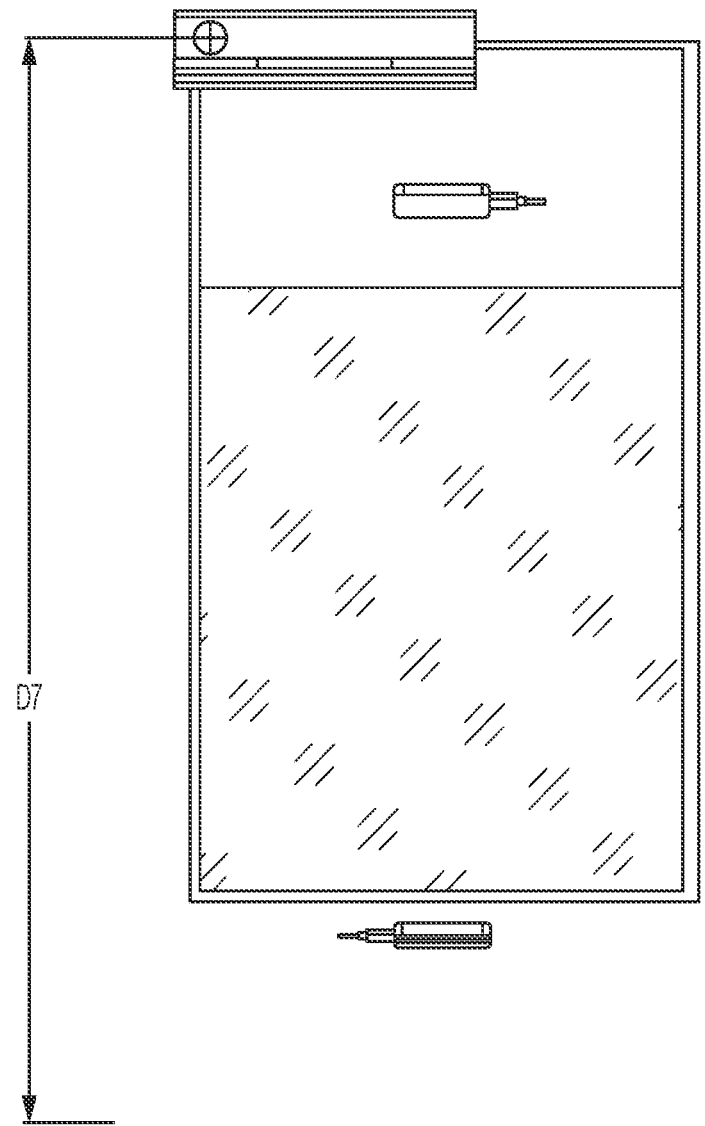
FIG. 16 is another front view of the display and sensors of the fuel dispenser of FIG. 11.
Figure 17:
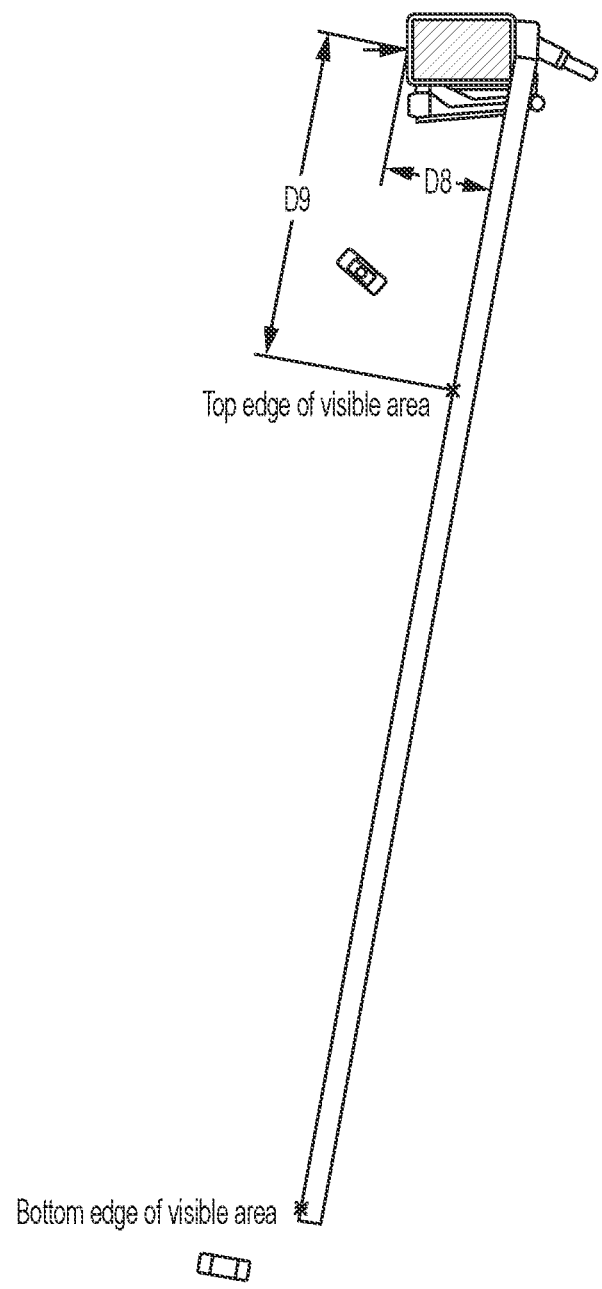
FIG. 17 is still another side view of the display and sensors of the fuel dispenser of FIG. 11.

The first motion sensor 808 is mounted at a top of the display 804 in the nonvisible area thereof at the information panel 806 and is mounted to look normal to a plane perpendicular to the ground. The first motion sensor 808 is mounted, as shown in FIGS. 16 and 17, at a distance D7 (see FIG. 16) from the ground, at a distance D8 (see FIG. 17) from a face of the display 804, and at a distance D9 above the top edge of the visible area of the display 804. The distance D7 is about 1550 mm, the distance D8 is about 65 mm, and the distance D9 is about 200 mm in this illustrated embodiment, but other distances are possible. The case of the Kinect motion sensor is modified from its standard configuration to allow for clearance of the display 804 to which it is attached, as best shown in FIG. 17.

The second motion sensor 810 is mounted to the housing 802 below a bottom of the information panel and above the visible area of the display 804 at a distance D2 from the face of the display 804. The distance D2 is about 60 mm in this illustrated embodiment (see FIG. 14), but other distances are possible. The second motion sensor 810 is mounted at an angle (120° in this illustrated embodiment, as shown in FIG. 14) relative to a face of the display 804, at a distance D3 above the top edge of the visible area of the display 804, and at a distance D4 above the bottom edge of the visible area of the display 804 (which is also the bottom edge of the display 804). The distance D3 is about 50 mm and the distance D4 is about 560 mm in this illustrated embodiment (see FIG. 14), but other distances are possible.

Figure 15:
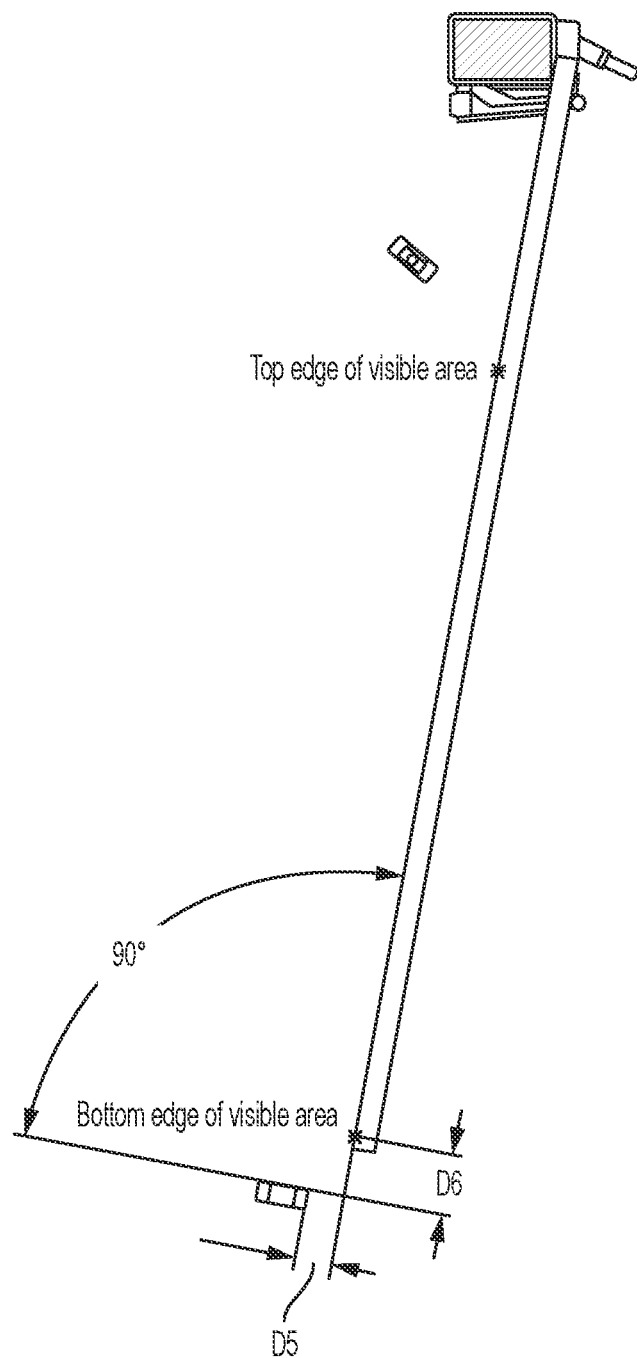
FIG. 15 is yet another side view of the display and sensors of the fuel dispenser of FIG. 11.

The third motion sensor 812 is, as shown in FIG. 15, mounted at a right angle relative to the face of the display 804, at a distance D5 from the face of the display 804, and at a distance D6 from the bottom edge of the visible area of the display 804. The distance D5 is about 25 mm and the distance D6 is about 40 mm in this illustrated embodiment, but other distances are possible.

Figure 18:
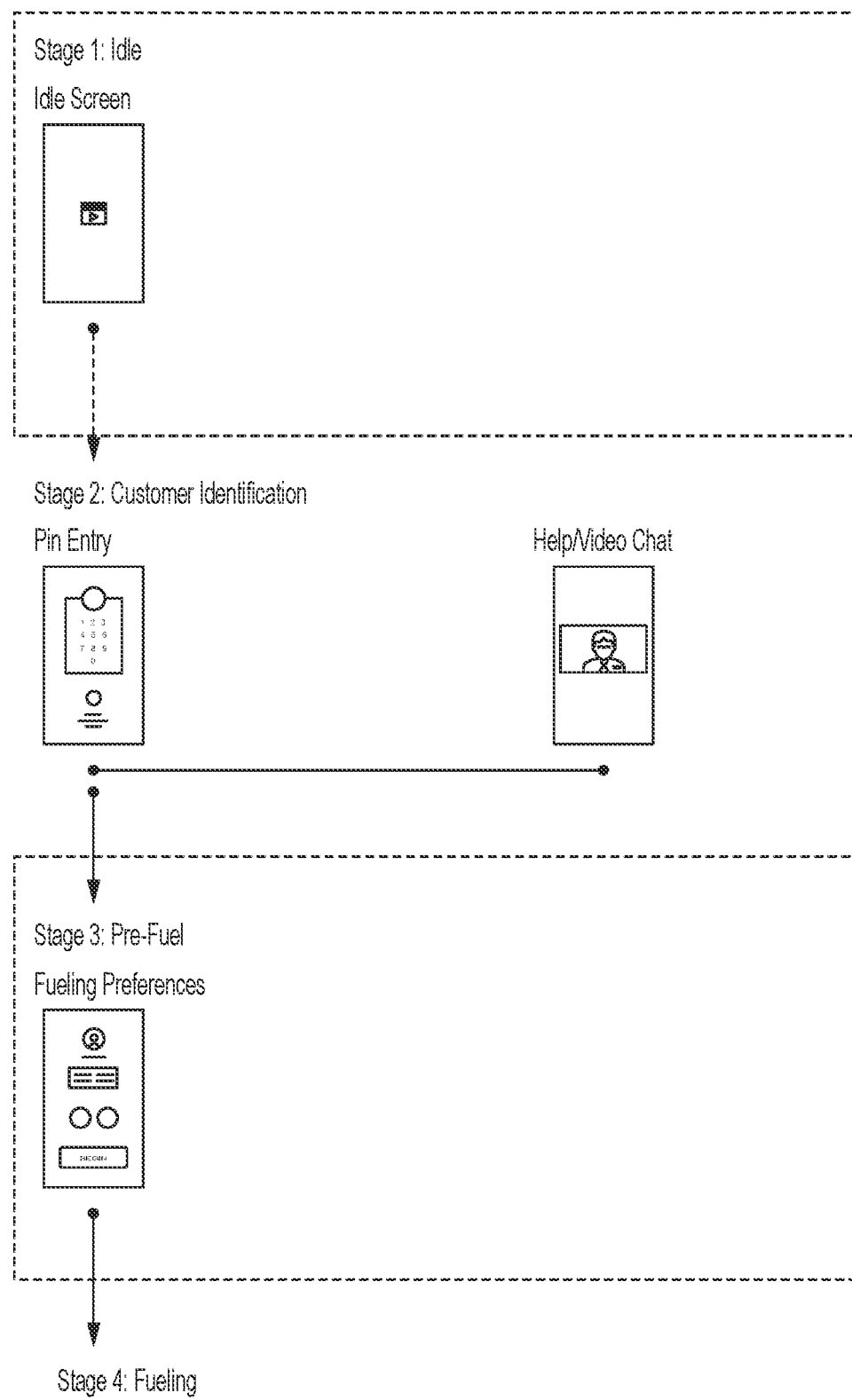
FIG. 18 is a process flow diagram illustrating a first portion another embodiment of a method for fuel dispensing.
Figure 19:
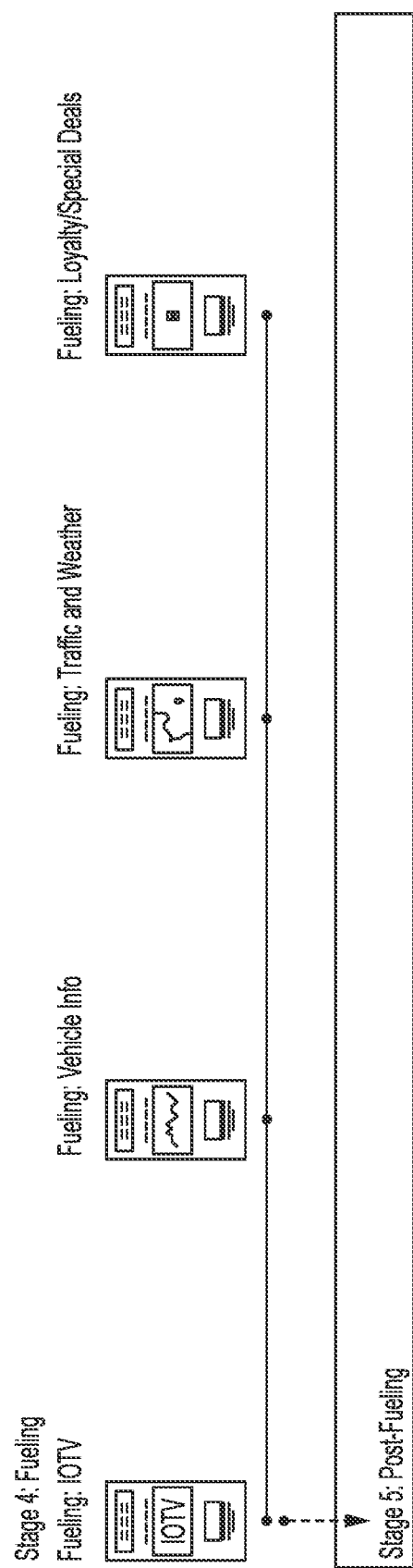
FIG. 19 is a process flow diagram illustrating a second portion of the method of FIG. 18.
Figure 20:
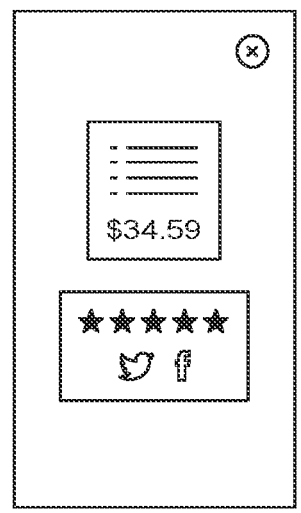
FIG. 20 is a process flow diagram illustrating a third portion of the method of FIG. 18.

FIGS. 18-20 is a process flow diagram illustrating another embodiment of a method for fuel dispensing. The method is shown with respect to a display of a fuel dispenser, which can be any of the fuel dispensers described herein. The method includes five stages.

In stage 1 ("Idle" stage), the display shows an idle screen that is a default view of the display and that is shown when a fueling session is not active. The idle screen shows a promotional video playing on a loop to facilitate sales and/or the fueling facility or company providing the fuel dispenser. The display is dimmed to save energy. No audio plays to improve customer experience of customers adjacent to the fuel dispenser but not actively using the fuel dispenser, e.g., are using other fuel dispensers.

Stage 2 ("Customer Identification" stage) is automatically triggered in response to the fuel dispenser detecting that a customer is proximate to the fuel dispenser, as discussed herein, e.g., by detecting a face via image sensor(s) and/or detecting customer motion and proximity of the customer to the fuel dispenser via motion sensor(s). In response to the fuel dispenser detecting that a customer is proximate to the fuel dispenser, the display switches from the idle screen to a customer verification screen requesting entry of a PIN to verify the customer's identity. The display can brighten in response to the fuel dispenser detecting that the customer is proximate to the fuel dispenser and/or elements on the screen can scale and fade in to improve visibility for the customer. In addition to or instead of a PIN, the customer verification screen can request another type of verification, such an a pattern entry, an answer to a "secret" question previously answered by the customer, biometric authentication (e.g., fingerprint verification, eye pattern verification, palm print verification, DNA verification, hand geometry verification, vein pattern verification, etc.), NFC tap, etc. The customer verification screen includes a hint at the customer's recognized identification in the form of the customer's initials, although other hints are possible, such as a full or partial user ID, display of an avatar image previously chosen by the customer, etc. If the PIN entered is incorrect (or if the other requested input information is incorrect), the customer can experience a default customer experience via the display that is not customized to this particular customer. The customer can be given more than one opportunity to input correct information before being defaulted to the default customer experience.

As discussed herein, the fuel dispenser can auto-adjust location of elements on the customer verification screen in response to the customer's determined disability status and/or height. In other words, the customer verification screen can include the same information for each customer, but where the information appears on the display can be dynamically re-arranged based on the particular customer using the fuel dispenser.

As discussed herein, the fuel dispenser can be configured to accept input in a touchless fashion such that the customer can provide hands-free input to the fuel dispenser in reply to information requested on the customer verification screen, e.g., via gesture and/or input to a customer terminal (e.g., a mobile device having an app installed thereon that is configured to communicate with the fuel dispenser) in wireless communication with the fuel dispenser.

An option is available on the customer verification screen for the customer to access assistance (help/video chat) on demand. The assistance includes a pre-recorded video message for demonstration of using the customer verification screen and/or an option to access live chat assistance similar to Amazon's "Mayday" technical assistance. The live chat can be with a remote customer service agent or with an agent on site (e.g., an attendant in the fueling station's onsite store). The video message dismisses automatically after playing, and the display again shows the customer verification screen.

Stage 3 ("Pre-Fuel" stage) is automatically triggered in response to verified information being input in Stage 2, e.g., in response to a correct PIN being entered, a proper NFC tap occurring, etc. In response to the verified information being input, the display switches from the customer verification screen to a fueling preferences screen that shows stored fueling preferences of the customer (e.g., payment method, grade selection, grade fine-tuning, fuel add-ons, etc.) that are retrieved as discussed herein. The fueling preferences screen allows a user to modify any of the fueling preferences in view of the customer's current preference, e.g., no car wash on this visit, a higher grade than usual is preferred, a specific fuel blend of available fuel grades is desired, a different form of payment than the customer's default payment choice is desired, etc. The fueling preferences screen also shows information related to the customer's fueling experience (e.g., vehicle information (diagnostics, etc.), fueling cost estimate, etc.) that can be determined as discussed herein. The fueling preferences screen also shows loyalty information associated with the customer, including an option to redeem a discount if the customer is eligible for the discount per the loyalty program's requirements.

On the fueling preferences screen, the hint that was on the customer verification screen transitions to an avatar image of the customer to improve customer experience through personalization. The fueling preferences screen also includes a personalized greeting to improve customer experience through personalization.

An option is available on the fueling preferences screen for the customer to access assistance (help/video chat) on demand, similar to that discussed above regarding the customer verification screen.

The fueling preferences screen includes a "begin" selection option that triggers the start of fueling. Selection of "begin" indicates that the customer accepts the displayed fueling preferences. Since the fueling preferences of the customer are pre-loaded on the fueling preferences screen, the customer can quickly and simply start fueling without having to enter preferences before fuel can be dispensed from the dispenser. As opposed to a traditional fueling experience in which information is typically entered in a series of steps before fueling can begin, the fuel dispenser allows "one step" fuel dispensing.

The fuel dispenser can entirely lack a card reader for input of payment information, instead relying on pre-stored payment information for the customer, payment at an onsite store to an attendant, and/or input of payment information via a customer terminal. The fuel dispenser may thus be more secure and/or smaller since card reader hardware need not be included.

As discussed herein, the fuel dispenser can be configured to accept input in a touchless fashion such that the customer can provide hands-free input to the fuel dispenser in reply to information requested on the fueling preferences screen (e.g., a "thumbs up" gesture to select "begin," a swipe near the display screen to modify a fueling preference nearest the swipe, etc.) and/or to modify the displayed fueling preferences.

As discussed herein, the fuel dispenser can auto-adjust location of elements on the fueling preferences screen in response to the customer's determined disability status and/or height. In other words, the fueling preferences screen can include the same information for each customer, but where the information appears on the display can be dynamically re-arranged based on the particular customer using the fuel dispenser.

Stage 4 ("Fueling" stage) is automatically triggered in response to customer selection of "begin" on the fueling preferences screen. In response to the "begin" selection, the display switches from the fueling preferences screen to a fueling screen that shows information related to the current fueling session while fuel is being dispensed from the fuel dispenser. Fuel cannot be dispensed from the fuel dispenser until Stage 3 is completed (regardless of whether or not the user is receiving a customized experience or the default experience).

The fueling screen can show any or all of a variety different types of information. The fueling screen can show IoTV (inOvation TV media platform) media with station select option available in addition to one or more of convenience store (C-store) ads, "flash" deals, targeted deals, maps, options to add item(s) to the fuel purchase, and fueling time remaining. The fueling screen can show vehicle information including vehicle state and diagnostics, retrieved as discussed herein, in addition to one or more of convenience store (C-store) ads, "flash" deals, targeted deals, maps, options to add item(s) to the fuel purchase, and fueling time remaining. The fueling screen can show traffic and/or weather information including local traffic conditions and/or local weather conditions in addition to one or more of convenience store (C-store) ads, "flash" deals, targeted deals, maps, options to add item(s) to the fuel purchase, and fueling time remaining. The fueling screen can show loyalty/special information including special or partner deals for the customer (e.g., a discount offer such as "You are due for an oil-change this month, add to purchase now for $5 off," etc.) in addition to one or more of convenience store (C-store) ads, "flash" deals, targeted deals, maps, options to add item(s) to the fuel purchase, and fueling time remaining.

Any one or more of the C-store ads, "flash" deals, targeted deals, and options to add item(s) to the fuel purchase shown on the fueling screen can be targeted to the customer based on a retrieved user profile for the customer that can include, e.g., prior purchases made by the customer, prior ads selected by the customer, etc. The display can thus be more personal to the customer and/or can be more likely to result in additional purchases.

An option is available on the fueling screen for the customer to access assistance (help/video chat) on demand, similar to that discussed above regarding the customer verification screen.

As discussed herein, the fuel dispenser can be configured to accept input in a touchless fashion such that the customer can provide hands-free input to the fuel dispenser in reply to information requested on the fueling screen, e.g., accepting a deal, accessing assistance, etc.

As discussed herein, the fuel dispenser can auto-adjust location of elements on the fueling screen in response to the customer's determined disability status and/or height. In other words, the fueling screen can include the same information for each customer, but where the information appears on the display can be dynamically re-arranged based on the particular customer using the fuel dispenser.

Stage 5 ("Post-Fueling" stage) is automatically triggered in response to the termination of fueling, which can be detected by detecting when the fuel dispenser's nozzle is returned to the fuel dispenser's nozzle boot. In response to the termination of fueling, the display switches from the fueling screen to a post-fueling screen that shows a summary of the customer's purchase of fuel and any other added purchases. The post-fueling screen show an itemized purchase summary, an option for the customer to rate the fueling station (on a basis of one to five stars), social media sharing incentives, an SMS (text message) receipt option, an email receipt option, receipt information options (e.g., include odometer setting of the vehicle on the receipt, include fuel grade dispensed on the receipt, etc.), and an "end" selection option to dismiss the summary and return the display to the idle screen. The fuel dispenser can entirely lack an option to print a receipt, which may make the fuel dispenser easier to maintain since paper need not be refilled and/or help keep customer information secure by not allowing printed receipts to be forgotten by the customer.

An option is available on the post-fueling screen for the customer to access assistance (help/video chat) on demand, similar to that discussed above regarding the customer verification screen.

As discussed herein, the fuel dispenser can be configured to accept input in a touchless fashion such that the customer can provide hands-free input to the fuel dispenser in reply to information requested on the post-fueling screen, e.g., requesting a receipt, accessing assistance, etc.

As discussed herein, the fuel dispenser can auto-adjust location of elements on the post-fueling screen in response to the customer's determined disability status and/or height. In other words, the post-fueling screen can include the same information for each customer, but where the information appears on the display can be dynamically re-arranged based on the particular customer using the fuel dispenser.

Another embodiment of a method for fuel dispensing is described below with respect to FIGS. 21A-30. The method is described with respect to a display on a front side of the fuel dispenser for convenience of discussion but can be similarly implemented on a display (obscured in FIG. 21A) on a back side of the fuel dispenser. The method is described with respect to a fuel dispenser illustrated in FIG. 21A but can be performed using any of the fuel dispensers described herein. It is possible for the graphics, text, images, video, etc. shown on the display in various ones of FIGS. 21A-30 to be different (e.g., be in a different language, include information in more than one language, include different icon symbols, show information in text instead of in a graphic, show information in a graphic instead of in text, etc.) and/or to be arranged in a different way on the display (e.g., advertisements in different locations on the display, fueling progress shown on a bottom of the display instead of on a top of the display, etc.).

Figure 21A:
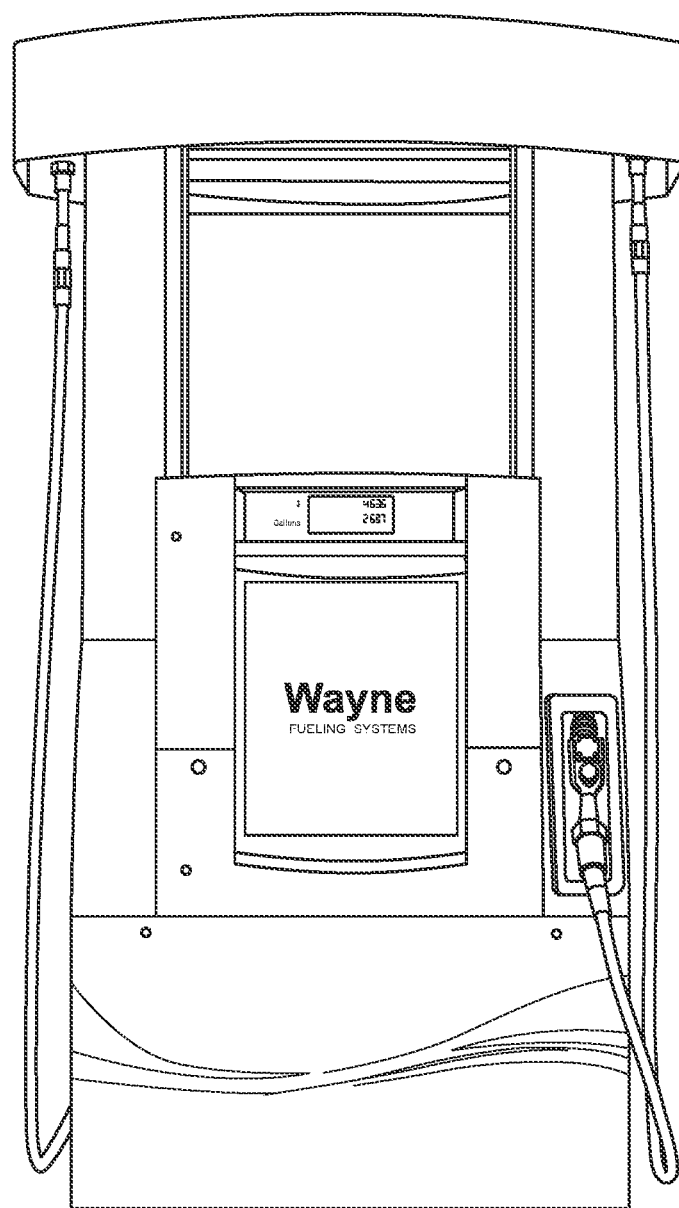
FIG. 21A is a perspective view of one embodiment of a fuel dispenser including a housing and including on each of front and back sides of the housing a display, a nozzle boot, and a nozzle removably seated in the nozzle boot and attached to a hose coupled to a supply of fuel.
Figure 21B:
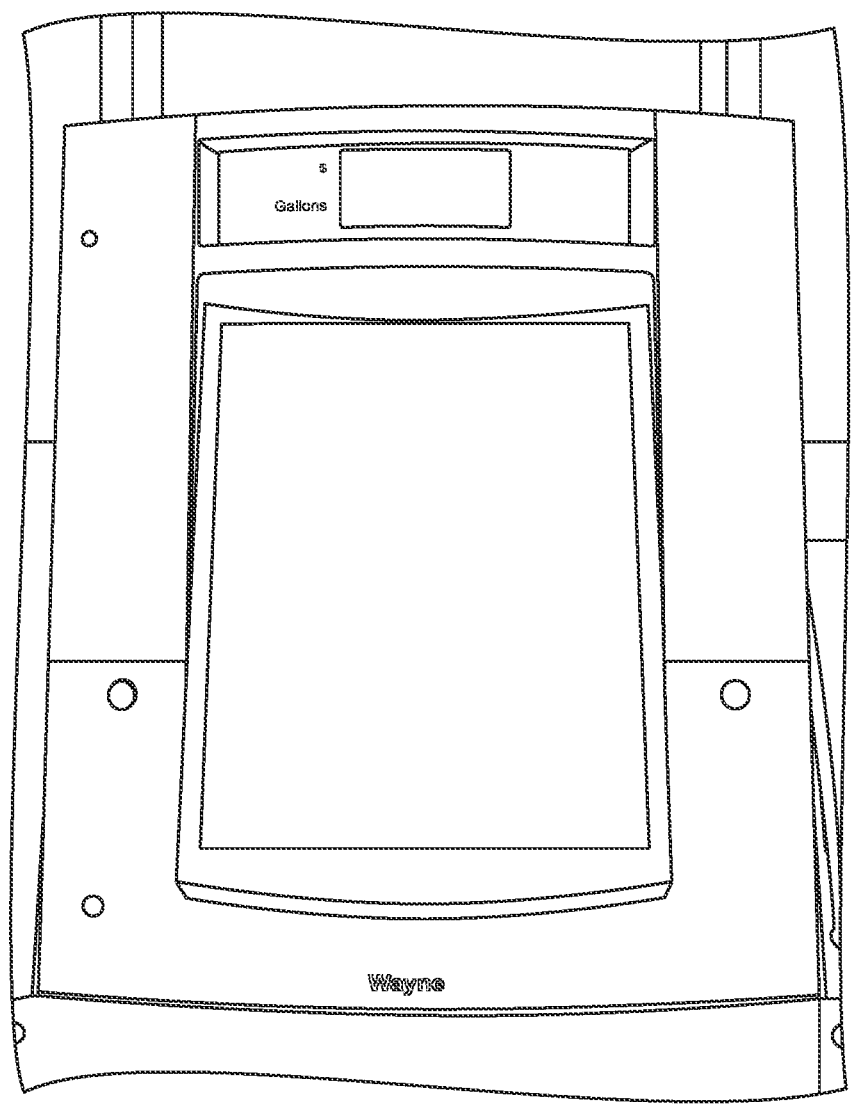
FIG. 21B is a perspective view of a portion of the front side of the fuel dispenser of FIG. 21A with the display on the front side thereof in an off configuration.

FIG. 21B shows the display in an off configuration prior to the display receiving power and/or prior to the fuel dispenser being activated as ready to begin dispensing fuel.

Figure 22:
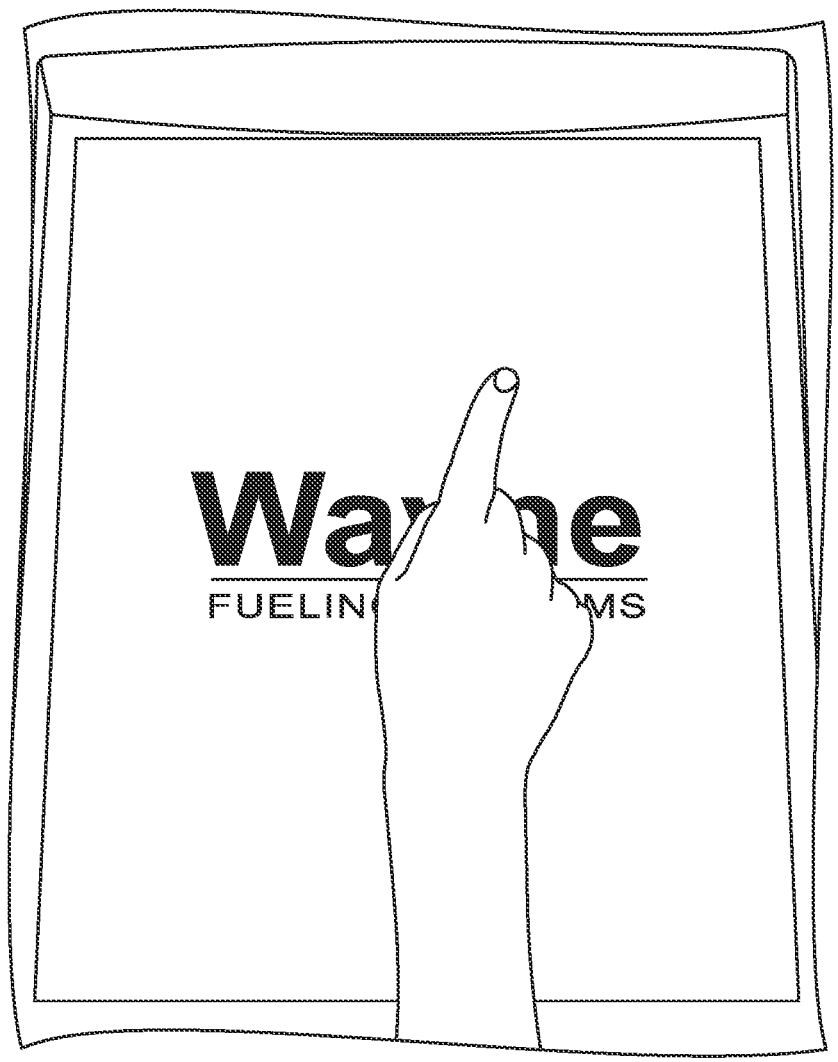
FIG. 22 is a perspective view of the display of FIG. 21A in an idle configuration with a hand of a customer located in front of the display.
Figure 23:
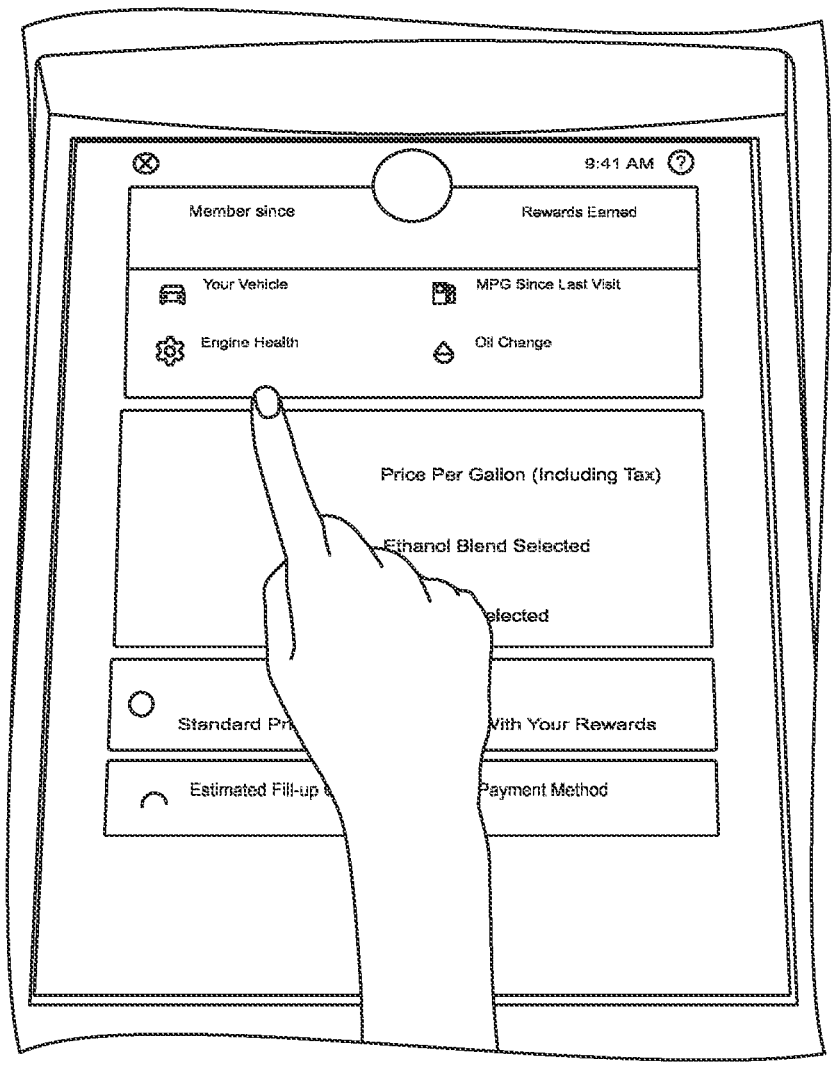
FIG. 23 is a perspective view of the display of FIG. 22 in an activated configuration following a gesture of the hand of the customer.

FIG. 22 shows the display in an idle configuration, e.g., an idle screen that, as discussed above, is a default view of the display and that is shown when a fueling session is not active. A customer has approached the fuel dispenser, as indicated by a hand of the customer being in front of the display. In response to a gesture of the customer, the display changes from the idle configuration to an activated configuration, shown in FIG. 23. The gesture in this illustrated embodiment is a touchless gesture including a movement of the hand in front of the display, the movement including a right to left swipe motion. Other examples of the gesture include a touchless gesture of the hand swiping in another direction and a touch gesture of the hand touching the screen.

Figure 24:
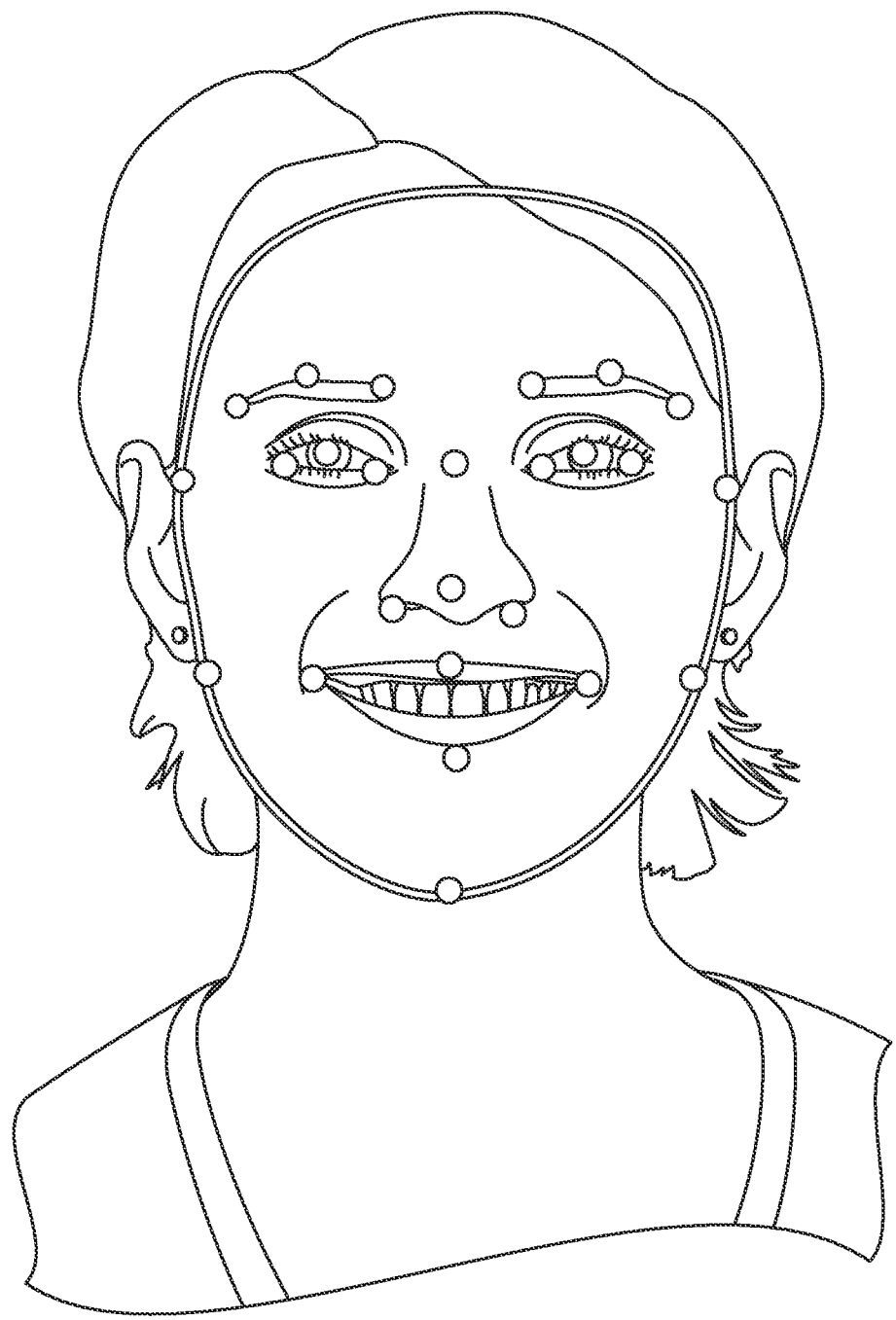
FIG. 24 is a rendering of one embodiment of facial recognition of the customer of FIG. 22.

The customer is identified by the fuel dispenser using facial recognition. One embodiment of facial points that can be recognized by the fuel dispenser, e.g., by one or more sensors thereof, to determine customer identity is shown in FIG. 24. The customer is identified in response to the determination that the customer is present at the fuel dispenser by detecting the gesture thereof, is shown in FIG. 24. In another embodiment, the customer recognition can begin prior to the gesture being detected by the fuel dispenser, e.g., can begin when a customer's face is within sensing range of the fuel dispenser.

Figure 25:
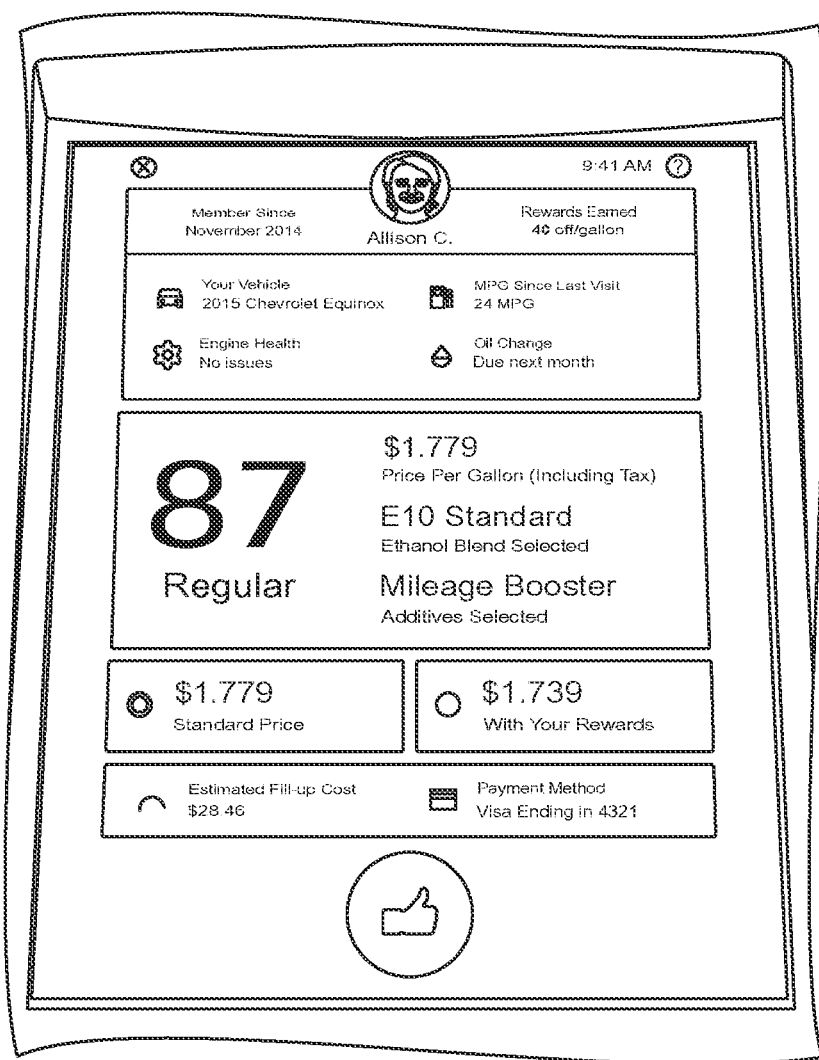
FIG. 25 is a perspective view of the display of FIG. 23 populated with information particular to the customer recognized by the facial recognition of FIG. 24.

Following identification of the customer using facial recognition (and/or another way, as discussed above), the display shows a fueling preferences screen, as shown in FIG. 25. The fueling preferences screen includes information specific to the customer, e.g., includes information populated from a database lookup associating the customer with particular preferences. Prior to the fueling preferences screen being shown on the display, a customer verification screen can be shown on the display, as discussed above, to verify the identity of the customer for security reasons.

Figure 26:
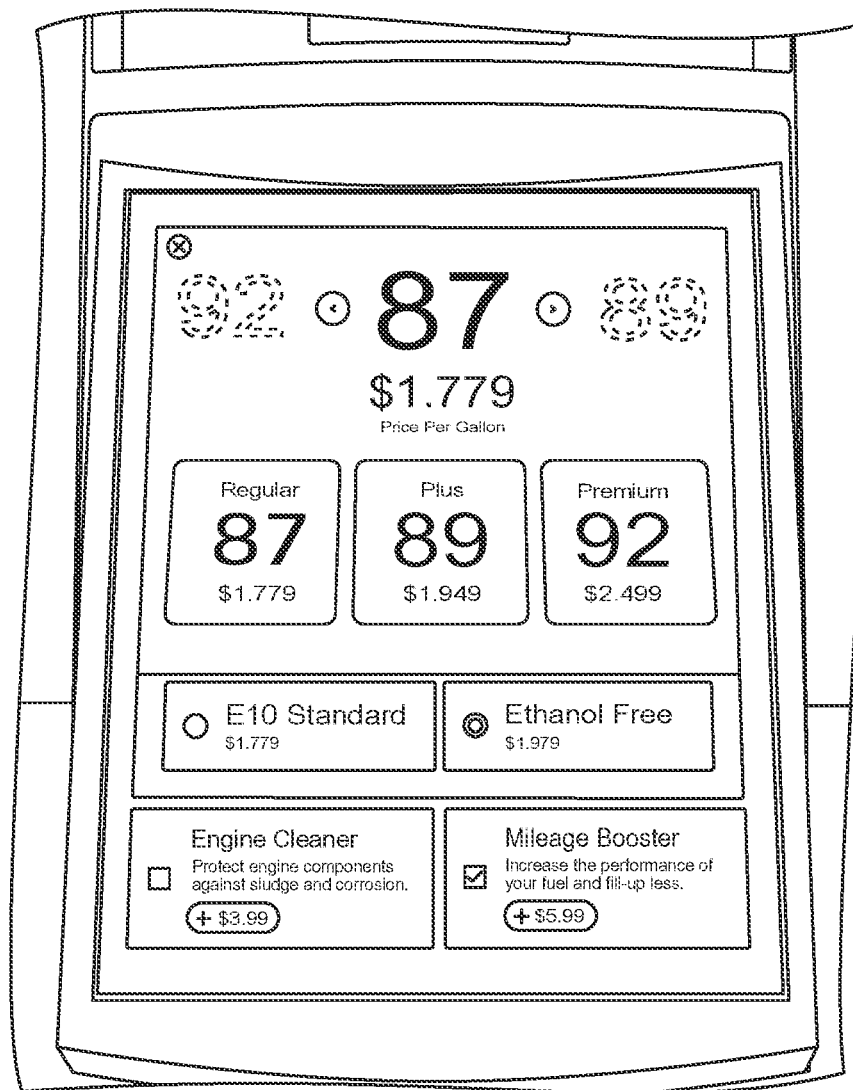
FIG. 26 is a perspective view of the display of FIG. 25 showing fuel selection information to the customer for a fueling session.

The customer can modify any of the displayed fueling preferences if desired, as discussed above. FIG. 26 shows one embodiment of a fueling preferences update screen allowing customer changes thereto with respect to fuel grade and optional add-ons of engine cleaner and mileage booster. The fueling preferences update screen can be shown on the display in response to a gesture of the customer on the fueling preferences screen, such as by the customer touching the fuel grade on the fueling preferences screen or the customer touchless gesturing (e.g., by pointing at, by waving a finger in front of, etc.) at the area of the display showing the fuel grade. The fueling preferences update screen can show only those fuel grades compatible with the customer's vehicle (which may be identified by the fuel dispenser as discussed herein) to prevent mis-fueling.

Figure 27:
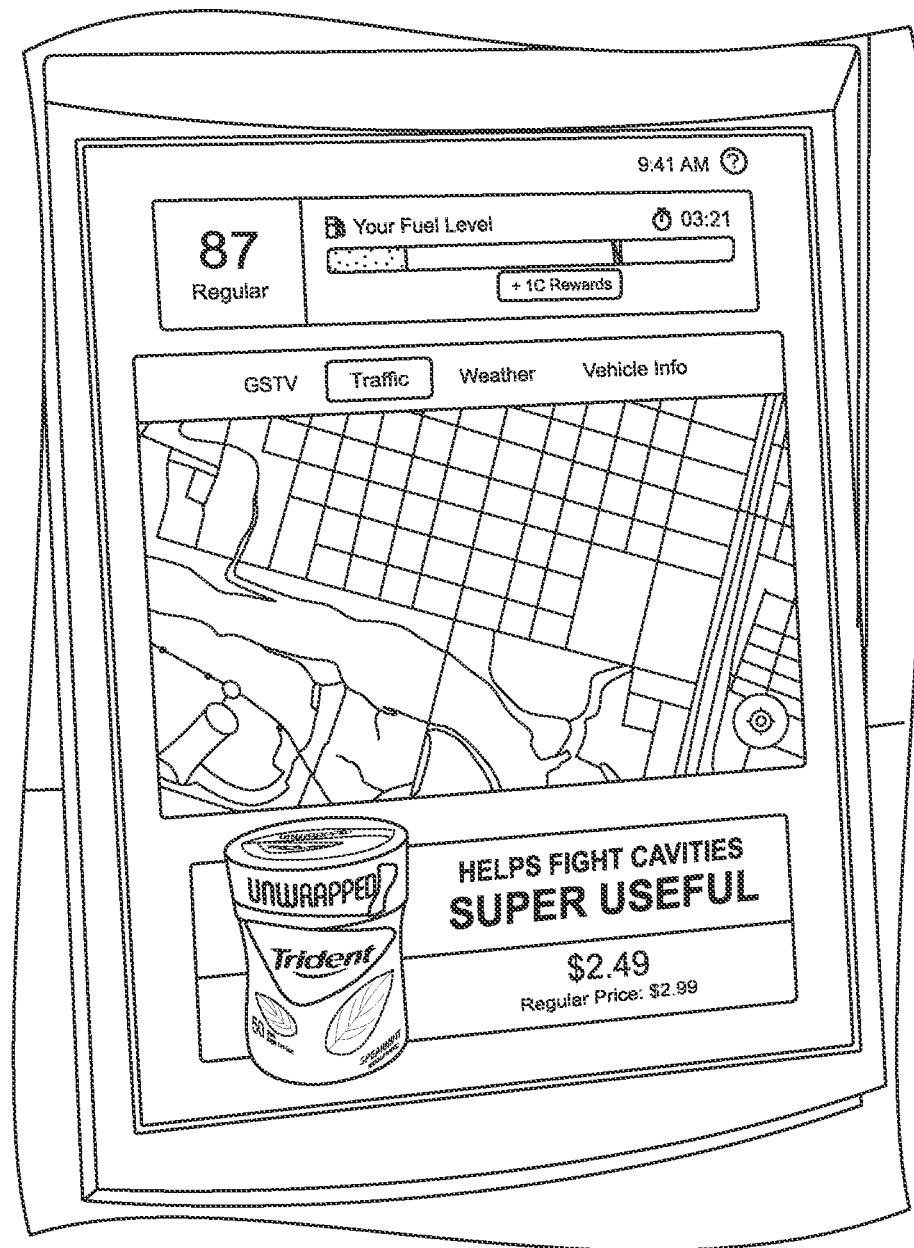
FIG. 27 is a perspective view of the display of FIG. 26 following selection by the customer of fuel information, the display showing fuel progress information for the fueling session, traffic information, and a product advertisement.
Figure 28:
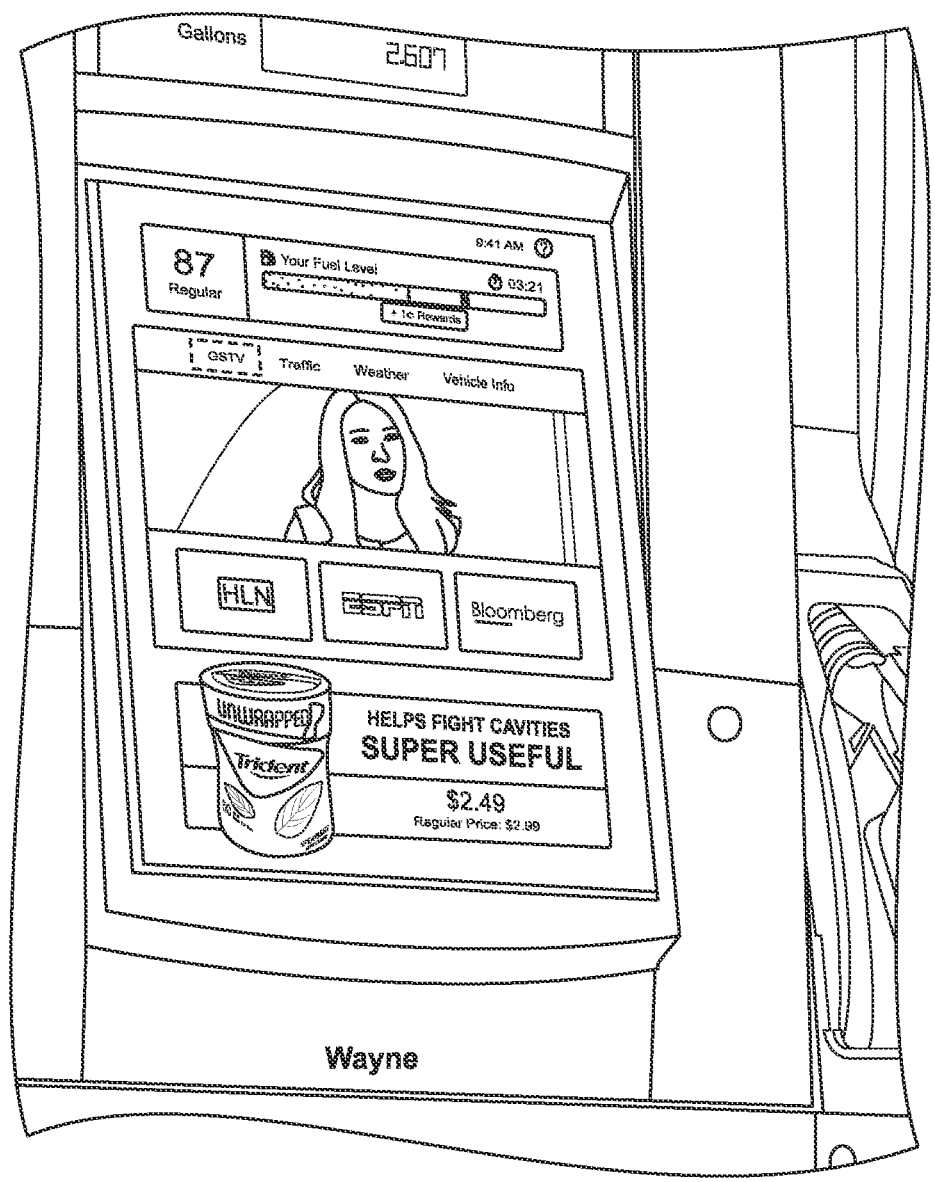
FIG. 28 is a perspective view of the display of FIG. 26 following selection by the customer of fuel information, the display showing fuel progress information for the fueling session, television, and a product advertisement.
Figure 29:
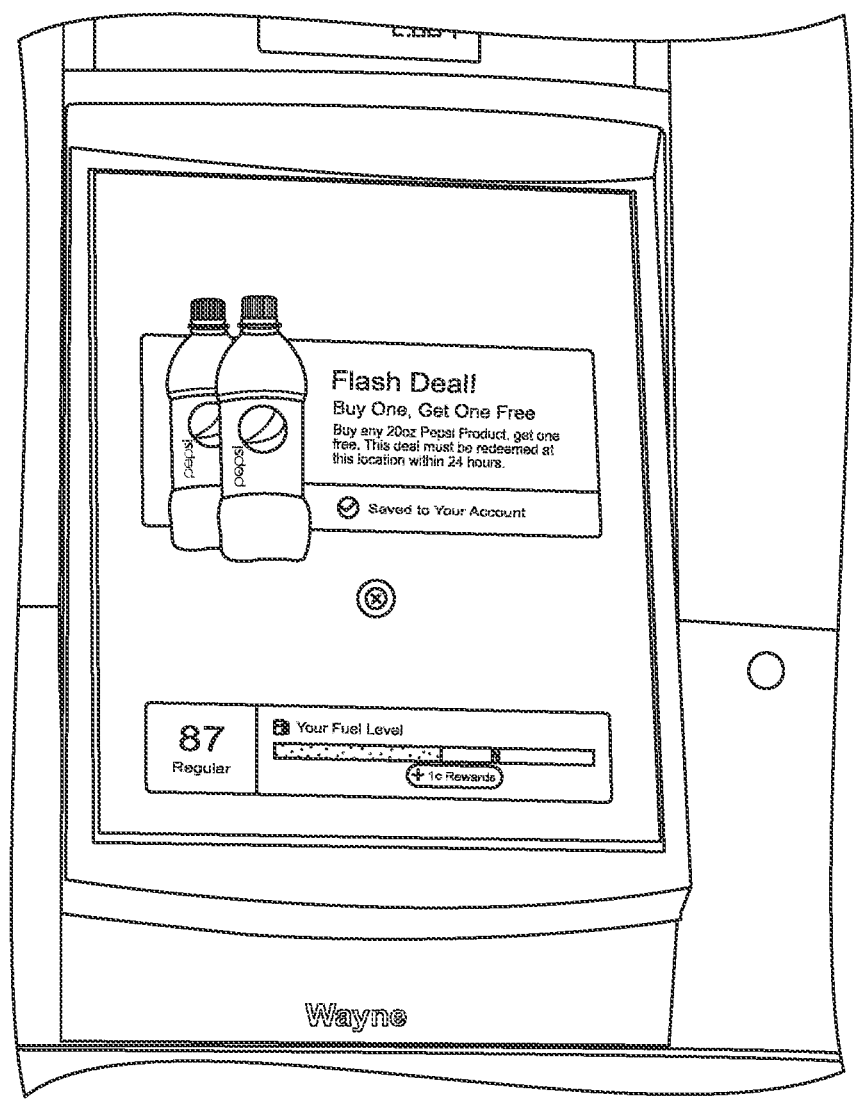
FIG. 29 is a perspective view of the display of FIG. 26 following selection by the customer of fuel information, the display showing fuel progress information for the fueling session and an in-store product offer in the form of a coupon that has been automatically applied to the customer's account in response to the customer beginning the fueling session.

When satisfied with the displayed fueling preferences, the customer can select a "begin" option, which in this illustrated embodiment is a thumbs up icon at the bottom of the display as shown on FIG. 25, to trigger the start of fueling. In response to the "begin" selection, the display switches from the fueling preferences screen to a fueling screen, one embodiment of which is shown in FIG. 27. The display of FIG. 27 shows fueling progress information, a product advertisement, and traffic information local to the fueling station where the fuel dispenser is located or at a location specified by the customer. The display allows the customer to select different informational content to be displayed, including traffic (FIG. 27), television (FIG. 28) (gas station TV (GSTV)), weather information local to the fueling station where the fuel dispenser is located or at a location specified by the customer, and vehicle information related to the customer's vehicle as identified by the fuel dispenser as discussed above. The television content is selectable by the customer by channel, as shown in FIG. 28. The television content can be by either touch gesture or touchless gesture. Another embodiment of a fueling screen is shown in FIG. 29 where the display shows fueling progress information and an in-store product offer in the form of a "flash" deal coupon that has been automatically applied to the customer's account in response to the customer beginning the fueling session. The customer can go into the store at the fueling station, or at another affiliated fueling station, and the coupon can be used in a purchase of the offered good within the "flash" period specified in the offer, which is twenty-four hours in this example.

Figure 30:
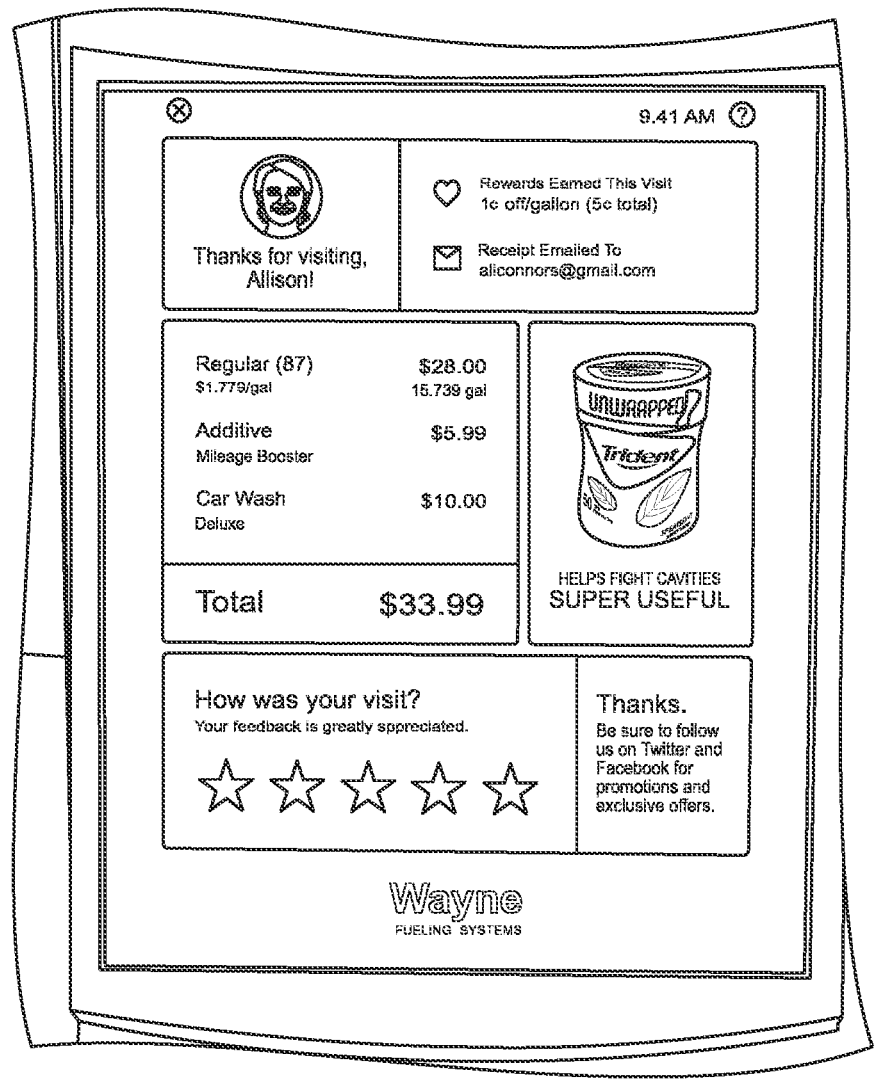
FIG. 30 is a perspective view of the display of FIG. 26 following completion of fueling in the fueling session, the display showing a personalized thank you, a general thank you, receipt information including where a receipt has been delivered and identification of goods purchased and their costs, earned customer loyalty rewards information, a product advertisement, and an opportunity for the customer to rate their fueling experience.

In response to the termination of fueling, the display switches from the fueling screen to a post-fueling screen, one embodiment of which is shown in FIG. 30.

Another embodiment of a method for fuel dispensing is described below with respect to FIGS. 31-35. The method is described with respect to a fuel dispenser 900 that is similar to the fuel dispenser illustrated in FIG. 21A but includes a biometric reader 904 configured to read a biometric feature of a customer, in this case a palm for vascular scanning. The method can, however, be performed using any of the fuel dispensers described herein. The method is described with respect to a display 902 on a front side of the fuel dispenser 900 for convenience of discussion but can be similarly implemented on a display (obscured in FIG. 31) on a back side of the fuel dispenser 900. It is possible for the graphics, text, images, video, etc. shown on the display 902 in various ones of FIGS. 31-35 to be different (e.g., be in a different language, include information in more than one language, include different icon symbols, show information in text instead of in a graphic, show information in a graphic instead of in text, etc.) and/or to be arranged in a different way on the display 902 (e.g., advertisements in different locations on the display 902, fueling progress shown on a bottom of the display 902 instead of on a top of the display 902, etc.).

The biometric reader 904 configured to read a palm for vein pattern matching can have any of a variety of configurations. The biometric reader 904 can include PalmSecure® available from Fujitsu of Tokyo, Japan, although other configurations are possible. The biometric reader 904 is attached to a frame 906 surrounding the display 902 on a right side of the display 902, but the biometric reader 904 can be attached to other locations on the frame 906 or to the dispenser 900 at a location other than the frame 906.

Figure 31:
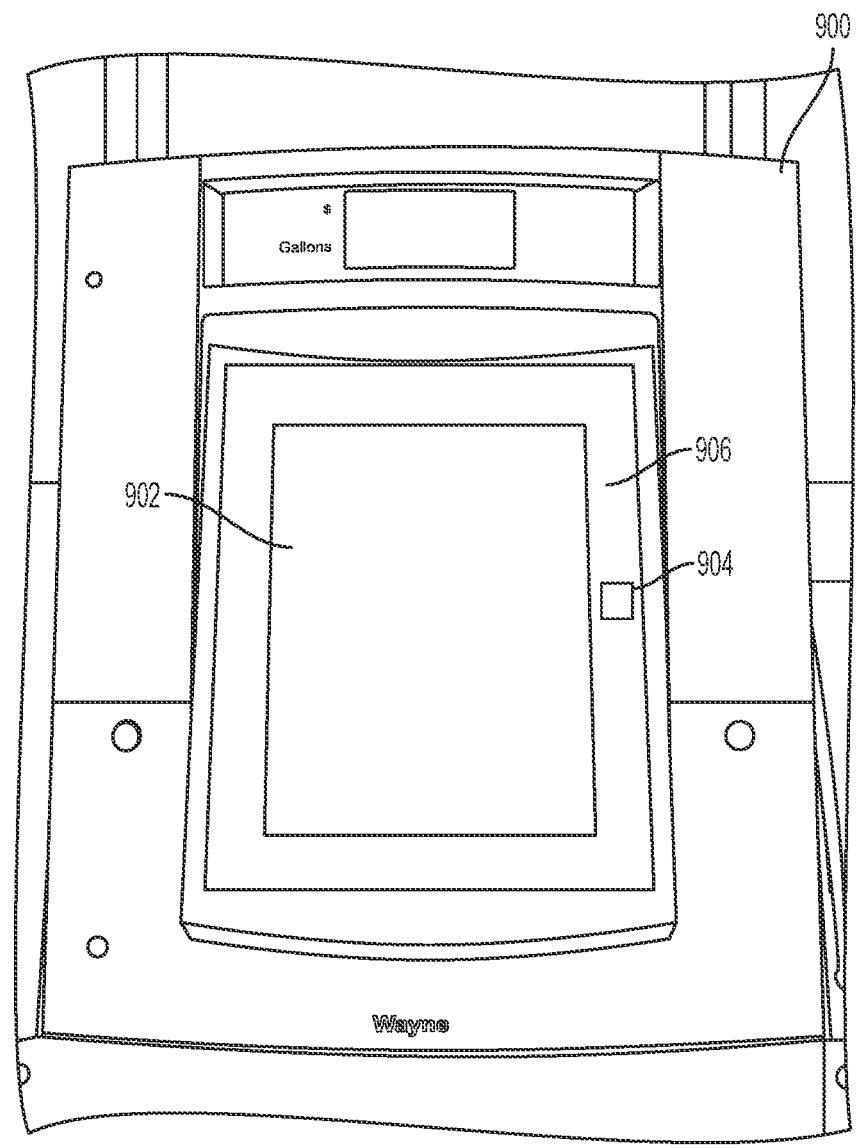
FIG. 31 is a perspective view of a portion of one embodiment of a fuel dispenser including a biometric reader and a display.

FIG. 31 shows the display 902 in an off configuration prior to the display 902 receiving power and/or prior to the fuel dispenser 900 being activated as ready to begin dispensing fuel.

Figure 32:
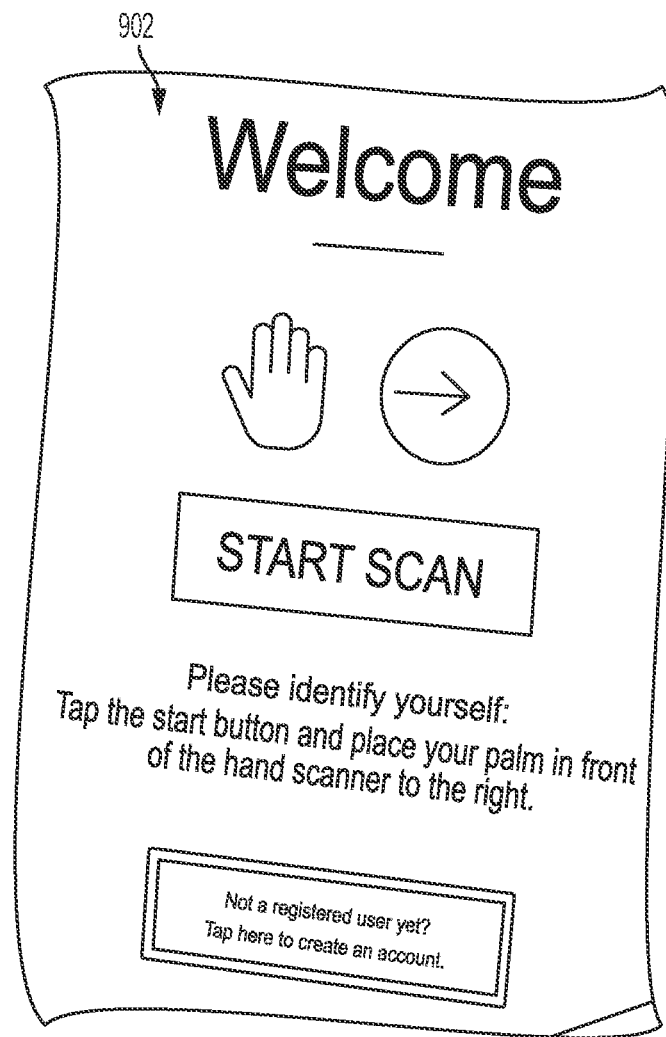
FIG. 32 is a perspective view of the display of FIG. 31 with a customer verification screen thereon.

FIG. 32 shows a customer verification screen on the display 902 requesting verification of the customer's identity using the biometric reader 904. The customer verification screen instructs the customer to tap a start button on the display 902, which is a touchscreen, and place their palm in front of the biometric reader 904. Tapping the start button signals the biometric reader 904 to begin scanning. The customer placing their palm in front of the biometric reader 904 to verify their identity is an example of a touchless input to the dispenser 900 to verify the customer's identity.

If the customer is a registered user, the biometrics read by the reader 904 can be verified because the customer's read biometric information can be compared with biometrics data stored in a database accessible to the fuel dispenser 900 (e.g., in a memory on board the dispenser 900, in a memory external to the dispenser 900 such as a memory at a remote server available to the dispenser 900 via a wireless communication, etc.). If the customer is not yet a registered user, the biometrics read by the reader 904 cannot be verified because the customer's biometric information will not be stored in the database accessible to the fuel dispenser 900. The customer verification screen includes an option for the customer to become a registered user by tapping on a button on the display 902. The customer can, however, additionally or alternatively be prompted via the display 902 to become a registered user after the biometrics reader 904 reads customer data that is found to not match any of the stored customer biometrics data.

Figure 33:
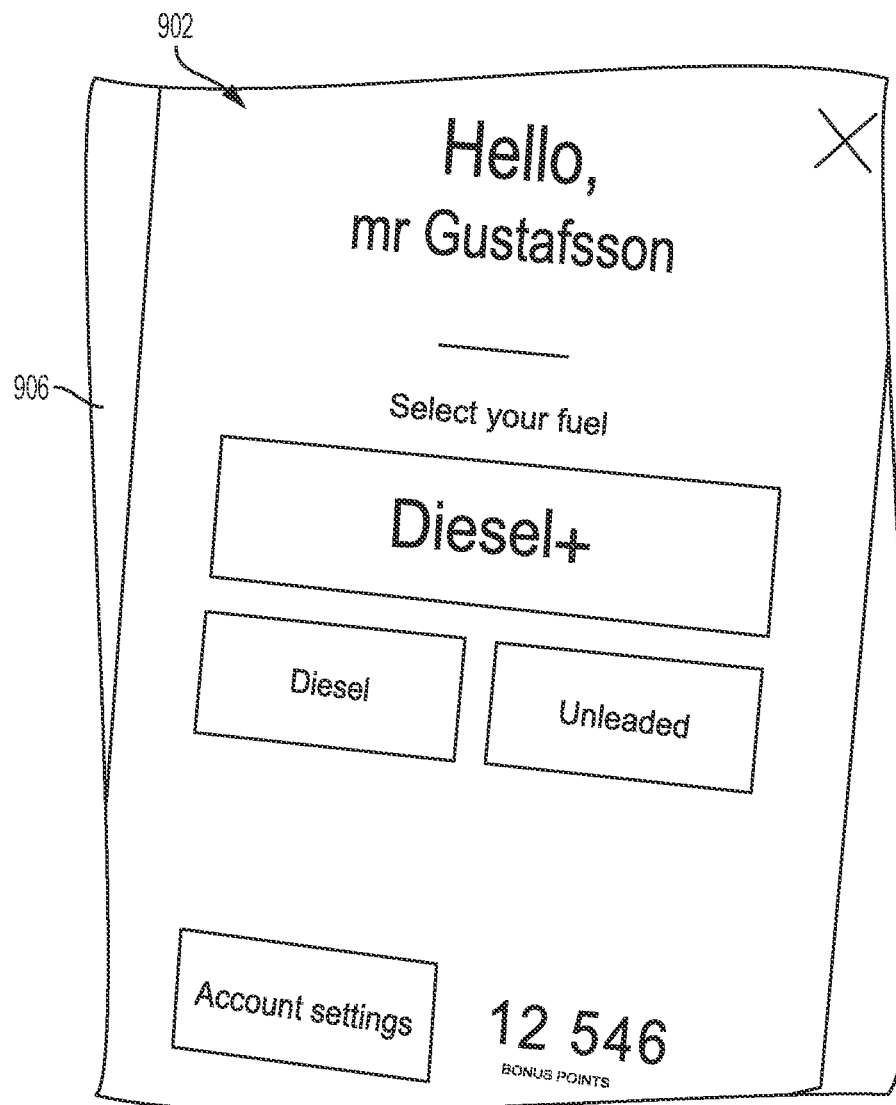
FIG. 33 is a perspective view of the display of FIG. 31 with a fueling preferences screen thereon.

In response to verification of the customer, the display 902 switches from the customer verification screen to a fueling preferences screen, shown in FIG. 33. The fueling preferences screen shows the three fuels available at the dispenser 900 and indicates the customer's preferred one of the fuels by highlighting that fuel (shaded box for Diesel+, as compared to unshaded boxes for Diesel and Unleaded). The fueling preferences screen also shows loyalty information associated with the customer.

Figure 34:
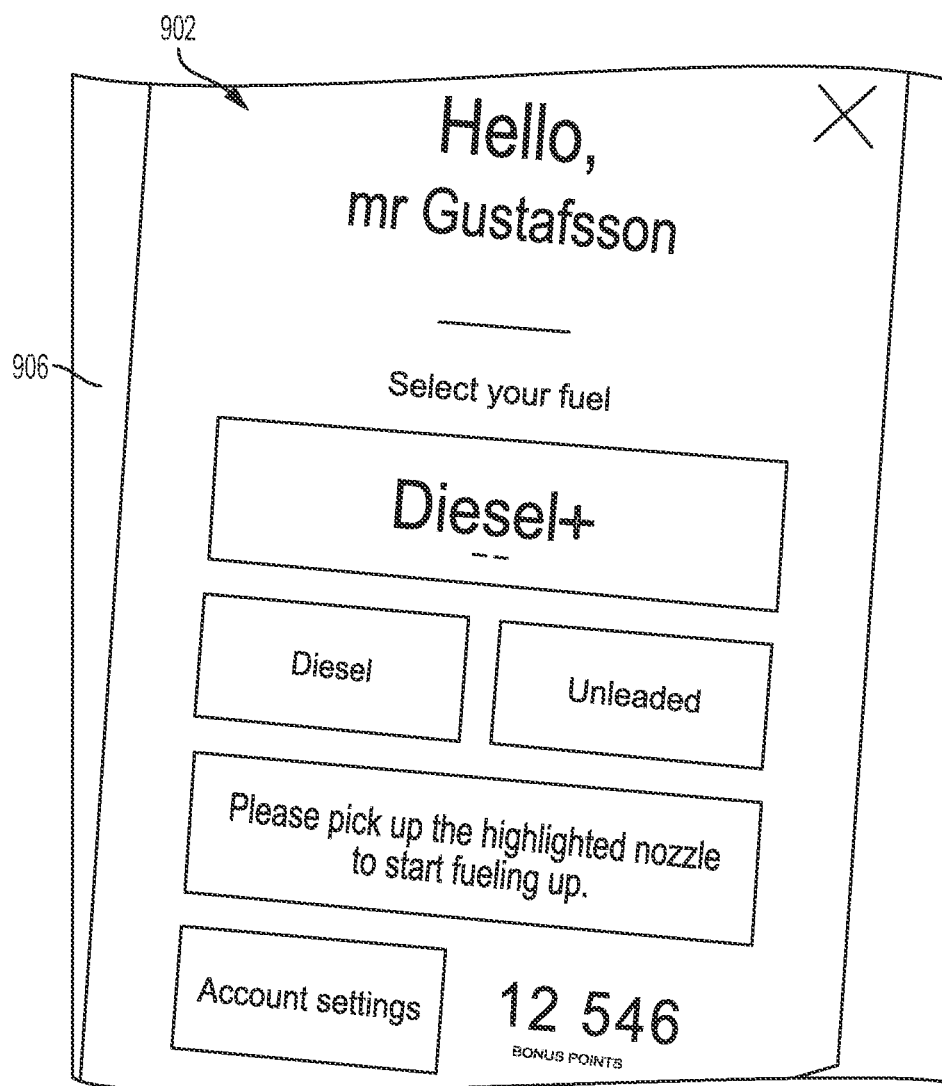
FIG. 34 is a perspective view of the fueling preferences screen on the display of FIG. 33 following customer selection of a fuel type.
Figure 34A:
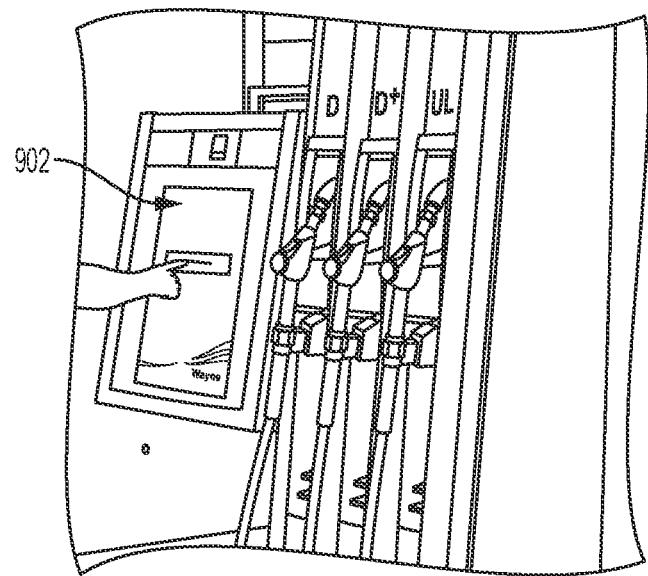
FIG. 34A is a perspective view of a portion of the fuel dispenser of FIG. 33 with lights illuminated by each nozzle of the dispenser.
Figure 34B:
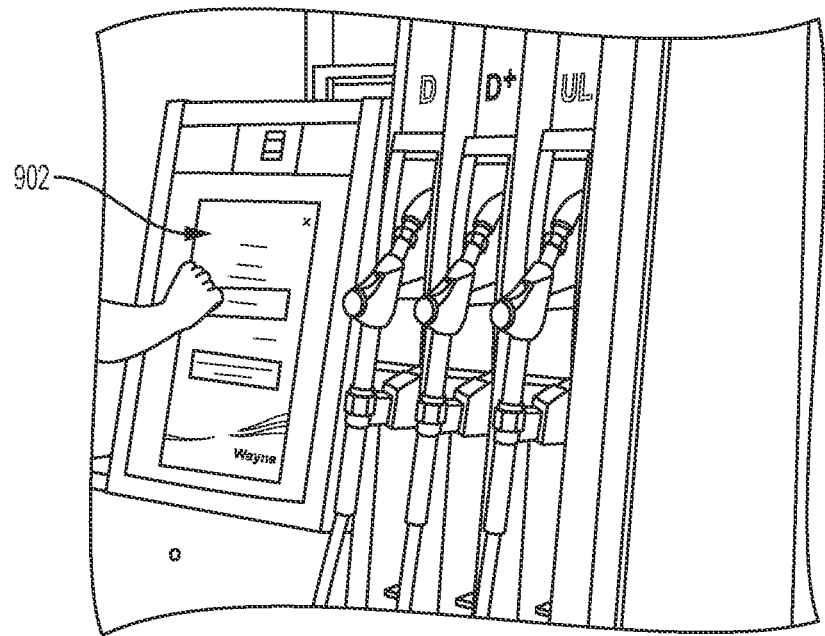
FIG. 34B is a perspective view of a portion of the fuel dispenser of FIG. 34 with the light by one of the nozzles illuminated.

As shown in FIG. 34, customer selection of one of the fuels (e.g., by tapping on the fuel's box on the touchscreen display 902) triggers showing on the display 902 an option for the customer to adjust account settings, such as to change or enter a new payment method, update address information, etc., and triggers the showing of instructions for how to begin fueling, by picking up the nozzle highlighted by an illuminated light adjacent thereto. The nozzle is configured to dispense the customer's selected fuel. FIG. 34A illustrates an embodiment of lights adjacent to nozzles for each of the available fuel grades being illuminated before customer selection of one of the fuels. In another embodiment, all of the lights adjacent to nozzles for each of the available fuel grades can be unilluminated before customer selection of one of the fuels. FIG. 34B illustrates the one of the lights illuminated corresponding to the customer's selected fuel, which is Diesel+ in this illustrated embodiment, prior to the customer picking up the nozzle.

Figure 35:
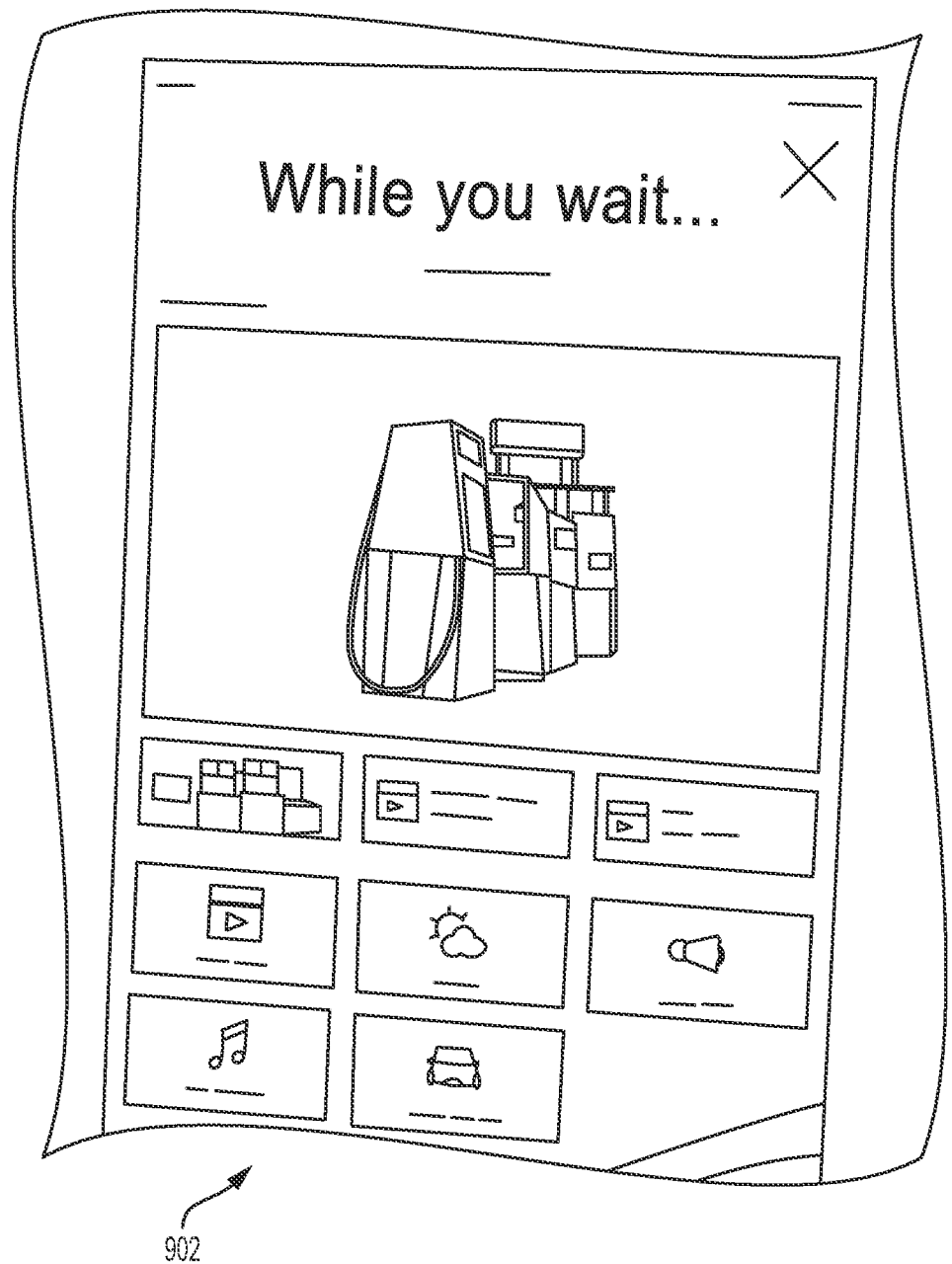
FIG. 35 is a perspective view of the display of FIG. 34 with a fueling screen thereon.

The customer's removal of the nozzle from its nozzle boot triggers the start of fueling and switches the display 902 from the fueling preferences screen to a fueling screen, shown in FIG. 35. The removal of the nozzle from the nozzle boot can be detected in any number of ways, as will be appreciated by a person skilled in the art, such as by a sensor (e.g., a pressure sensor, a motion sensor, etc.) sensing the nozzle's removal. The fueling screen shows information thereon to the customer with customer-selectable options to view other types of information including video information about the dispenser 900, weather, latest news, entertainment (music, TV, etc.), and vehicle information.

Another embodiment of a fuel dispenser 1000 is illustrated in FIGS. 36A-36D. The dispenser 1000 is generally configured similar to other embodiments of fuel dispensers herein and can be similarly used, e.g., used in a method for dispensing fuel such as any of the method described with respect to FIGS. 18-20, the method described with respect to FIGS. 21A-30, and the method described with respect to FIGS. 31-35.

Figure 36A:
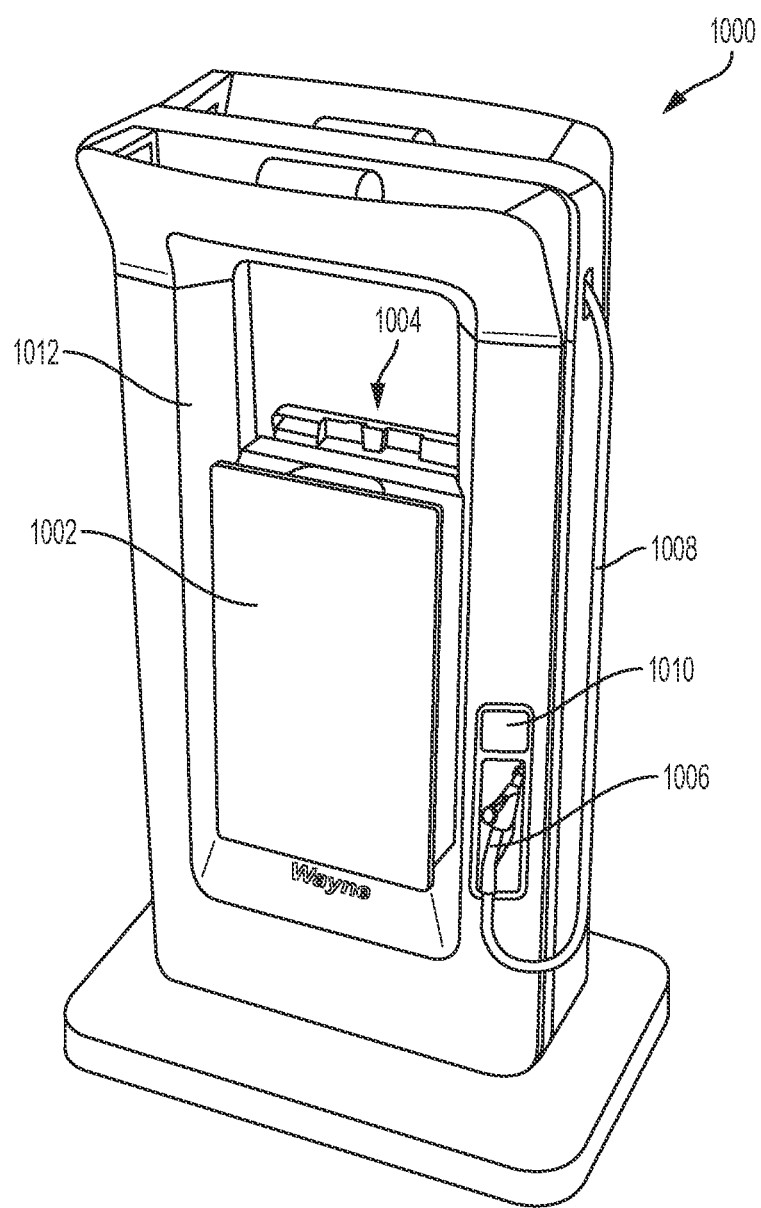
FIG. 36A is a perspective view of another embodiment of a fuel dispenser with a front display thereof in an off configuration.
Figure 36B:
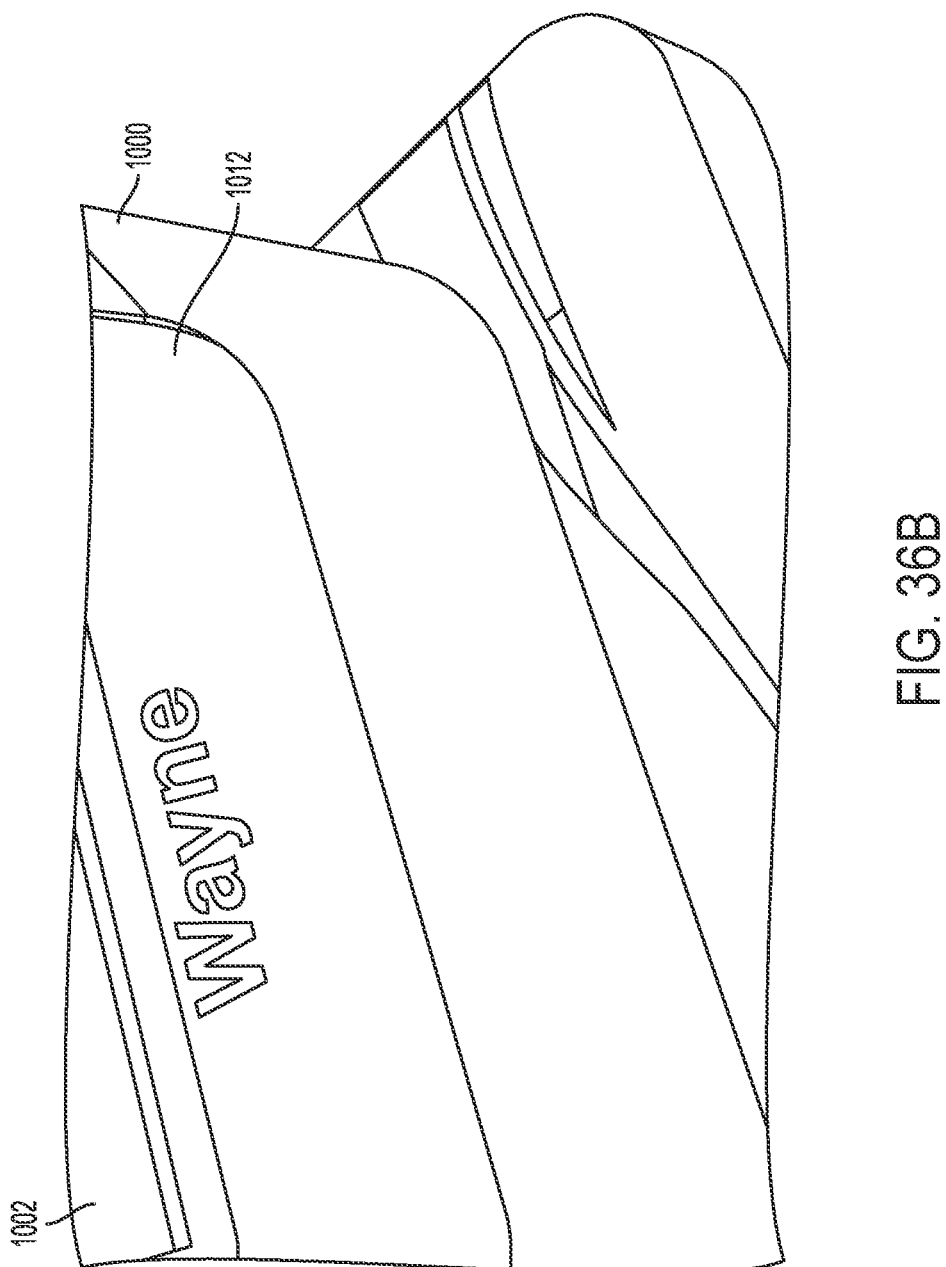
FIG. 36B is a perspective view of a portion of the fuel dispenser of FIG. 36B.
Figure 36C:
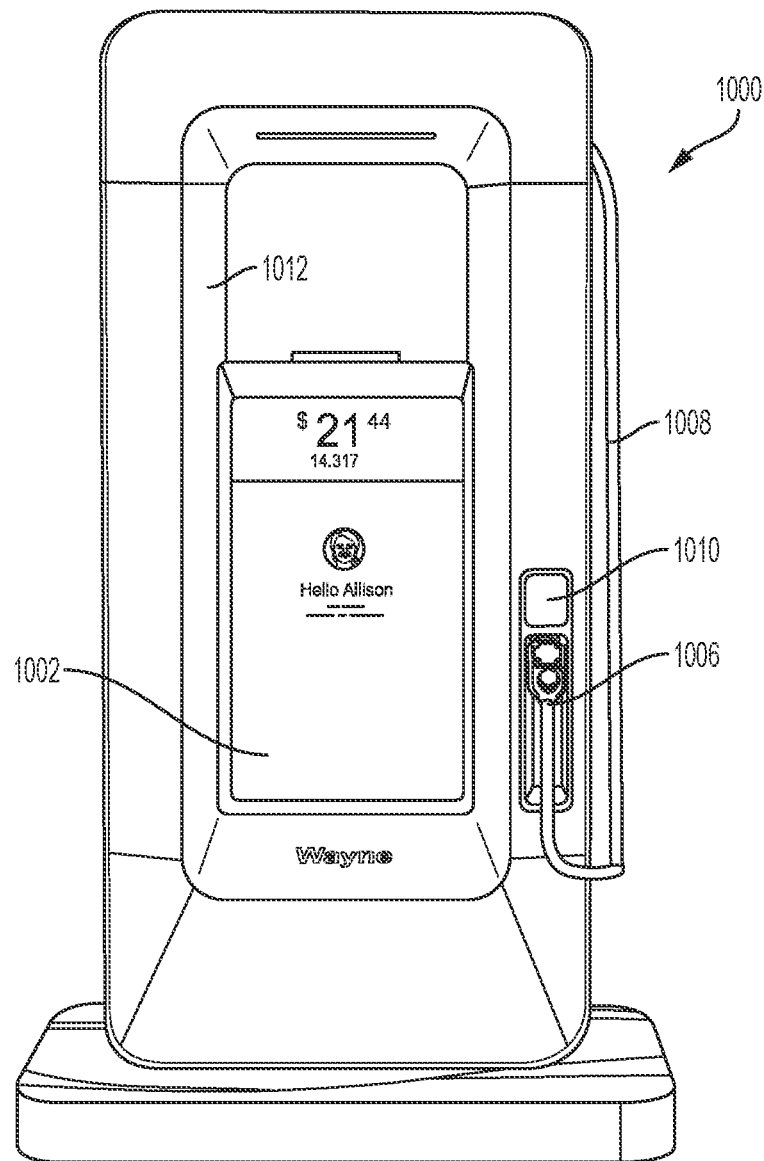
FIG. 36C is a front view of the fuel dispenser of FIG. 36A with the front display in an on configuration.
Figure 36D:
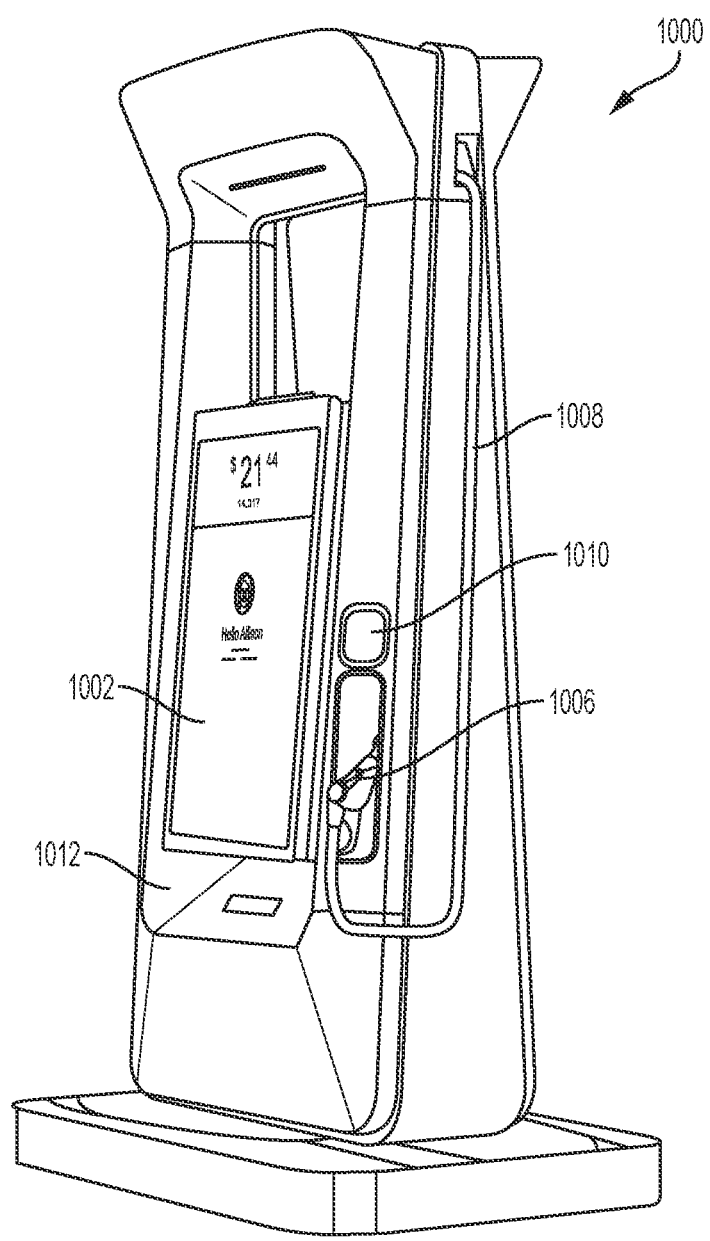
FIG. 36D is a perspective view of the fuel dispenser of FIG. 36C.

The dispenser 1000 in this illustrated embodiment includes a front display 1002, a rear display 1004, a first nozzle 1006 and first hose 1008 associated with the front display 1002, and a second nozzle and second hose (omitted from FIGS. 36A-36D for clarity of illustration) associated with the rear display 1004. FIGS. 36A and 36B show the front display 1002 in an off configuration prior to the front display 1002 receiving power and/or prior to the fuel dispenser 1000 being activated as ready to begin dispensing fuel from the first nozzle 1006. The face of the rear display 1004 is obscured in FIGS. 36A and 36B but is similarly in an off configuration prior to the rear display 1004 receiving power and/or prior to the fuel dispenser 1000 being activated as ready to begin dispensing fuel from the second nozzle. FIGS. 36C and 36D show the front display 1002 in an on configuration after the front display 1002 receives power and/or after the dispenser 1000 is activated as ready to begin dispensing fuel from the first nozzle 1006. The face of the rear display 1004 is obscured in FIGS. 36C and 36C but is in the off configuration, although both of the front and rear displays 1002, 1004 can be in the on configuration when both of the displays 1002, 1004 are in use by customers at the front and the rear of the dispenser 1000. Each of the front and rear displays 1002, 1004 in this illustrated embodiment are touchscreens.

The dispenser 1000 in this illustrated embodiment has an NFC tap reader 1010 configured to read NFC associated with a customer by being in proximity of (e.g., being "tapped" with) an appropriate device configured with NFC capability, such as a mobile phone or other mobile device of a customer. The rear of the dispenser 1000 has a second NFC tap reader (obscured in the figures) associated with the rear display 1004. In other embodiments, the fuel dispenser can have another type of reader, e.g., biometric reader, Bluetooth tap reader, etc., on the front and/or the back.

In this illustrated embodiment the dispenser 1000 does not include any payment components or fuel information (e.g., price, available fuel grades, etc.) components. Instead, payment for fuel and for any other goods and/or services can be accomplished using only the front display 1002 (for a customer at the front of the dispenser 1000 using the first nozzle 1006) or only the back display 1004 (for a customer at the rear of the dispenser 1000 using the second nozzle). The dispenser 1000 can thus lack physical components such as keypad(s), button(s), printer(s), and grade selection button(s) and instead can have features of those physical components be incorporated into the displays 1002, 1004 so as to eliminate the need for the separate component(s). In other words, each of the entire front facing portion of the dispenser's electronics portion and the entire rear facing portion of the dispenser's electronics portion can be in the form of a display screen (e.g., the front display 1002 on the front and the rear display 1004 on the rear), and no physical buttons or other hardware components can be present on the dispenser 1000, with the exception of the NFC tap reader 1010 (or one or more other readers) to communicate with the customer. The dispenser 1000 being configured with an electronics portion that includes the display without payment components and fuel information components may facilitate security of the dispenser 1000 since fewer components need to be secured from physical and/or electronic tampering or unauthorized access, may improve customer experience by providing all fueling and other purchase information and all media at the same location (e.g., all on the display), and/or may facilitate manufacturing since fewer components can be assembled together.

As discussed herein, each of the front and rear displays 1002, 1004 can be configured to present information to a customer in the form of audio and/or video. The information presented can be any information capable of being reduced to audio and/or video. For example, the information can present commercials with synchronized audio and video used to promote products. The information can be arranged in any streaming format, such as a continuous stream of audio and video, a predetermined loop of audio and video that repeats continuously, or a predetermined loop of audio and video that plays once and stops. The synchronized information can be synchronized across multiple fuel dispensers in one location or multiple locations. The information can also be individualized to one fuel dispenser. The information can play continuously or can be triggered to play by an event, for example by an interaction between the customer and the fuel dispenser 1000. For another example, the information can include a post-fueling screen, such as the post-fueling screen shown on the front display 1002 in FIGS. 36C and 36D in which the front display 1002 shows a total cost of fuel dispensed, a total volume of fuel dispensed, a personalized message (in this example, "Happy birthday, wishing you a very special day" based on the customer's pre-stored identity information indicating that the current date is the customer's birthday), and the customer's avatar image. Fuel price information can thus be integrated onto the display with other information instead of being in a separate fuel information area, such as on a second display. Other examples of the information include an idle screen, a customer verification screen, a fueling preferences screen, and a fueling screen.

The dispenser 1000 in this illustrated embodiment includes a recessed frame 1012 configured to illuminate, e.g., via one or more lights inside the dispenser 1000 behind the frame 1012. The frame 1012 can be continuous around the dispenser 1000 such that the entire frame 1012 is configured to illuminate, or only a portion of the frame 1012 (e.g., a bottom, U-shaped portion of the frame 1012) can be configured to illuminate. The frame 1012 can be illuminated at different brightnesses, e.g., a first brightness level when the dispenser 1000 is idle, a second brightness level that is brighter than the first brightness level when the dispenser 1000 moves from being idle in response to detecting the proximity of a customer to the dispenser 1000, a third brightness level that is brighter than the second brightness level when fueling begins, and a fourth brightness level that is brighter than the third brightness level when fueling ends. The customer may thus be visually informed on the fueling session's progress via brightness of the frame 1012. The frame 1012 can be configured to illuminate in different colors, e.g., a first color when the dispenser 1000 is idle, a second color that is different than the first color when the dispenser 1000 moves from being idle in response to detecting the proximity of a customer to the dispenser 1000, a third color that is different than the first and second colors when fueling begins, and a fourth color that is different than the first, second, and third colors when fueling ends. The customer may thus be visually informed on the fueling session's progress via color of the frame 1012. The color of the frame 1012 at least when the dispenser 1000 is idle can reflect branding by being illuminated in the fueling station's branded color.

In at least some embodiments, the fueling station's logo can be shown on the frame 1012 to facilitate branding. The logo can always be shown on the frame 1012, such as by being mounted thereon, painted thereon, attached thereto as a decal, etc., to allow for constant branding. The logo can be backlit by the frame's illumination.

As in this illustrated embodiment, as shown in FIG. 36B, the frame 1012 can be textured. The texture in this illustrated embodiment is a pattern of diagonal lines. The frame 1012 being textured may help reduce reflectiveness, which may facilitate frame 1012 illumination changes.

Figure 37:
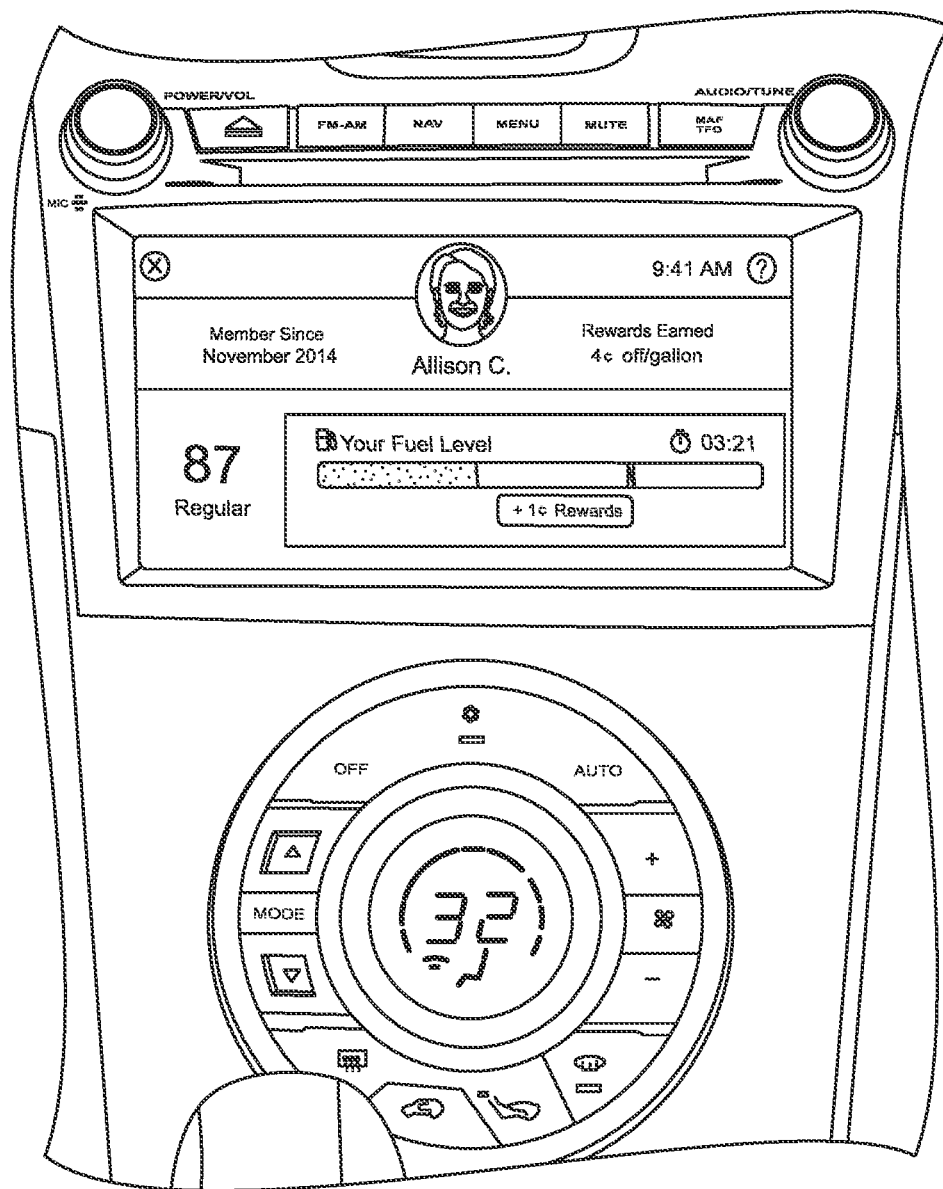
FIG. 37 is a perspective view of a portion of an interior of a customer vehicle including a display showing information thereon received from the fuel dispenser of FIG. 21A related to the fueling session of FIG. 26 following selection by the customer of fuel information.
Figure 38:
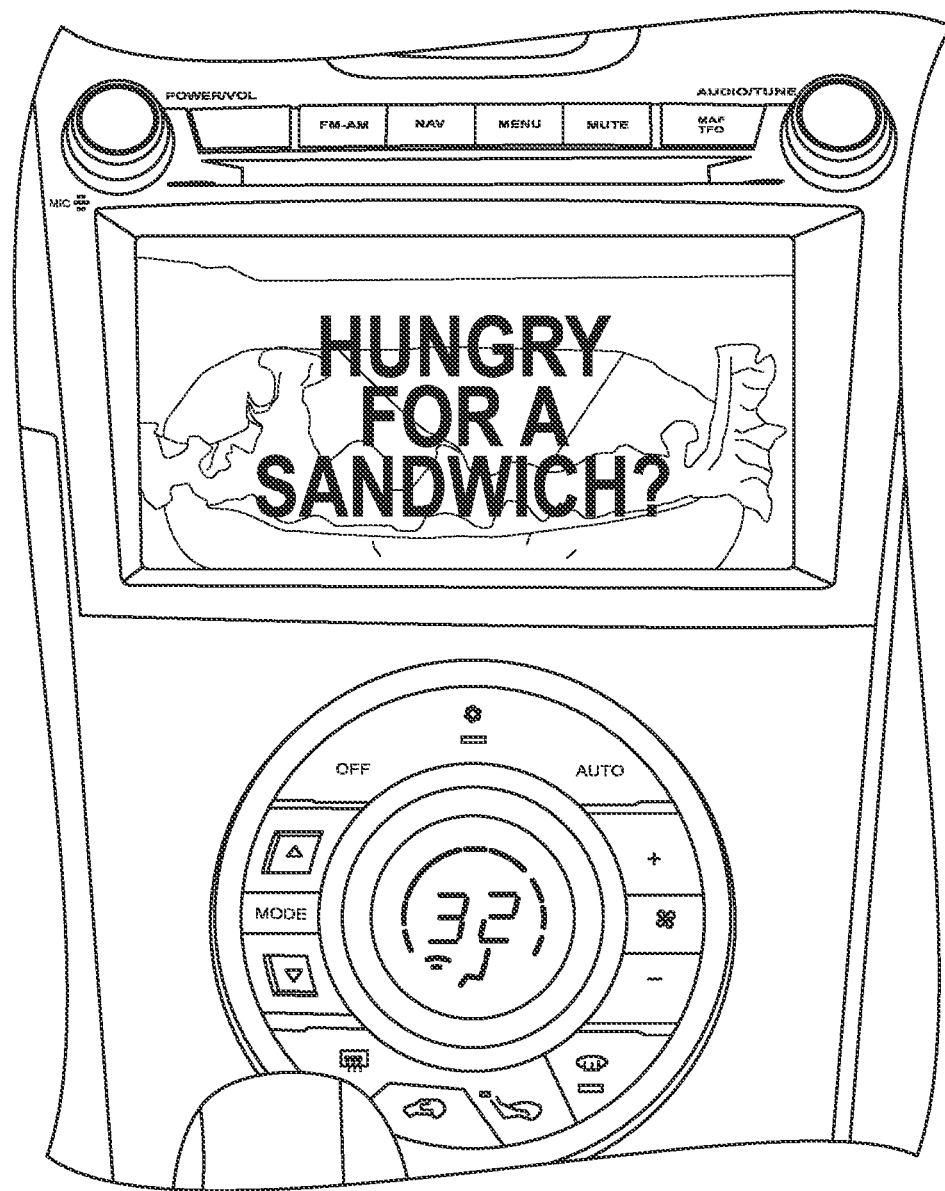
FIG. 38 is a perspective view of the display of FIG. 37 showing an in-store product advertisement.

Instead of or in addition to a fueling screen being shown on a display of the fuel dispenser, a fueling screen can be shown on a display in an interior of a customer's vehicle. The customer may thus be inside the vehicle during fueling to, for example, avoid poor weather, and/or any companions of the customer waiting inside the vehicle can know the progress of fueling and accordingly know its timing. A fueling screen being shown on both the fuel dispenser's display and the vehicle's display may allow more people to view advertisements and other information, and hence encourage more purchases at the fueling station, since people both inside and outside the vehicle can view a fueling screen. The fuel dispenser can identify the customer's vehicle in any of a number of ways, as discussed above. The fuel dispenser, knowing the type of the customer's vehicle, can use pre-programmed information to wirelessly communicate in the appropriate way with the vehicle to allow the fueling screen to be rendered on the vehicle's display. FIG. 37 shows one embodiment of a fueling screen shown on a display in an interior of a customer's vehicle for the customer identified in FIG. 24. The fueling screen shows fueling progress, customer identification information, and loyalty information. FIG. 38 shows another embodiment of a fueling screen shown on a display in an interior of a customer's vehicle. This fueling screen shows an advertisement for goods available for purchase inside the fueling station's store. It is possible for the graphics, text, images, video, etc. shown on the display in various ones of FIGS. 37 and 38 to be different and/or to be arranged in a different way on the display.

The fuel dispensers described herein can be configured to provide virtual assistance to customers via a display of the fuel dispenser. The virtual assistance can generally include video help in the event that a customer selects a "help" feature on the display, in the event that the customer provides incorrect information (e.g., an incorrect PIN, an invalid email address, etc.), and/or in the event that the customer makes an invalid selection (e.g., makes a gesture too far away from the dispenser to be detected such that no input is received by the fuel dispenser within a predetermined period of time after a request for input from the customer has been made, simultaneously touches multiple buttons on the display so it is unknown which one of the buttons the customer intended to select, etc.). The video help may be friendlier than non-video (e.g., textual and/or still image or graphic) help on the display and/or may be easier for the customer to understand. The video help can be video of an actual person or of a virtual person. The video help being of an actual person may make the video help even friendlier. The video help can, for each video, be of the same actual person or virtual person, which may breed familiarity.

The fuel dispenser can store thereon and/or have access to an external database or library of video help files that the fuel dispenser can be configured to select and play as appropriate in response to various occurrences. For example, a video can play on the display in response to the customer accessing assistance on demand. The video can ask the customer how the customer would like to be assisted. In response thereto, the customer can make one of a plurality of selections shown on the screen and/or may provide a verbal response if the fuel dispenser is configured to receive audio input.

For another example, a video can play offering a special offer or coupon for a product (e.g., fuel, food, drink, car wash, etc.) in response to the customer encountering a problem during use of the fuel dispenser. For example, if a requested product to purchase is not currently available at the fueling station's store, a video can play indicating that a discount for a future purchase of that product has been applied to the customer's account and will automatically be applied to the future purchase. For another example, if a selected grade of fuel is not currently available, a video can play indicating that a discount for whatever fuel grade the customer does select not for fueling will be automatically applied to the purchase.

For yet another example, a video can play on the display in response to the customer making an invalid selection on the display to explain why the selection is unacceptable. For example, if the customer selects a fuel type (e.g., diesel, etc.) or blend (e.g., a particular ethanol blend, etc.) that is incompatible with the customer's vehicle (as identified by the fuel dispenser and/or as stored in the customer's profile), a video can play indicating that the selection is incompatible with the customer's vehicle. The customer may then be given an option to select again to provide an acceptable input and/or to override the fuel dispenser's automatic detection (e.g., because the customer is fueling a rental vehicle and not the vehicle in the customer's pre-stored customer profile).

Although various embodiments have been described in detail above, other modifications or additions are possible. For example, while the above describes a single intelligent fuel dispenser, multiple intelligent fuel dispensers can operate in coordination. For example, if a fuel dispenser detects a fault condition (e.g., a fuel leak or fluid in the pan), the fuel dispenser can coordinate an appropriate response with one or more other fuel dispensers. Other conditions that may trigger a need for coordination include receiving a message from a remote device (e.g., to perform a diagnostic function), loss of communication with a central computer, detection of a potential drive-off situation, and failure of a user-interface device. Examples of operations that the coordinating fuel dispensers may perform include capturing image data from different vantage points using image capture equipment controlled by the fuel dispensers, such as when a possible drive-off (without payment) situation is detected or a fuel leak is detected; providing user interface functionality for malfunctioning fuel dispensers; activating a shut-down state in which fuel dispensing is suspended, such as when a possible fuel leak or spill is detected; re-booting the controller in a fuel dispenser, such as when a processing fault occurs; and redundant storage of data in multiple fuel dispensers to provide for information recovery in the event of data loss. Coordinated operations can be used to provide any of a number of services for a fuel dispenser as an individual entity or for two or more fuel dispensers as a group.

The appropriate fuel dispensers for coordinating operations can be predesignated. For example, if a fuel dispenser determines that an image needs to be captured of a vehicle to which it is dispensing fuel, it may already have the identity of one or more fuel dispensers that are able to capture such images. As another example, if a fuel dispenser determines that a vehicle has moved away from the fuel dispenser, and determines that payment has not been received for fuel that has been dispensed, steps may be taken to record a potential drive-off situation. The fuel dispenser that detects the potential drive-off situation can, for example, send messages to other fuel dispenser(s) with control over imaging equipment to try to capture images of the event and/or the customer and/or vehicle at issue. The request may specify a time delay for a particular camera to record images at a particular angle so as to increase the likelihood of capturing identifying information about the driver and/or the vehicle, for instance.

Although an exemplary retail fueling facility, which can sell retail gasoline and/or diesel fuels for general-purpose vehicles (e.g., automobiles and/or trucks), has been described herein, other implementations can be deployed in other fuel dispensing applications, such as commercial, wholesale, or private fuel dispensing installations. Fuels that are dispensed can, for example, be for automotive, aviation, and/or marine vehicles.

Although the current subject matter has been described with respect to identifying characteristics of a customer and the customer's vehicle, other implementations are possible. For example, a fuel dispenser can also or instead capture images of physical conditions around the fuel dispenser. For example, images regarding the ground may be useful for determining whether a fuel leak is occurring, and images of the fuel dispenser itself can be useful for determining whether the fuel dispenser has been improperly accessed (e.g., opened access panel by an unauthorized person, housing hit and opened by a vehicle or other object, etc.). Imaging of the physical conditions around the fuel dispenser can be accomplished with imaging systems of other fuel dispenser to provide additional image data of the fuel dispenser and its environment. The fuel dispenser can coordinate this imaging. The image data can be stored locally at the fuel dispenser and/or sent to a remote site, such as, for example, a service provider's computer.

Intelligent fuel dispensers can additionally be used for providing customer-service. For example, the imaging system can image the area in the vicinity of the fuel dispenser so that a store attendant or other person knowledgeable with the functioning of the fuel dispenser may assist a customer.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    a fuel dispenser including a display screen, an image sensor, and at least one data processor operatively connected to the display screen and the image sensor, the at least one data processor configured to receive data characterizing an image from the image sensor, the image characterizing a visual depiction of a customer, and to determine identity information characterizing an identity of the customer from the received data;
    a server operatively connected to the at least one data processor and configured to:
        receive the determined identity information from the at least one data processor,
        determine whether the identity information matches a feature associated with one or more unique identifiers of fuel dispenser users, in response to determining that the identity information matches the feature stored in the database, retrieve the unique identifier associated with the matched feature, determine a targeted communication based on the retrieved unique identifier, the targeted communication including an advertisement characterizing a product and/or a service for sale at a store located at a fueling station where the fuel dispenser is located, and provide the targeted communication to the at least one data processor for display on the display screen, wherein the at least one data processor of the fuel dispenser is configured to receive data characterizing an input corresponding to the advertisement and to determine whether the customer has an interest in the product and/or the service based on the received data.

2. The system of claim 1, wherein the at least one data processor is configured to provide a communication characterizing additional information about the product and/or the service in response to determining that the customer has an interest in the product and/or the service.

3. The system of claim 1, wherein the at least one data processor is configured to determine whether the customer desires to order the product and/or the service in response to determining that the customer has an interest in the product and/or the service.

4. The system of claim 3, wherein, in response to determining that the customer desires to order the product and/or the service, the at least one data processor is configured to:
receive order data characterizing the product and/or the service;
receive payment data characterizing payment information of the customer;
determine whether the payment data is sufficiently complete;
in response to determining that the payment data is sufficiently complete, generate a merchant communication characterizing the order data and the payment data;
provide the merchant communication to thereby enable execution of the order.

5. The system of claim 1, wherein the determination of the targeted communication comprises:
querying the first server for a user profile associated with the unique identifier, the user profile including customer data characterizing the customer;
receiving the user profile from the first server; and
generating the targeted communication based on the customer data.

6. The system of claim 1, wherein the determination of the targeted communication comprises:
querying a remote server for customer-related data associated with the unique identifier;
receiving the customer-related data from the remote server; and
generating the targeted communication based on the customer-related data.

7. A system comprising:
a fuel dispenser including a display screen, an image sensor, and at least one data processor operatively connected to the display screen and the image sensor, the at least one data processor configured to receive data characterizing an image from the image sensor, the image including a visual depiction of a customer, and to determine identity information characterizing an identity of the customer from the received data;

a server operatively connected to the at least one data processor and configured to:
receive the determined identity information from the at least one data processor, and
determine a unique identifier based on the identity information and associated with the customer;
determine a targeted communication based on the determined unique identifier, the targeted communication including an advertisement characterizing a product and/or a service for sale at a store located at a fueling station where the fuel dispenser is located; and
provide the targeted communication to the at least one data processor for display on the display screen, wherein the at least one data processor of the fuel dispenser is configured to receive data characterizing an input corresponding to the advertisement and to determine whether the customer has an interest in the product and/or the service based on the received data.

8. The system of claim 7, wherein the at least one data processor is configured to provide a communication characterizing additional information about the product and/or the service in response to determining that the customer has an interest in the product and/or the service.

9. The system of claim 7, wherein the at least one data processor is configured to determine whether the customer desires to order the product and/or the service in response to determining that the customer has an interest in the product and/or the service.

10. The system of claim 9, wherein, in response to determining that the customer desires to order the product and/or the service, the at least one data processor is configured to:
receive order data characterizing the product and/or the service;
receive payment data characterizing payment information of the customer;
determine whether the payment data is sufficiently complete;
in response to determining that the payment data is sufficiently complete, generate a merchant communication characterizing the order data and the payment data;
provide the merchant communication to thereby enable execution of the order.

11. The system of claim 7, wherein the determination of the targeted communication comprises:
querying the at least one server for a user profile associated with the unique identifier, the user profile including customer data characterizing the customer;
receiving the user profile from the at least one server; and
generating the targeted communication based on the customer data.

12. The system of claim 7, wherein the determination of the targeted communication comprises:
receiving customer-related data characterizing the customer and associated with the unique identifier; and
generating the targeted communication based on the customer-related data.

13. A system comprising:
at least one data processor; and
memory storing instructions configured to cause the at least one data processor to perform operations comprising:
receiving identity information characterizing an identity of a customer, the identity information determined from data characterizing an image, the image acquired by an image sensor and characterizing a visual depiction of the customer;

determining whether the received identity information matches a feature associated with unique identifiers of fuel dispenser users;

in response to determining that the identity information matches the feature included in the database, retrieving the unique identifier associated with the matched feature;

determining a targeted communication based on the retrieved unique identifier, the targeted communication including an advertisement characterizing a product and/or a service for sale at a store located at a fueling station where the fuel dispenser is located;

providing the targeted communication for display on an interactive display screen of a fuel dispenser;

receiving data characterizing an input to the display screen that corresponds to the advertisement; and determining whether the customer has an interest in the product and/or the service based on the received data.

14. The system of claim 13, wherein the operations further comprise:

providing a communication characterizing additional information about the product and/or the service in response to determining that the customer has an interest in the product and/or the service.

* * * * *